United States Patent [19]

Maruyama et al.

[11] Patent Number: 4,988,791
[45] Date of Patent: Jan. 29, 1991

[54] NON-LINEAR PHOSPHAZENE POLYMER HAVING SCHIFF BASE STRUCTURES, PROCESS FOR THE PREPARATION THEREOF, AND CURABLE PHOSPHAZENE COMPOSITION

[75] Inventors: Isao Maruyama, Ichihara; Hiroshi Fujiwara, Ohmiya; Yoshiharu Ito; Hitoshi Shigematsu, both of Ichihara, all of Japan

[73] Assignee: Maruzen Petrochemical Co., Ltd., Tokyo, Japan

[21] Appl. No.: 379,930

[22] Filed: Jul. 11, 1989

[30] Foreign Application Priority Data

Jul. 13, 1988 [JP] Japan .................... 63-174410

[51] Int. Cl.$^5$ .......................................... C08G 79/02
[52] U.S. Cl. ...................................... 528/168; 528/398; 528/399
[58] Field of Search ................. 528/168, 398, 399

[56] References Cited

U.S. PATENT DOCUMENTS 4,094,856  6/1978  Guschl .................... 528/168
4,440,921  4/1984  Allcock et al. ........... 528/168
4,668,589  5/1987  Kumar et al. ............. 528/168

FOREIGN PATENT DOCUMENTS 11226   4/1972  Japan .
 8620   3/1973  Japan .
20793   6/1973  Japan .
27316   8/1973  Japan .
11099  10/1973  Japan .

OTHER PUBLICATIONS

Devendra Kumar, et al., Macromolecules 16 (8), pp. 1250–1257 (1983).
Harry R. Allcock, Paul E. Austin. Macromolecules 14 (6), pp. 1616–1622. (1981).
"Effect of Organic Side Group Structures on the Properties of Poly(organophosphazenes)". Allcock, H. et al., Macromolecules, 21 (2), p. 323–334, (1988).

Primary Examiner—Morton Foelak
Assistant Examiner—T. Mosley
Attorney, Agent, or Firm—Oblon, Spivak, McClelland, Maier & Neustadt

[57] ABSTRACT

A novel phosphazene polymer having Schiff base structures is disclosed. The polymer is a condensation reaction product of a cyclic phosphonitrilic compound represented by the general formula (I):

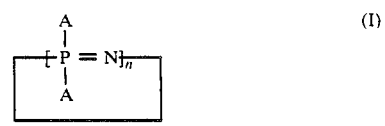

(wherein n is an integer 3 or 4, and 2n A's are independently selected from a group consisting of a formylphenoxy group, a phenoxy group, an alkylphenoxy group, a halogenated phenoxy group, an N-aromatic azomethine-phenoxy group, and a fluoroalkoxy group, provided more than 2 formylphenoxy groups being contained per molecule on the average) and a primary diamine or a primary polyamine, The polymer contains Schiff base bonds derived from formylphenoxy groups and amines and is represented by the formula:

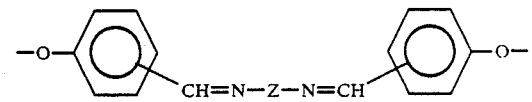

(wherein Z is a residual group said primary diamine or primary polyamine and may have bonds other than those indicated). The polymer exhibits a 20% or less weight loss under thermobalance analysis at 400° C. and has a glass transition teperature (Tg) of 120° C. or higher.

10 Claims, 48 Drawing Sheets

NON-LINEAR PHOSPHAZENE POLYMER HAVING SCHIFF BASE STRUCTURES, PROCESS FOR THE PREPARATION THEREOF, AND CURABLE PHOSPHAZENE COMPOSITION

BACKGROUND OF THE INVENTION

1. Field of the Invention

The present invention relates to a novel phosphazene polymer having a Schiff base structure which exhibits superior heat-, corrosion-, and moisture-resistant characteristics. The invention also relates to a process for preparing such a phosphazene polymer and a curable phosphazene composition.

2. Description of the Background

Since a phosphonitrilic chloride derivative, which is the monomer for a phosphazene polymer, is generally non-flammable and produces gases with low toxicity through combustion, the same characteristics are expected in polymers prepared therefrom. Many experiments have been performed using phosphonitrilic chloride as a starting raw material with the expectation of obtaining a polymer which is inflammable and heat resistant. For example, a process is known for obtaining a heat resistant resin by the reaction of phosphonitrilic chloride trimer and hydroquinone (U.S. Pat. Nos. 2,866,773 and 3,121,704). However, applications of the resins prepared by this process are limited because of generation of corrosive hydrochloric acid gas during resinification. Zhivukain et al conducted experiments on the resinification of a butoxy substitution product of phosphonitrilic chloride trimer and a divalent phenol such as resorcin, hydroquinone, or the like by an ester-exchange reaction. The method, however, does not produce a high molecular polymer [Vysokomol, Soed, 8, 727 (1966)].

There are examples of polymers obtained by vinyl polymerization of phosphonitrilic chloride trimer substituted with organic groups containing a phenoxy group and a vinyl group, using a catalyst. The heat resistance and mechanical characteristics of these polymers are unsatisfactory (Japanese Patent Publication Nos. 11226/1972, 8620/1973, 11099/1973, 20793/1973, 27316/1973).

A recent report describes a high heat resistant resin obtained by the polymerization of a phosphonitrilic chloride trimer into which a substituent containing a maleimide group has been introduced [D. Kumar et al, Macromolecules 16, 1250 (1983)]. This resin is said to have superior heat resistance and to exhibit a high weight residual ratio upon heat decomposition. However, there are many drawbacks to this material; the process for synthesizing the raw material derivative is very complicated; the resin has an extremely deep tar-black color; the mechanical characteristics are not necessarily satisfactory; and a high temperature is required for the polymerization. For these reasons the practical application of the material is limited.

In this way, although various studies have been carried out on polymers derived from a phosphonitrilic compound because of their superior characteristics in terms of fire resistance and heat resistance, none of the aforementioned attempts have been successful in providing a simple and convenient process. All these processes have drawbacks such as generation of corrosive gases during polymerization, requirement of a catalyst or a high temperature for the polymerization, and complicated processes for synthesizing the raw material derivative. In addition, none of the resulting polymers have both superior heat resistance and desirable mechanical characteristics at the same time. Furthermore, the products are remarkably colored.

SUMMARY OF THE INVENTION

Accordingly an object of the present invention is to provide, with due consideration to the drawbacks of such conventional materials, a curable phosphazene composition and a novel phosphazene polymer having superior heat resistance, exhibiting a high weight residual ratio upon heat decomposition, and providing excellent mechanical characteristics and a high degree of flexibility. The polymers also exhibit improved coloration characteristics in many cases. The present invention further provides a simple and convenient for preparing such a phosphazene polymer.

To satisfy these objectives, the inventors of the present invention, as the result of extensive investigation, have discovered a process for easily preparing a phosphazene polymer having superior heat resistance, a high weight residual ratio upon heat decomposition, excellent mechanical characteristics, a high degree of flexibility, and, in addition, in many cases, a low degree of coloration, by the application of the reaction for synthesizing a polymer having a so-called Schiff base structure, which is created by a dehydration-condensation reaction of an aromatic dialdehyde compound and an aromatic diamino compound, to a cyclic phosphonitrilic substitution compound.

Accordingly, a more specific object of this invention is to provide a non-linear phosphazene polymer which is a condensation reaction product of a cyclic phosphonitrilic compound represented by the general formula (I):

(wherein n is an integer 3 or 4, and 2n A's are independently selected from a group consisting of a formylphenoxy group, a phenoxy group, an alkylphenoxy group, a halogenated phenoxy group, an N-aromatic azomethinephenoxy group, and a fluoroalkoxy group, provided more than 2 formylphenoxy groups being contained per molecule on the average) and a primary diamine or a primary polyamine, which contains Schiff base bonds derived from formylphenoxy groups and amines and is represented by the formula:

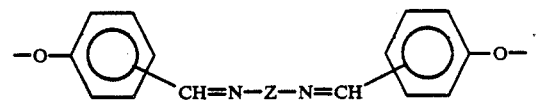

(wherein Z is a residual group of said primary diamine or primary polyamine and may have bonds other than those indicated), and which exhibits a 20% or less weight loss under thermogravimetric analysis at 400° C. and has a glass transition temperature (Tg) of 120° C. or higher.

Another object of this invention is to provide a process for the preparation of a non-linear phosphazene polymer which comprises a condensation reaction of a cyclic phosphonitrilic compound represented by the general formula (I):

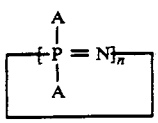

(wherein n and A have the same meaning as defined above) and a primary diamine or a primary polyamine.

Further object of the present invention is to provide a curable phosphazene composition comprising a cyclic phosphonitrilic compound represented by the general formula (I):

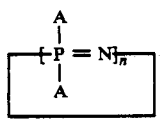

(wherein n and A have the same meaning as defined above) and a primary diamine or a primary polyamine, at a —CHO/—$NH_2$ functional group ratio of 0.5–2.0.

Other objects, features and advantages of the invention will hereinafter become more readily apparent from the following description.

DETAILED DESCRIPTION OF THE INVENTION AND PREFERRED EMBODIMENTS

Figure 1:
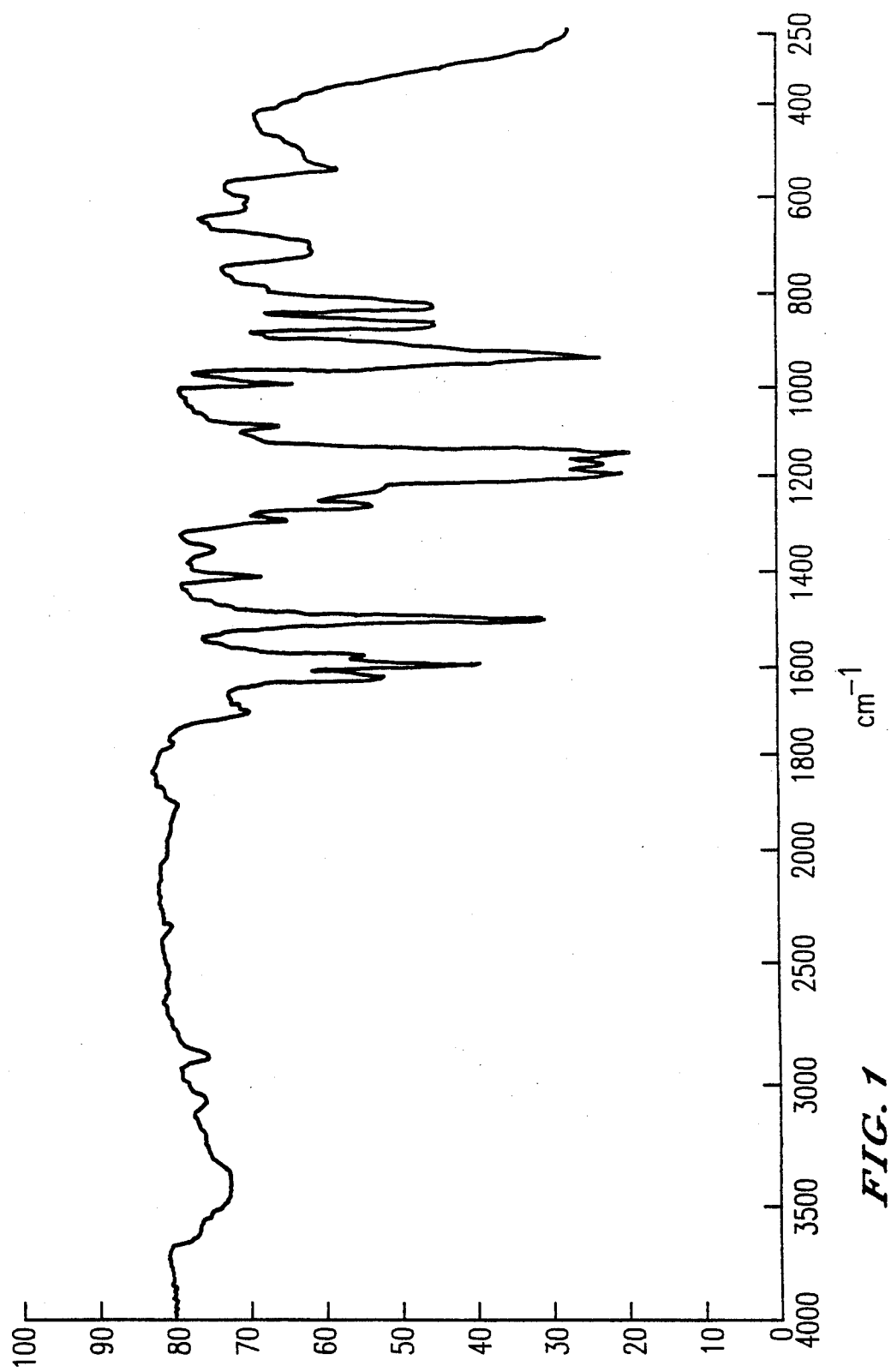
FIGS. 1–40 are the IR spectra of the phosphazene polymers having Schiff base structures prepared in Examples 1 to 40.
Figure 2:
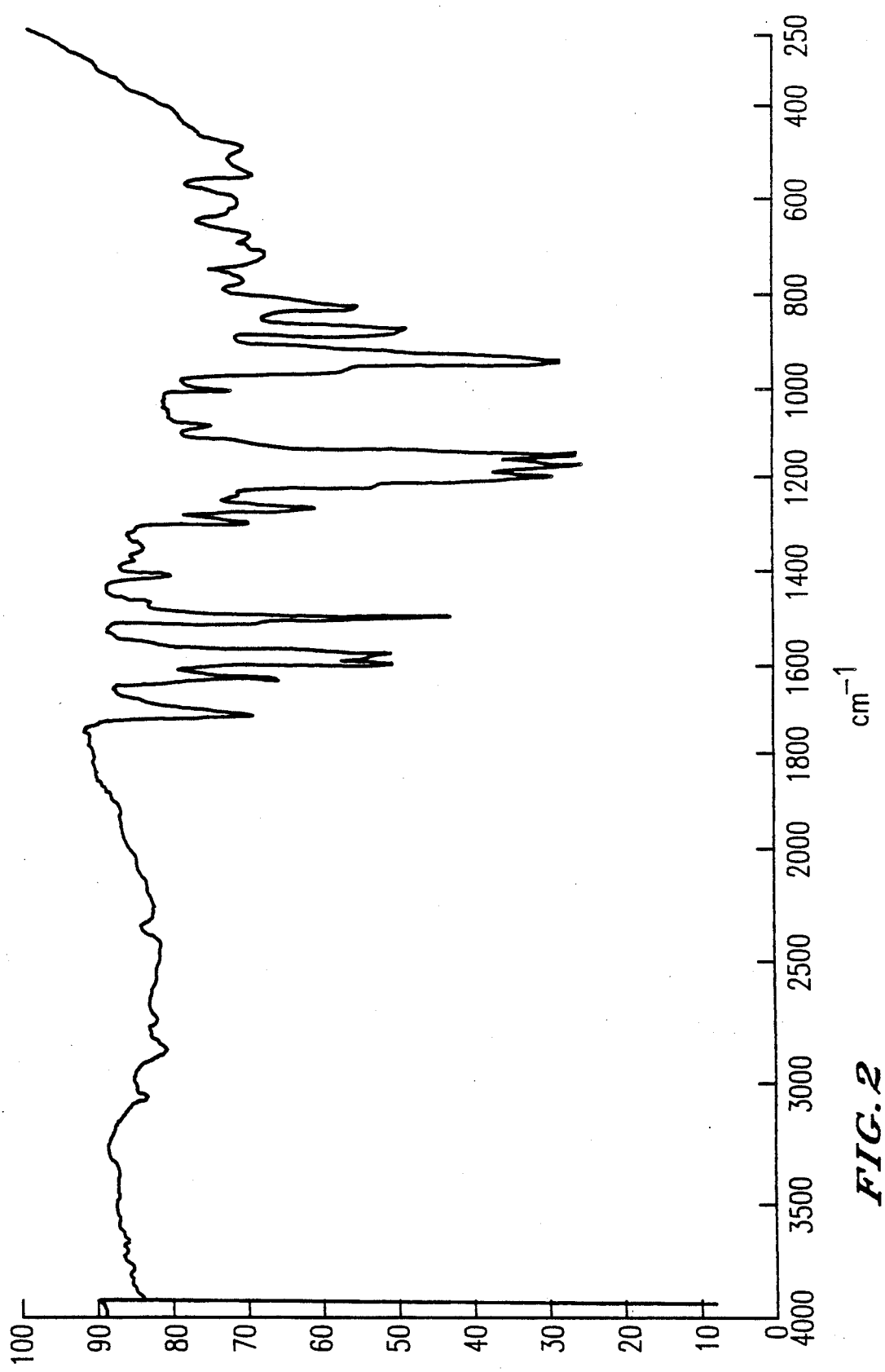
Figure 3:
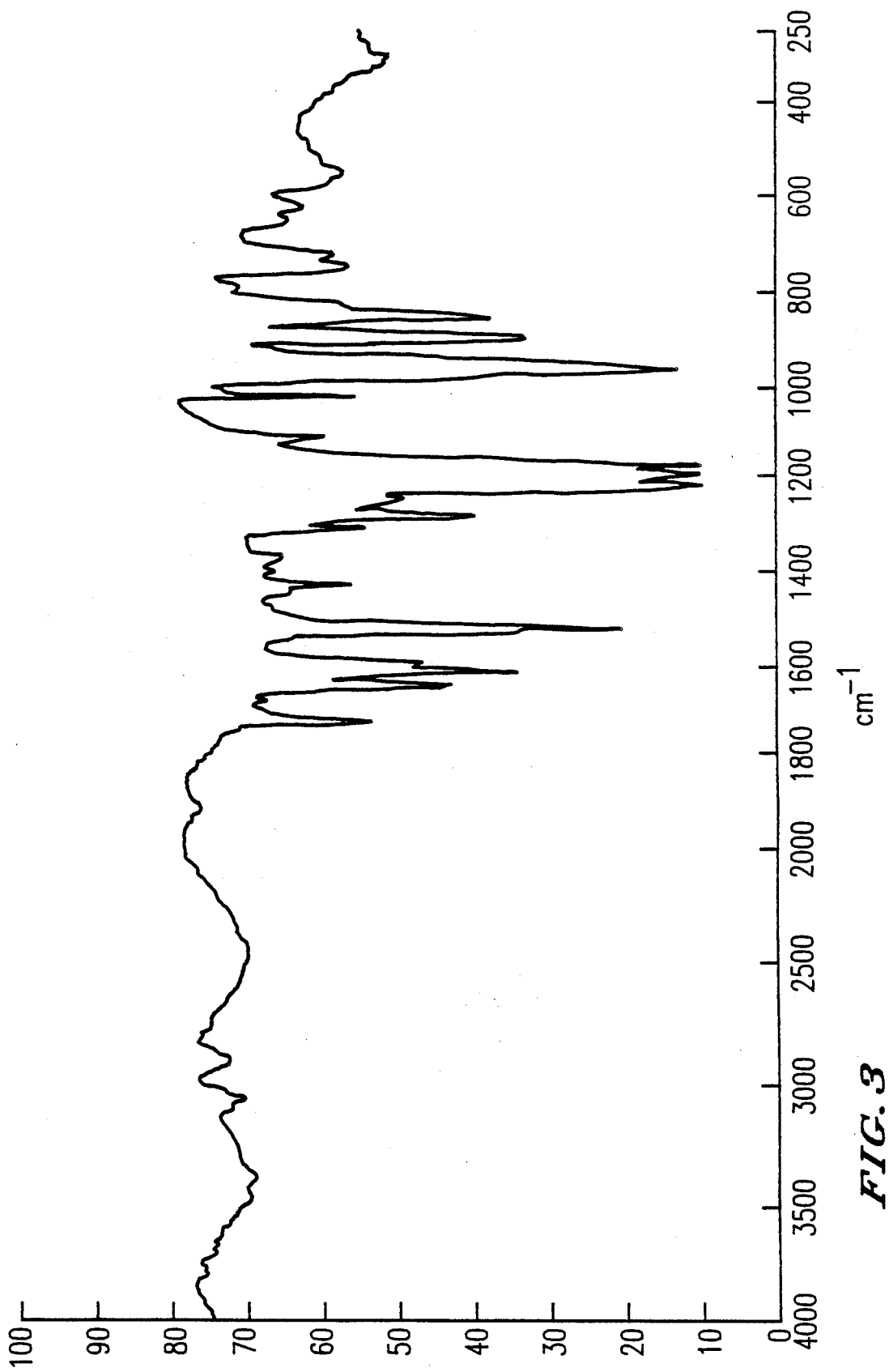
Figure 4:
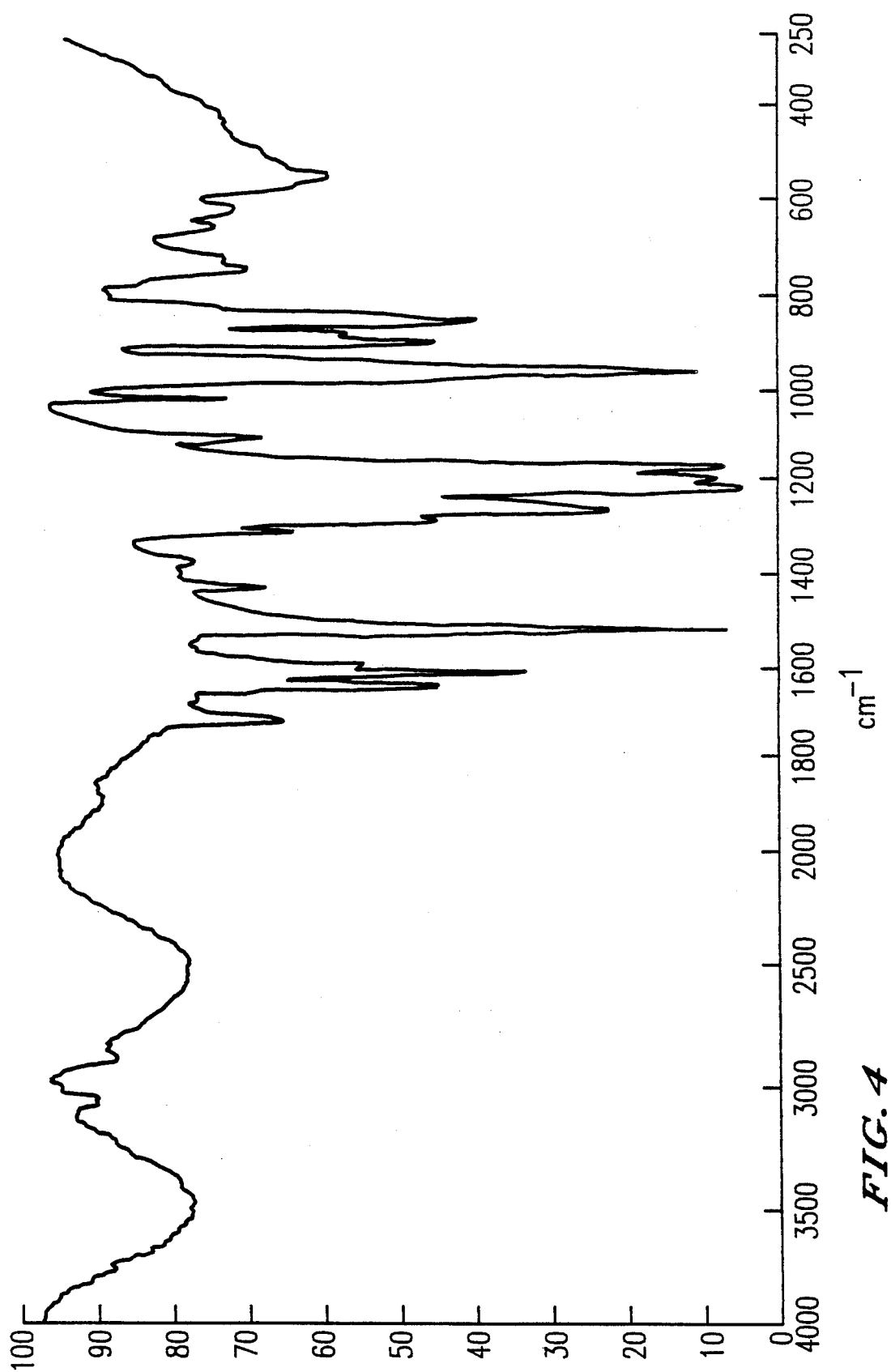
Figure 5:
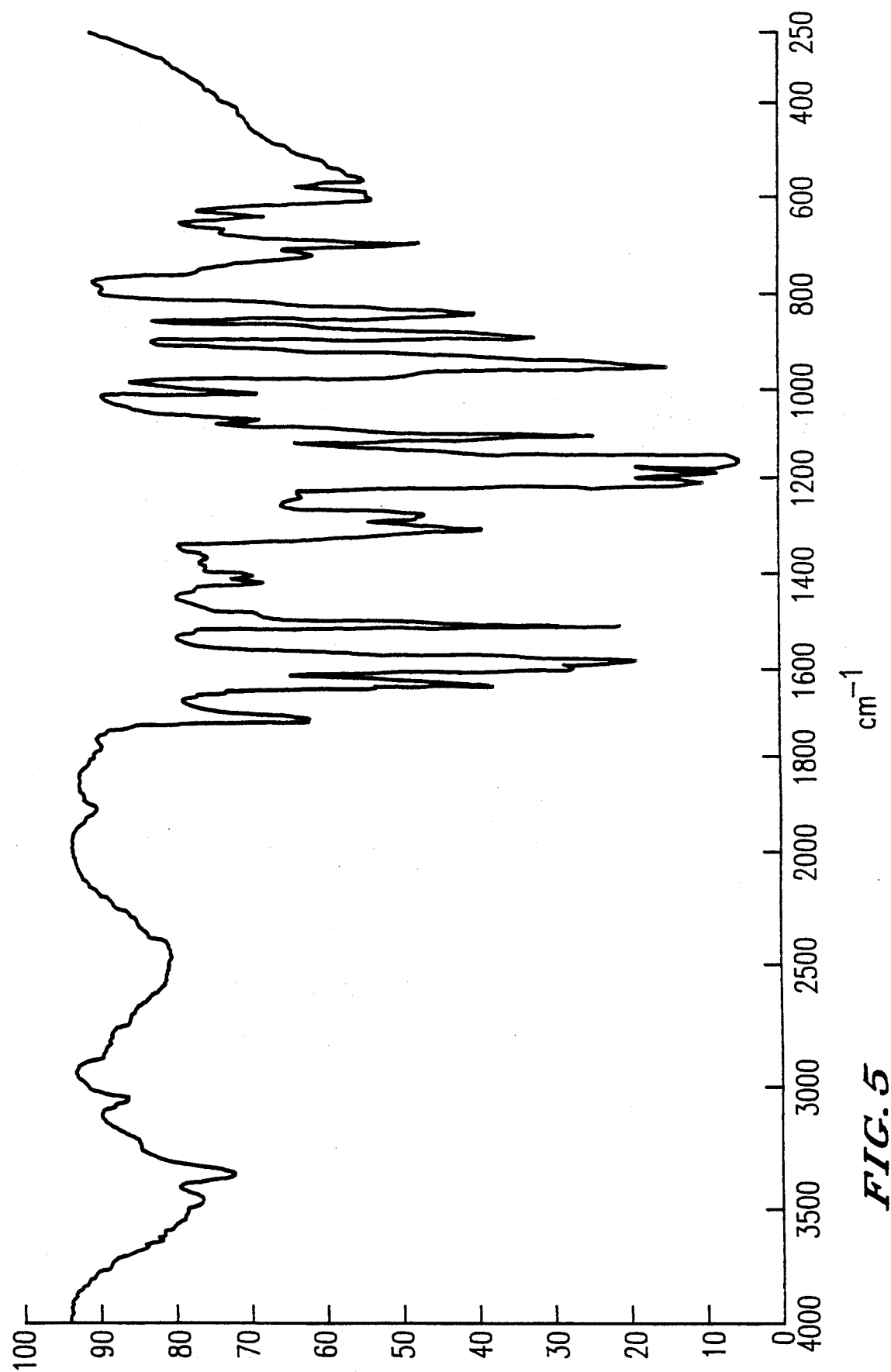
Figure 6:
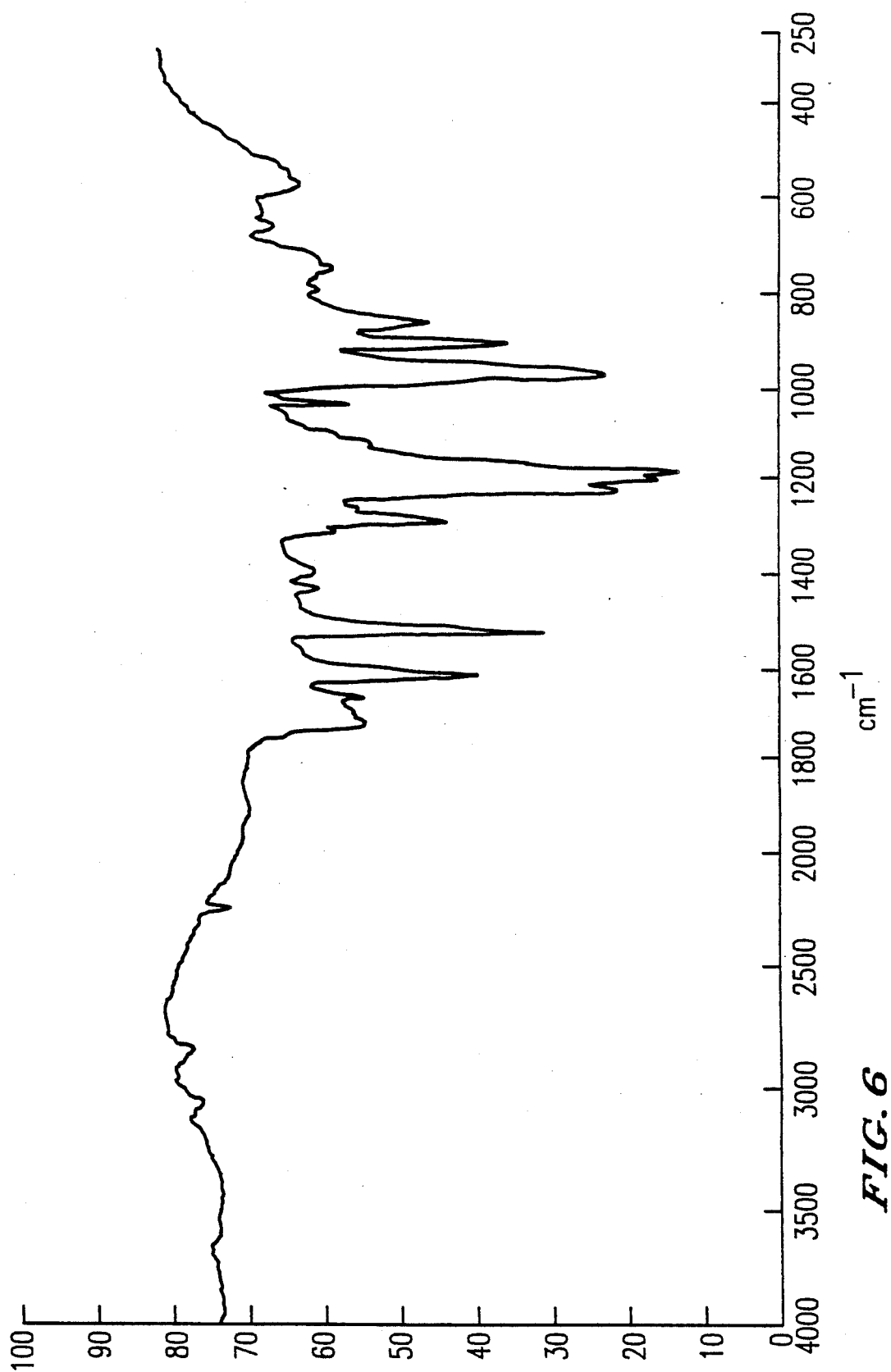
Figure 7:
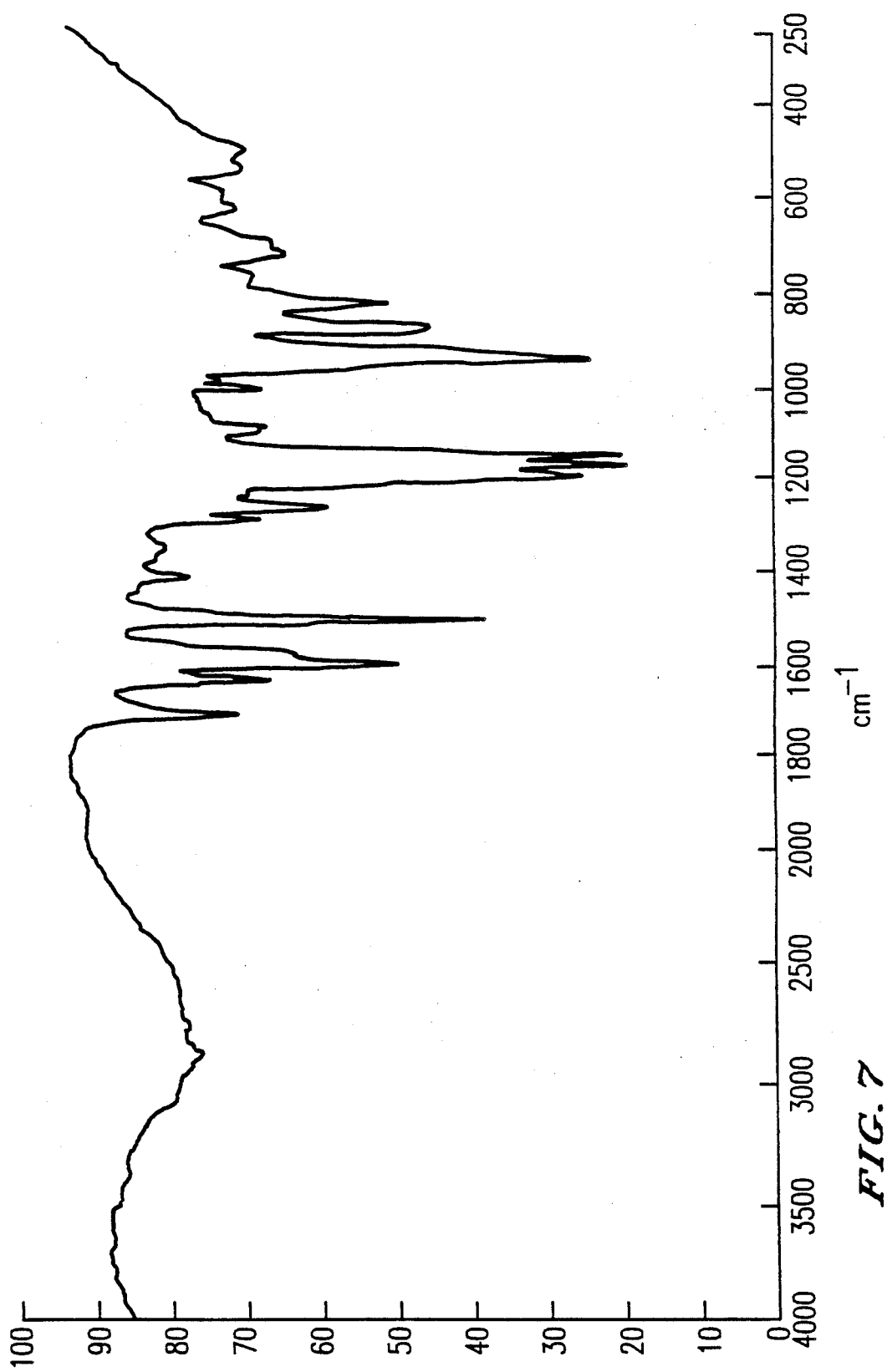

Given as typical formylphenoxy group-containing cyclic phosphonitrilic compounds represented by (I):

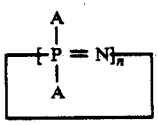

used in the present invention are those having as A in formula (I) o-, m-, or p-formylphenoxy group, a phenoxy group, an o-, m-, or p-alkylphenoxy group, an o-, m-, or p-fluorine-, chlorine-, bromine-, or iodine substituted phenoxy group, a fluoroalkoxy group, or an N-aromatic azomethinephenoxy group, containing more than two o-, m-, or p-formylphenoxy groups per molecule on the average, and having an integer 3 or 4 for n in formula (I).

The formylphenoxy group-containing cyclic phosphonitrilic compound of formula (I) can be easily synthesized by the reaction of the corresponding cyclic phosphonitrilic chloride compound and an alkali metal salt of the corresponding formylphenol, or an alkali metal salt of the corresponding alcohol or phenol compound which is to be introduced at the same time, or by the reaction of the corresponding cyclic phosphonitrilic chloride compound and the corresponding formylphenol, or the corresponding alcohol or phenol compound which is to be introduced at the same time, in the presence of a suitable hydrochloric acid-capturing agent, e.g. a tertiary amine.

Among formylphenoxy group-containing cyclic phosphonitrilic compounds those having an N-aromatic azomethinephenoxy group for a portion of the A in formula (I) can be easily prepared by reacting a formylphenoxy group-containing cyclic phosphonitrilic compound which is prepared by the above reaction and a primary monoamine, thereby converting a desired amount of formylphenoxy group to a Schiff base.

As a preferred primary diamine or primary polyamine compound for forming Schiff base structures and forming a high polymer, there are aliphatic amines such as hexamethylenediamine, diethylenetriamine, tetramethylenepentamine, and the like; aromatic or heterocyclic amines such as phenylenediamine, diaminodiphenylmethane, diaminodiphenyl ether, diaminodiphenylsulfone, diaminodiphenyl sulfide, tolylenediamine, xylylenediamine, diaminobenzophenone, diaminofluorene, diaminofluorenone, diaminoanthraquinone, diaminobiphenyl, diaminonaphthalene, alkyl diaminobiphenyl, alkyl diaminofluorene, triaminobenzene, triaminobiphenyl, tetraaminobiphenyl, diaminopyridine, diaminopyrazine, diaminophenyltriazine, diaminotriazine, triaminotriazine, diaminoquinoline, and the like; and even more preferable, the primary amine is o-, m-, or p-phenylenediamine, 4,4'-diaminodiphenylmethane, 4,4'-diaminodiphenyl ether, 4,4'-diaminodiphenylsulfone, m-xylylenediamine, tolylene-2,4-diamine, o-tolidine, 2,6-diaminopyridine, 1,5-diaminoanthraquinone, 2,4-diamino-6-phenyl-sym-triazine, or hexamethylenediamine; and the primary polyamine is melamine or 3,3'-diaminobenzidine, or the like; but the present invention is not limited to these compounds.

In order to allow to react a formylphenoxy group-containing cyclic phosphonitrilic compound represented by formula (I) with a primary diamine or a primary polyamine, or to compose a curable composition, the mixing of the compounds may be carried out either without a solvent or by dissolving the both compounds in a suitable solvent, such as an ether, a ketone, an ester, or a halogenated hydrocarbon, or the like. The proportion of the compounds to be mixed, in terms of the —CHO/—$NH_2$ functional group ratio, is 0.5 to 2.0 and preferably 0.8 to 1.2.

The polymerization reaction proceeds easily at room temperature depending on the combination of the raw materials used, but in order to accelerate or complete the reaction, the mixture may be heated to 50° to 300° C.

The polymerization reaction is completed in one minute to 20 hours. A phosphazene polymer with Schiff base structures is obtained quantitatively. If desired, the reaction can be accelerated in the presence of an alkali, such as sodium hydroxide, potassium hydroxide, or the like.

The glass transition temperature (Tg) of the polymer thus produced is normally 120° C. or greater, as determined by the TBA (Torsional Braid Analysis) method, and in many cases is 130° C. or greater. The weight residual ratio measured by means of thermogravimetric analysis at a temperature elevation of 10° C. per minute in a nitrogen stream is 80.0% by weight or greater at 400° C., 50.0% by weight or greater at 600° C., and in many cases 90.0% by weight or greater at 400° C., and 70.0% by weight or greater at 600° C.

An alkali such as sodium hydroxide, potassium hydroxide, or the like can be added to a curable composition formed by mixing a formylphenoxy group-containing cyclic phosphonitrilic compound and a primary diamine or a primary polyamine, if required, in order to further accelerate the reaction.

The non-linear phosphazene polymer of the present invention is insoluble in most organic solvents such as benzene, hexane, ether, ethyl acetate, pyridine, dimethyl formamide, dimethyl sulfoxide, and benzonitrile, as well as in water.

The polymer of the present invention is extremely resistant to chemicals and is also stable in bases. It is slightly unstable in strong acids but is stable in weak acids. For example, it will decompose in concentrated sulfuric acid in three or four days. However, at this time the decomposition does not stop at the monomer or oligomer, but ammonia and phosphoric acid are produced. Accordingly, the measurement of the NMR spectrum of the non-linear polymer of the present invention itself is very difficult, and in addition the molecular weight cannot be measured.

The phosphazene polymer with Schiff base structures and the curable phosphazene composition of the present invention generally have a high glass transition temperature and exhibit superior heat resistance. Their weight residual ratios when decomposed at a temperature of 300° to 800° C. are high and also free of extreme reduction. In addition, in many cases the color ranges from colorless to brown and the material is transparent, so that the colors show a considerable improvement over the conventional tar-black color. Also, the mechanical characteristics are good, so that by proper selection of the type of the raw material cyclic phosphonitrilic compound and primary amine or primary polyamine, it is possible to form the products into extremely flexible films. Accordingly, it is possible to use these materials as heat resistant films with no further processing. In addition, since they will form heat and corrosion resistant coatings when applied to metals or plastics, or when combined with inorganic materials, fibers, or the like, they could find applications as heat resistant composite materials. Furthermore, since the polymerization reaction of a formyl group-containing cyclic phosphonitrilic compound and an amine is generally a one stage dehydration reaction which proceeds at normal temperature without using a catalyst and without the formation of noxious or corrosive gases, it is possible to easily produce the phosphazene polymer with Schiff base structures.

Other features of the invention will become apparent in the course of the following description of the exemplary examples which are given for illustration of the invention and are not intended to be limiting thereof.

EXAMPLES

In the following examples, IR spectrum measurement was carried out using a film when the polymer was obtained in the form of a film, and using pelletized powdery polymer mixed with KBr when the polymer was not obtained in the form of a film.

EXAMPLE 1

2.87 g of hexa(4-formylphenoxy)cyclotriphosphazene (hereinafter referred to as p-HBA/3PNC) obtained by reacting p-hydroxybenzaldehyde and cyclic phosphonitrilic chloride trimer was dissolved in 20 ml of dioxane. To this solution 20 ml of dioxane solution containing 1.08 g of p-phenylenediamine was added with stirring. The solution immediately turned clear yellow.

A part of this solution was spread evenly over a glass plate and cured by allowing the solvent to evaporate at room temperature, thus obtaining a hard film of a light yellow polymer. After a one-hour heating in air at 225° C., the system was immersed in water. The film was peeled off from the glass plate to give a light yellow, flexible, transparent film. The IR spectrum of the polymer is shown in FIG. 1. The N—H stretching vibration of the amine (3400, 3320, and 3220 cm$^{-1}$) and the C=O stretching vibration of the aldehyde (1705 cm$^{-1}$) almost disappeared, and instead the C=N stretching vibration based on the Schiff base appears at 1630 cm$^{-1}$.

Figure 41:
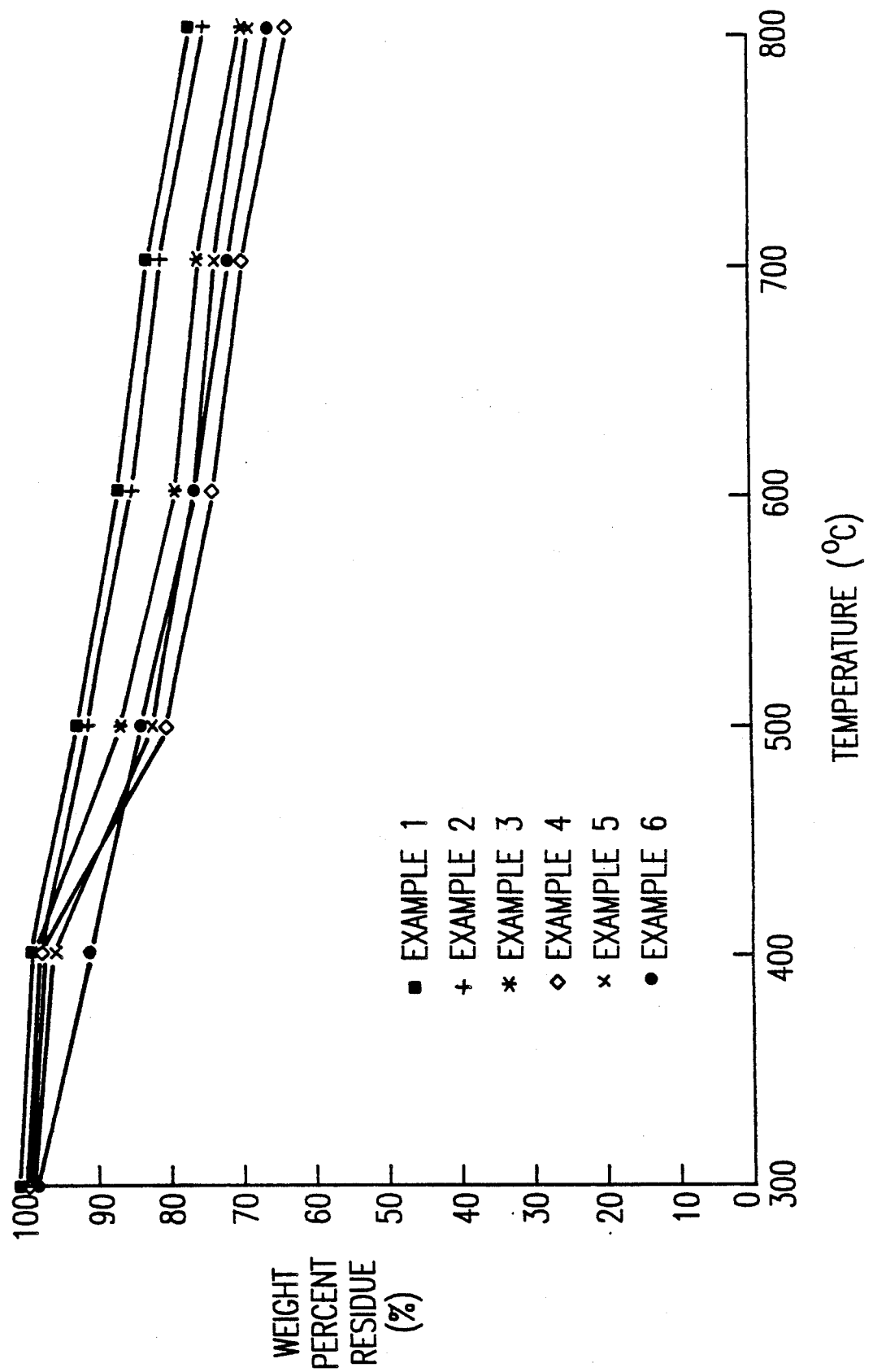
FIG. 41 shows the results of the thermogravimetric analysis for the polymers of Examples 1 to 6.

The weight residual ratio of the powdered polymer was measured by means of a thermogravimetric at a temperature elevation of 10° C. per minute in a nitrogen stream. The results are shown in FIG. 41. All subsequent thermogravimetric analyses were carried out under these conditions.

The glass transition temperature of this polymer obtained by the TBA method was 235° C. (All subsequent glass transition temperatures (Tg) were obtained by the TBA method).

The elemental analysis values of the product were as follows:

|  | C | H | N | P |
| --- | --- | --- | --- | --- |
| Theoretical value (wt %) | 67.38 | 3.92 | 15.11 | 6.68 |
| Analytical value (wt %) | 67.11 | 3.90 | 14.96 | 6.53 |

EXAMPLES 2-11

Various types of diamines were used in place of the p-phenylenediamine of Example 1. Polymers were cured in the same way as in Example 1 to obtain the results shown in Table 1.

TABLE 1

| | CPC*1 | | Diamines | | Curing Conditions | | Polymers | |
| --- | --- | --- | --- | --- | --- | --- | --- | --- |
| Examples | Kind | Amount (g) | Compound name | Amount (g) | Temp. (°C.) | Period (Hr) | Color | Tg (°C.) |
| 2 | p-HBA/3PNC | 2.87 | m-phenylenediamine | 0.92 | 200 | 1 | Brown | 180 |
| 3 | " | " | 4,4'-diaminodiphenyl-methane | 1.80 | Room Temp. | 10 | Light Yellow | 205 |
| 4 | " | " | 4,4'-diaminodiphenyl ether | 2.00 | 200 | 1 | Brown | 175 |
| 5*2 | " | " | 4,4'-diaminodiphenyl- | 2.40 | " | " | Light brown | 195 |

TABLE 1-continued

| Examples | CPC*[1] Kind | Amount (g) | Diamines Compound name | Amount (g) | Curing Conditions Temp. (°C.) | Period (Hr) | Polymers Color | Tg (°C.) |
|---|---|---|---|---|---|---|---|---|
| 6 | " | " | sulfone m-xylylenediamine | 1.36 | " | " | Light brown | 125 |
| 7 | " | " | tolylene-2,4-diamine | 1.11 | " | " | Yellow | 134 |
| 8 | " | " | 1,5-diaminoanthraquinone | 2.38 | " | " | Red | 240 |
| 9 | " | " | hexamethylenediamine | 1.16 | " | " | Colorless | 122 |
| 10 | " | " | 2,6-diaminopyridine | 0.85 | " | " | Light yellow | 290 |
| 11 | " | " | o-tolidine | 2.30 | " | " | Brown | 168 |

*[1]Cyclic phosphonitrillic compounds
*[2]Use acetone as a solvent

Figure 42:
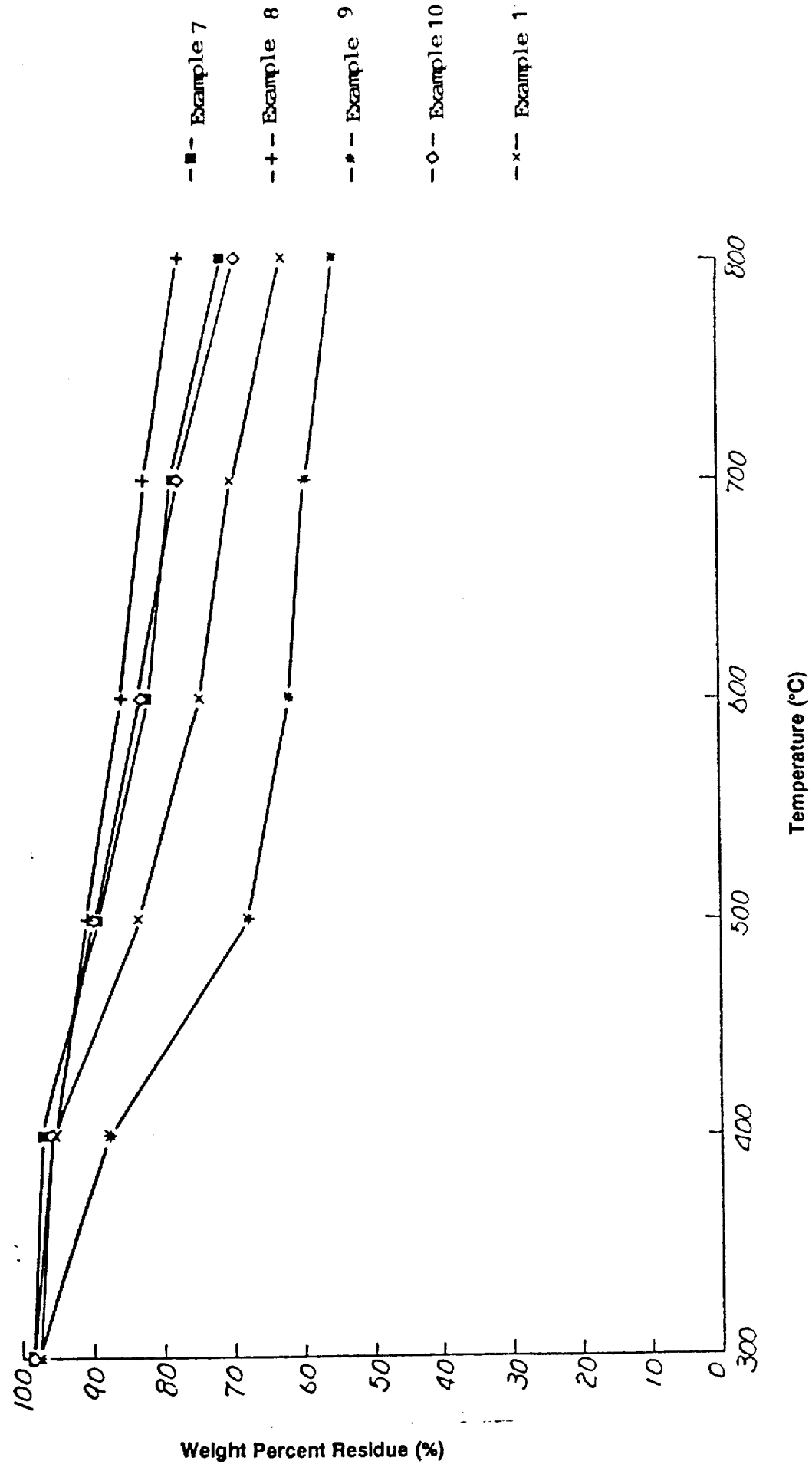
FIG. 42 shows the results of the thermogravimetric analysis for the polymers of Examples 7 to 11.

The IR spectra of these polymers are shown in FIGS. 2–11. The results of the thermogravimetric analysis are shown in FIGS. 41 and 42.

Since in Example 9 the reaction proceeded so fast that cross-linked density was elevated instantaneously, it was difficult to form a film.

The results of the elemental analysis of the products of Examples 4, 6, and 8 are shown in Table 2.

TABLE 2

| Examples | Theoretical value (wt %) C | H | N | P | Analytical value (wt %) C | H | N | P |
|---|---|---|---|---|---|---|---|---|
| 4 | 70.47 | 4.05 | 10.81 | 4.78 | 69.88 | 3.85 | 10.71 | 4.85 |
| 6 | 69.35 | 5.04 | 13.48 | 5.96 | 69.51 | 4.82 | 13.35 | 5.91 |
| 8 | 69.71 | 3.06 | 9.68 | 4.28 | 68.70 | 2.91 | 9.58 | 4.25 |

EXAMPLE 12

2.87 g of hexa(2-formylphenoxy)cyclotriphosphazene (hereinafter referred to as o-HBA/3PNC) prepared by reacting o-hydroxybenzaldehyde and cyclophosphonitrilic chloride trimer was dissolved in 40 ml of chloroform. To this solution 1.22 g of tolylene-2,4-diamine was added. The solution immediately turned into a clear yellow solution.

A part of this solution was spread evenly over a glass plate and cured by allowing the solvent to evaporate at room temperature to obtain a hard film of a light yellow polymer. After a two-hour heating in air at 200° C., the system was immersed in water, thereby producing a light yellow, flexible, transparent film which was peeled off from the glass plate.

Figure 12:
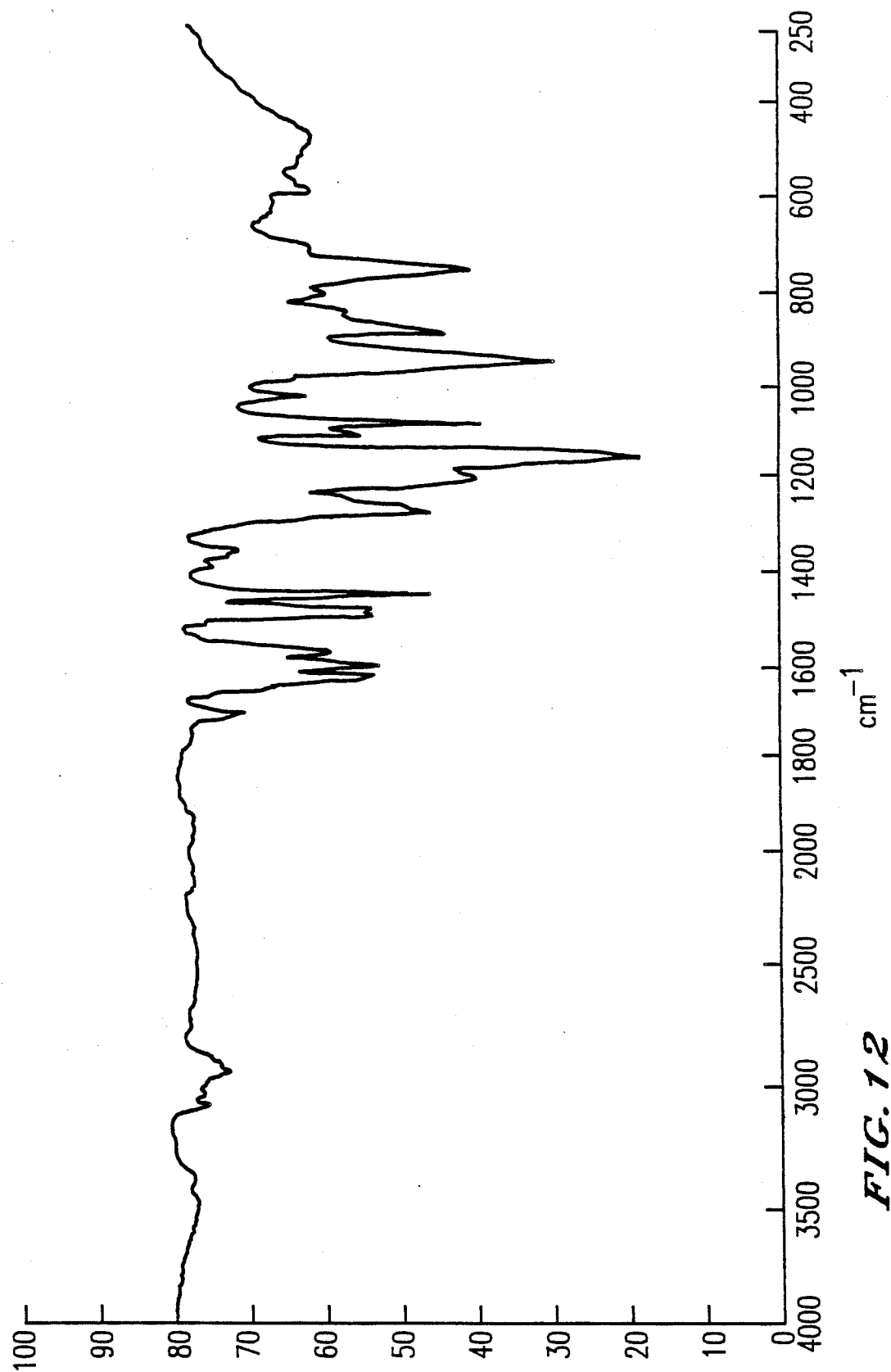
Figure 13:
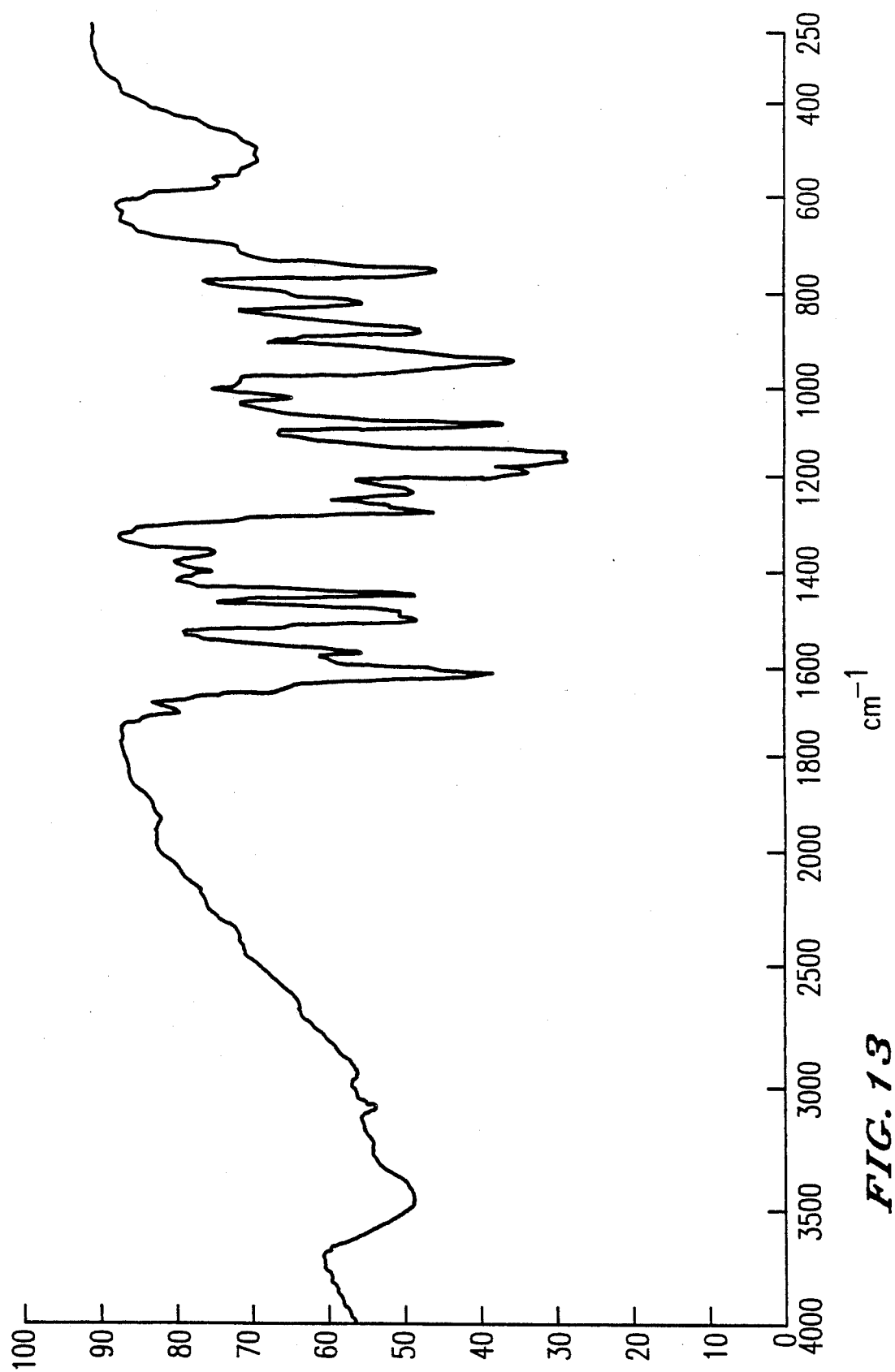
Figure 14:
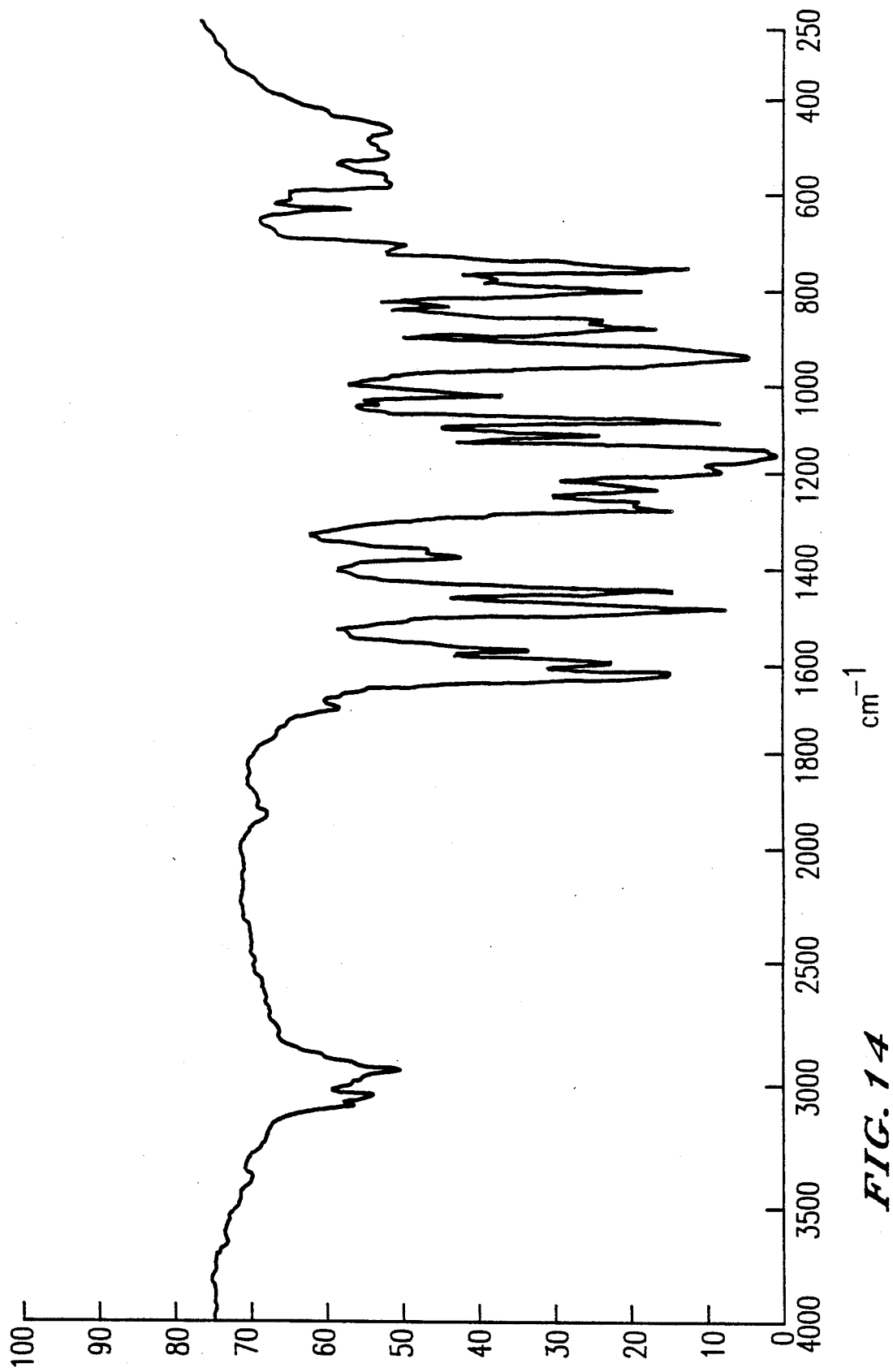
Figure 15:
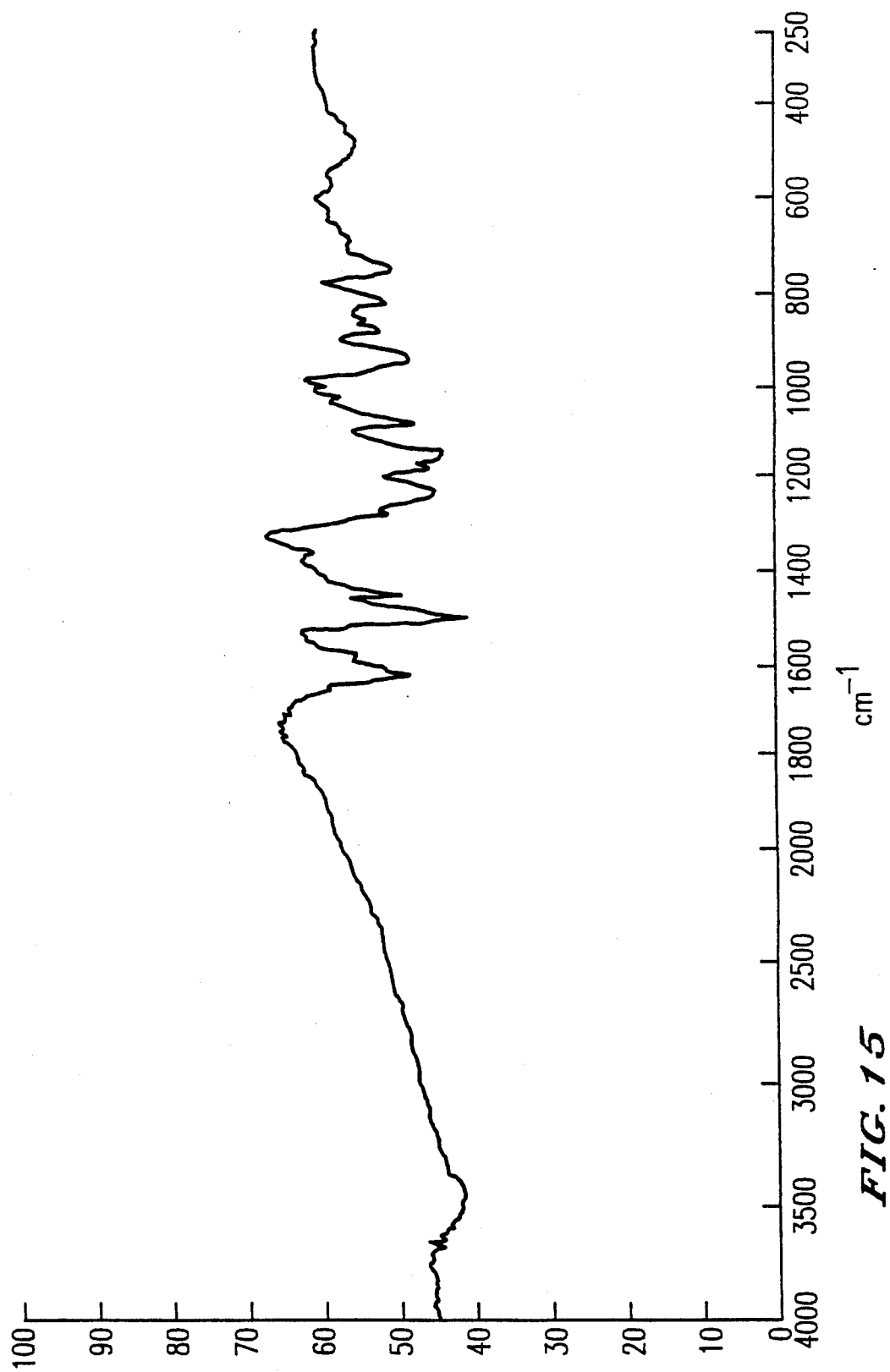
Figure 16:
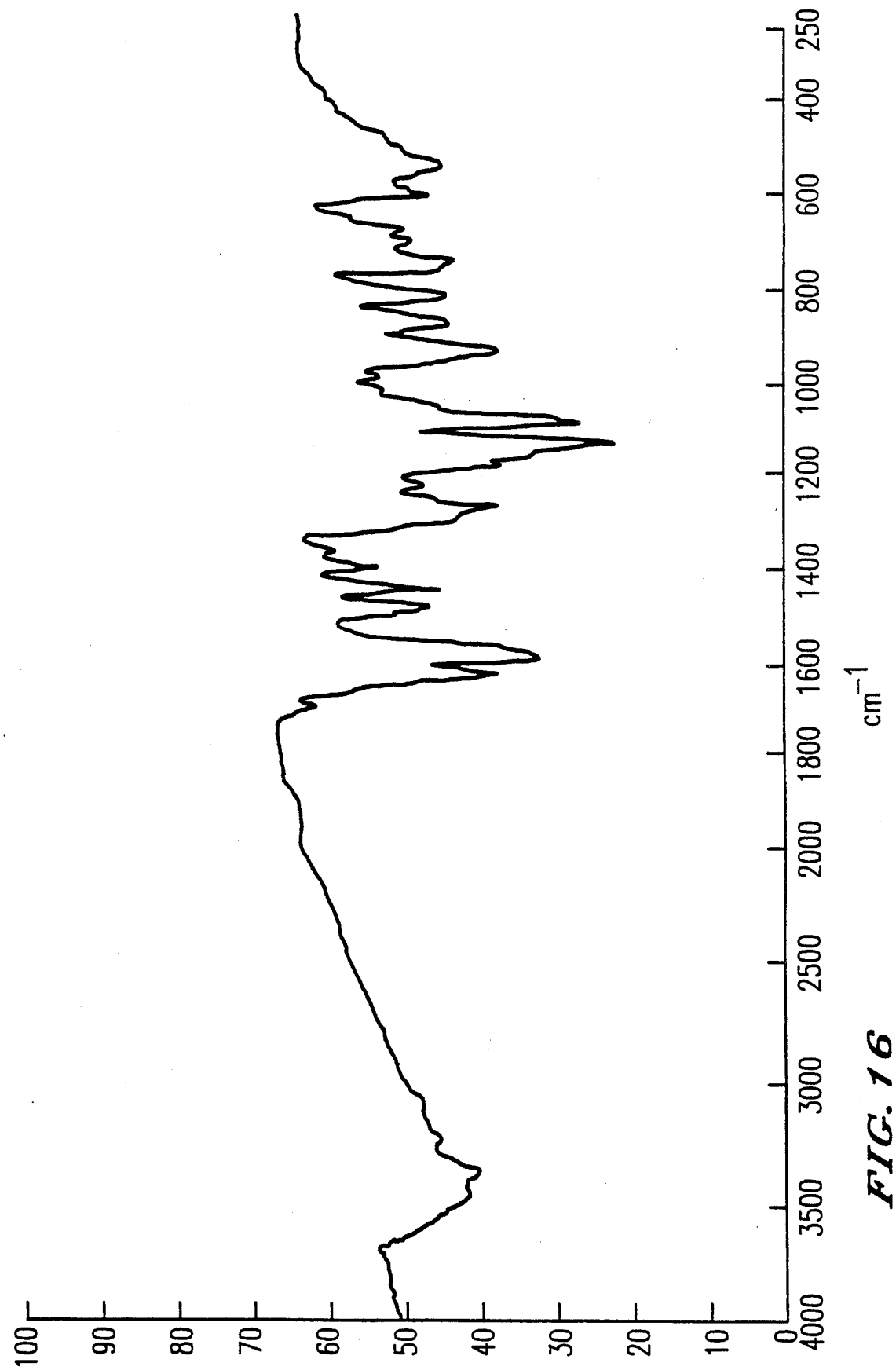
Figure 17:
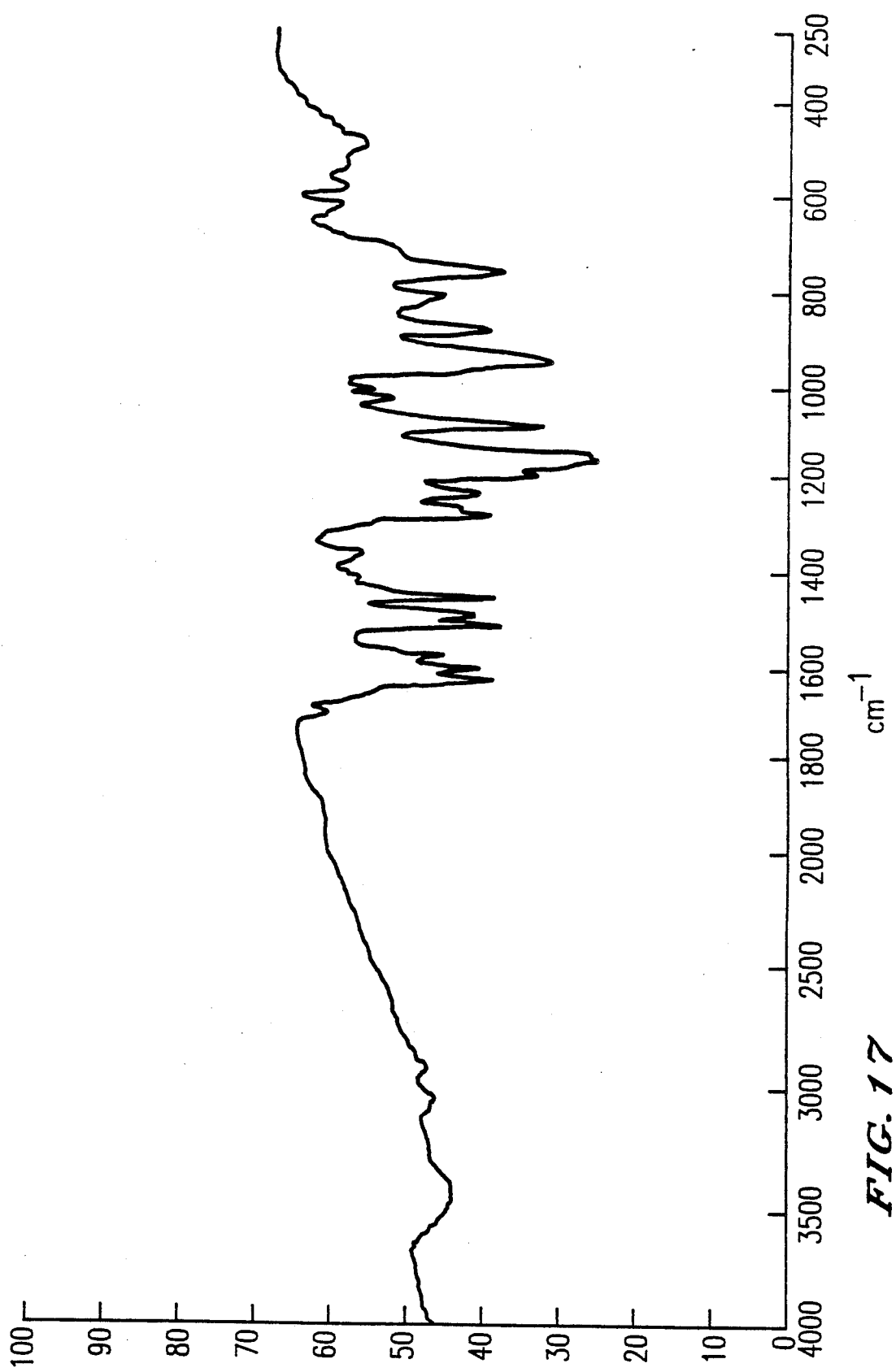
Figure 18:
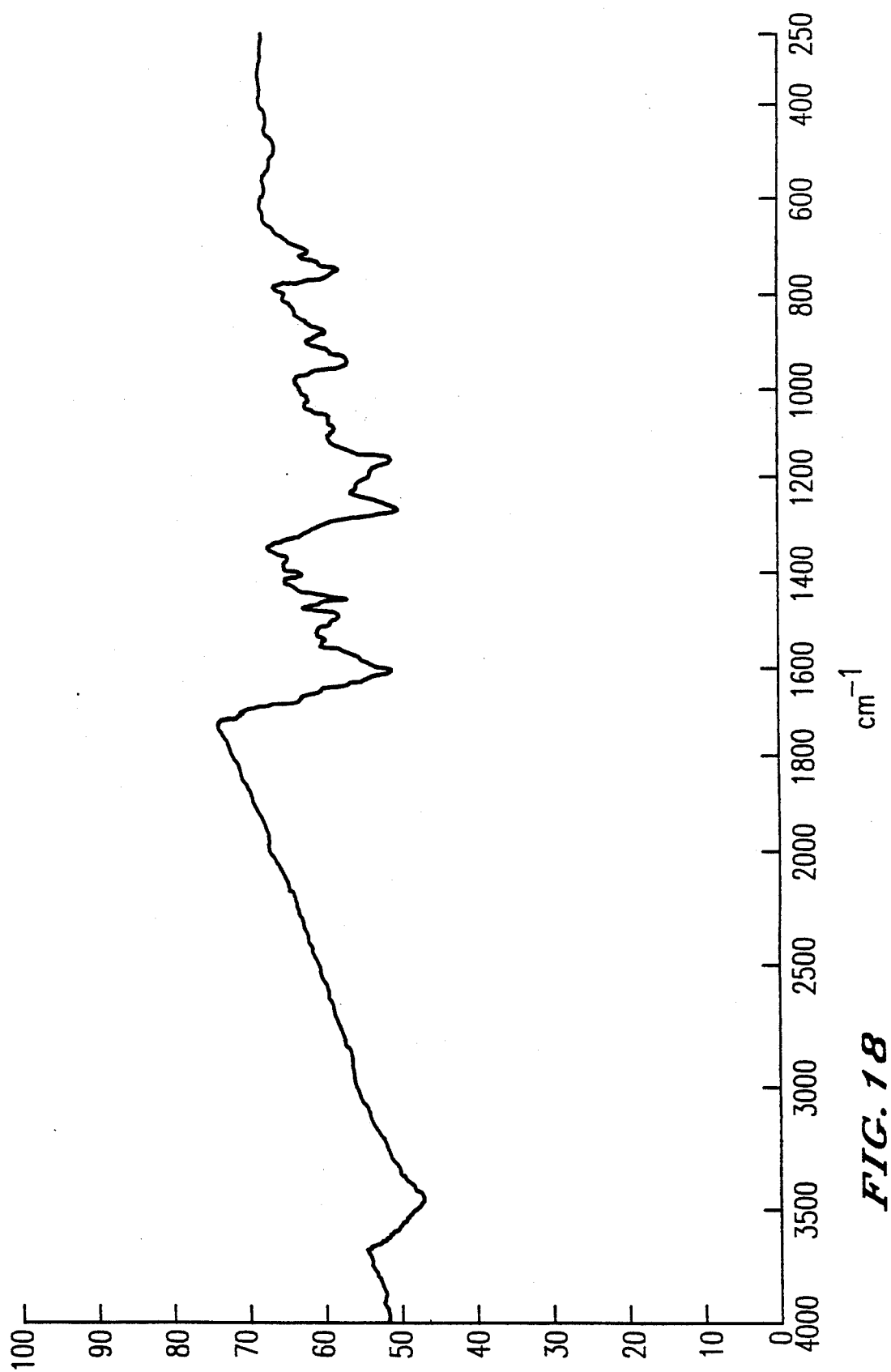
Figure 19:
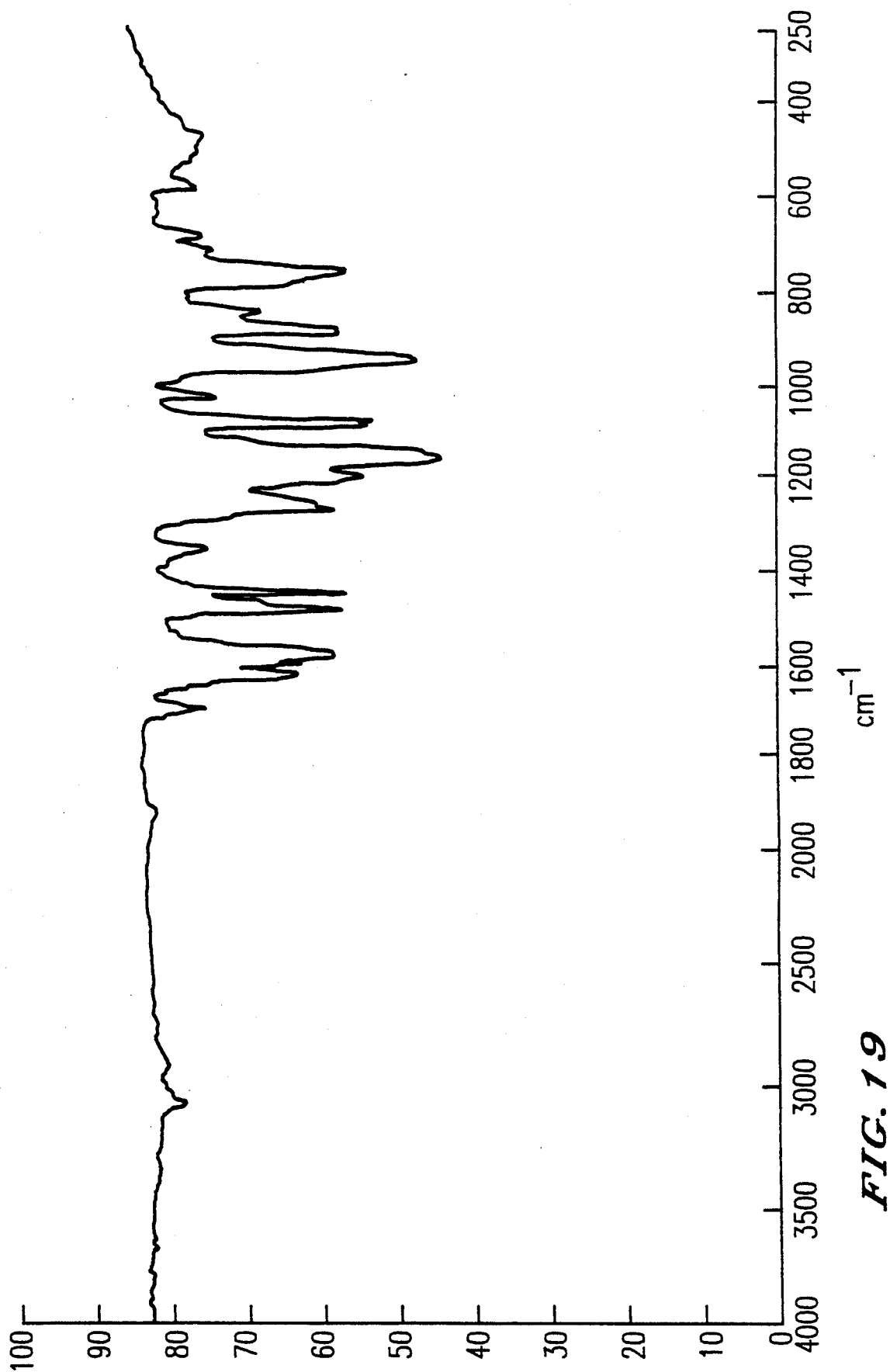
Figure 20:
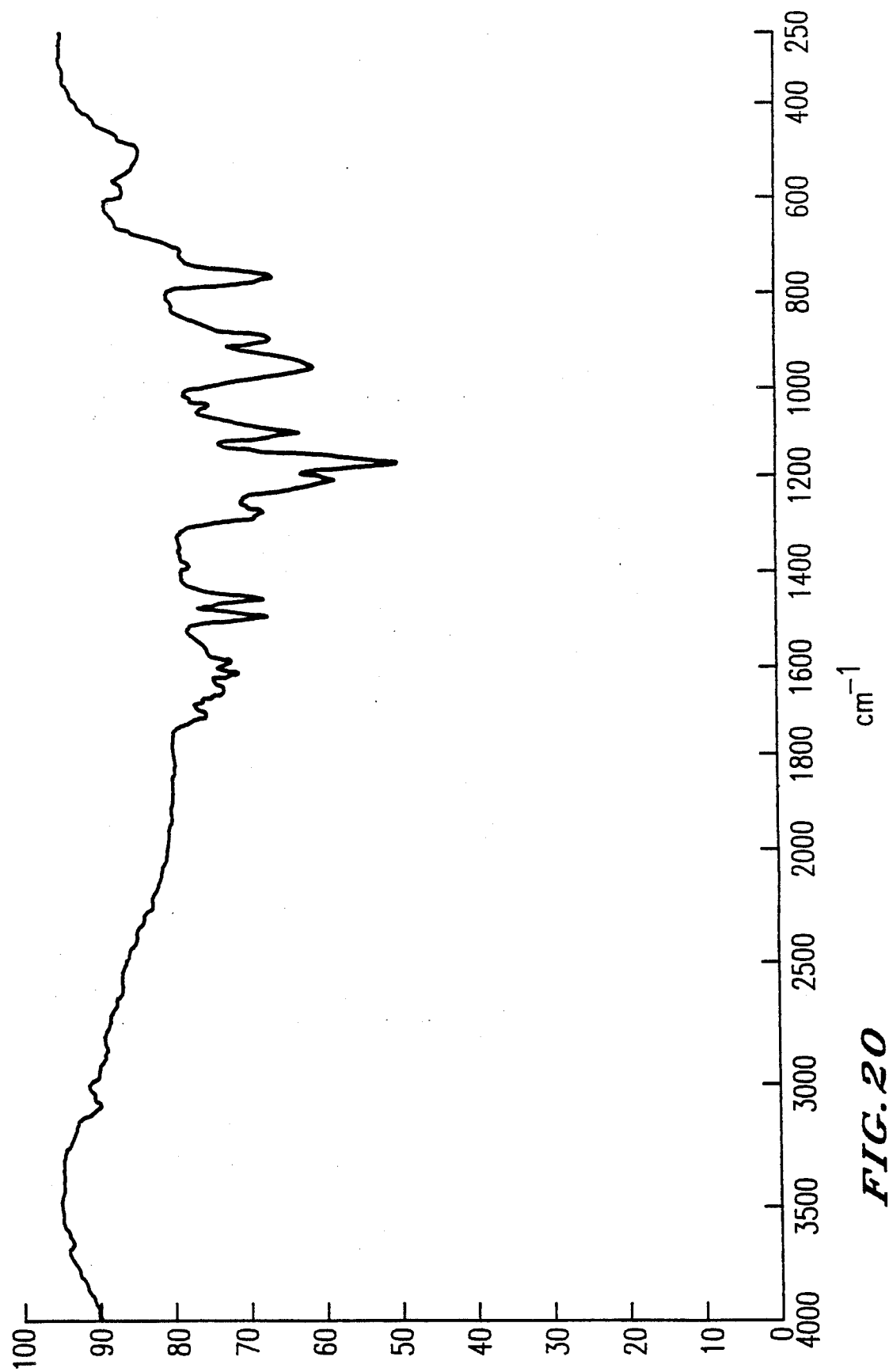
Figure 21:
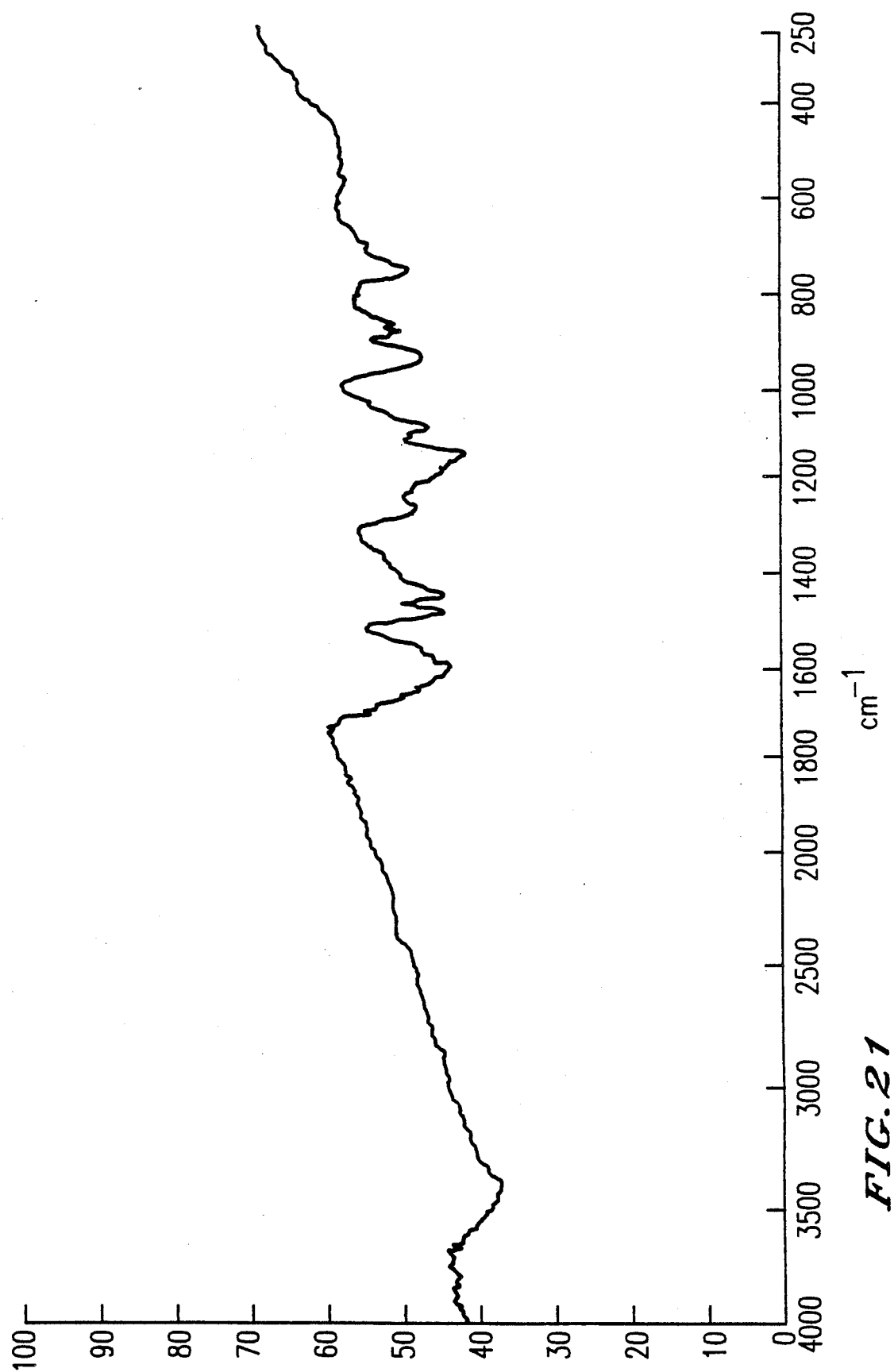
Figure 22:
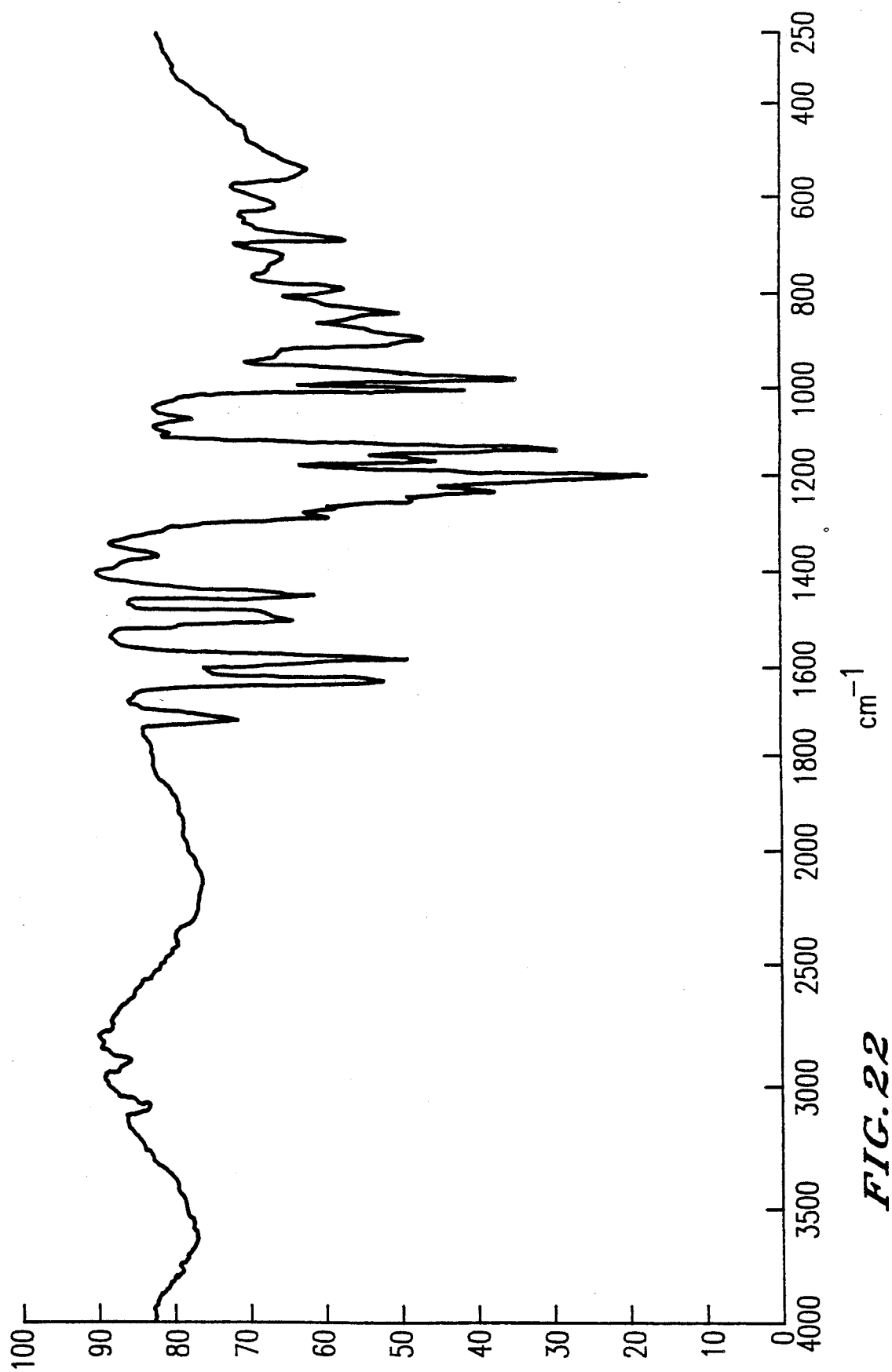
Figure 23:
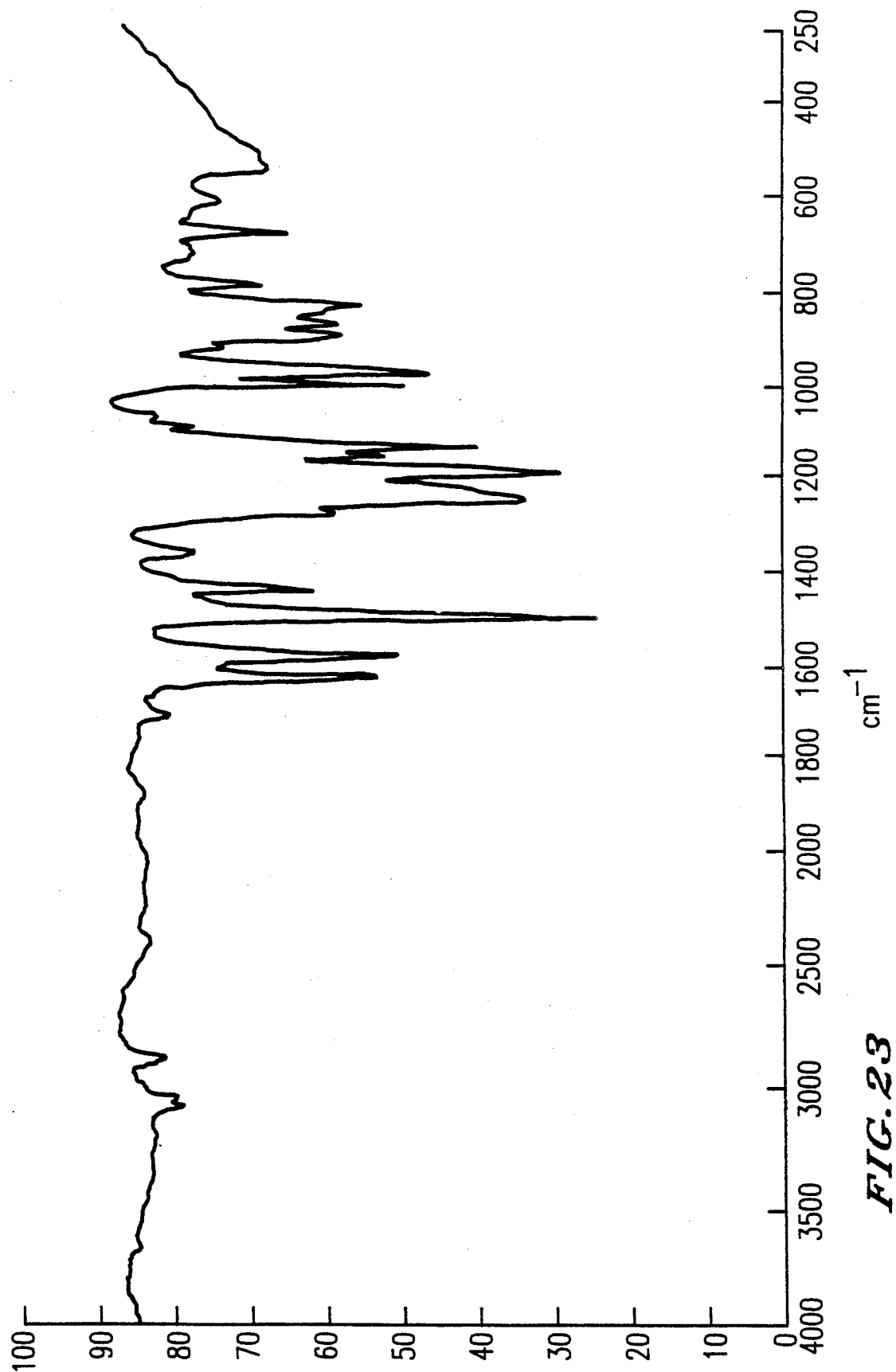
Figure 24:
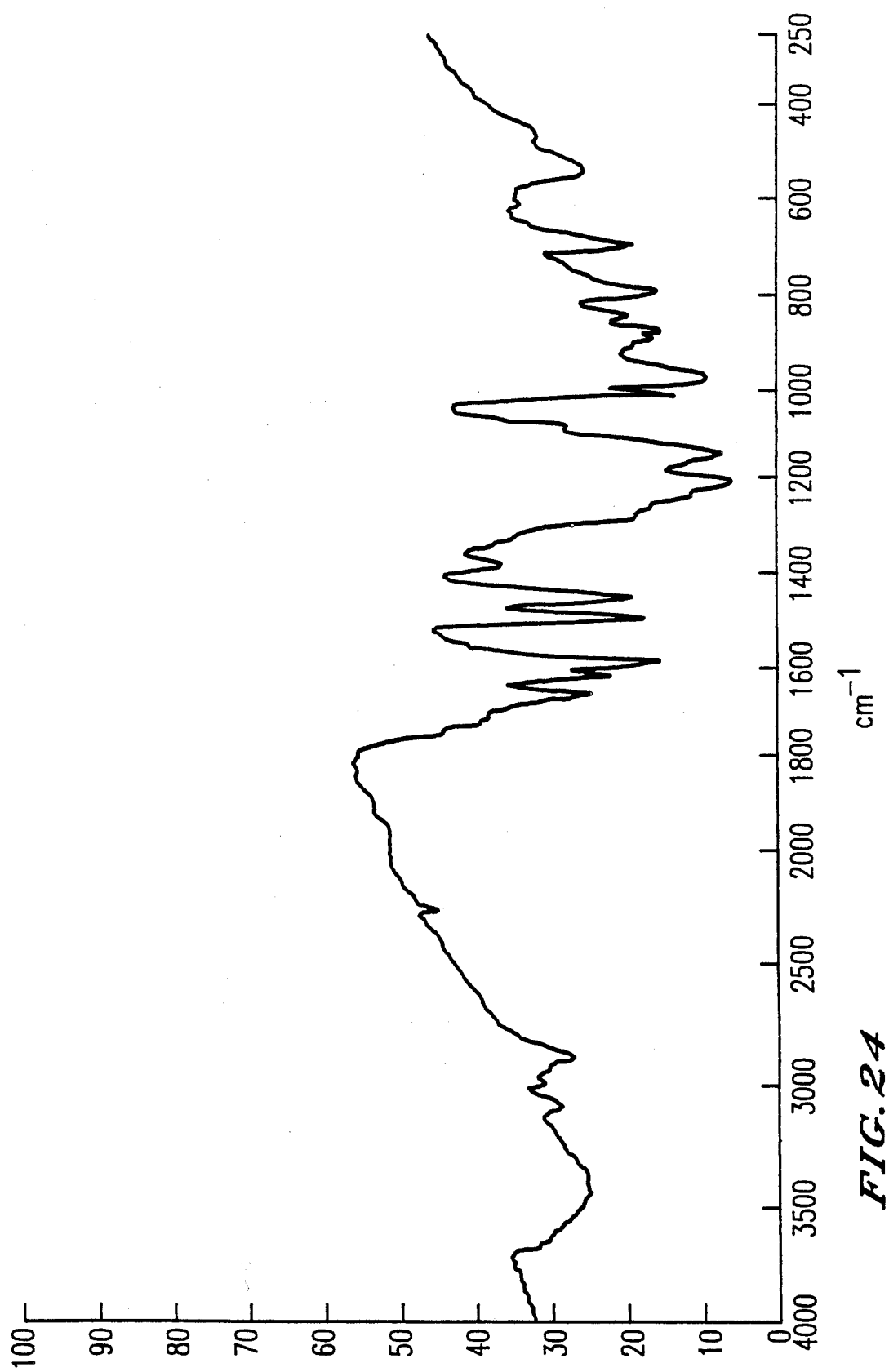
Figure 25:
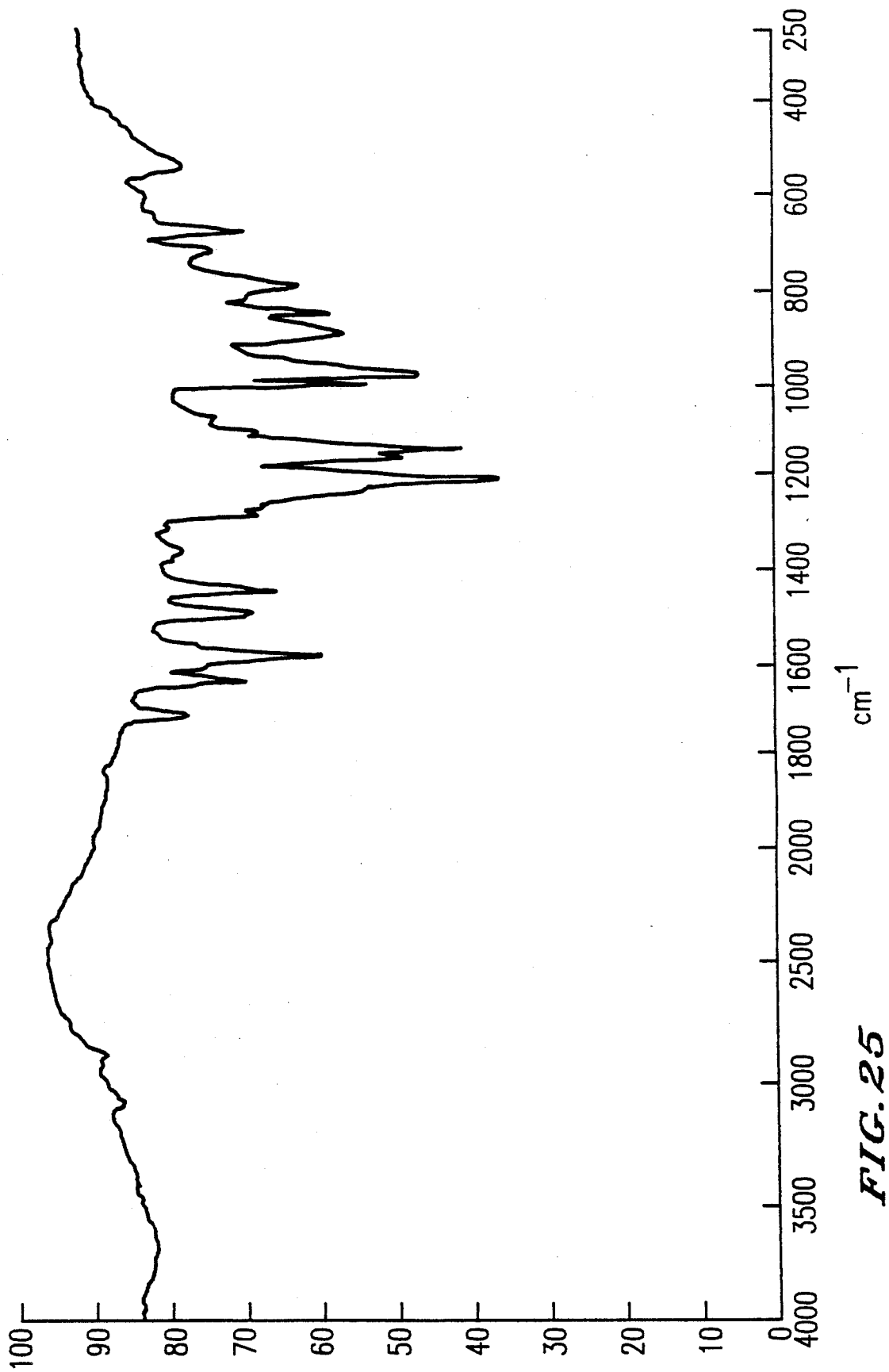
Figure 26:
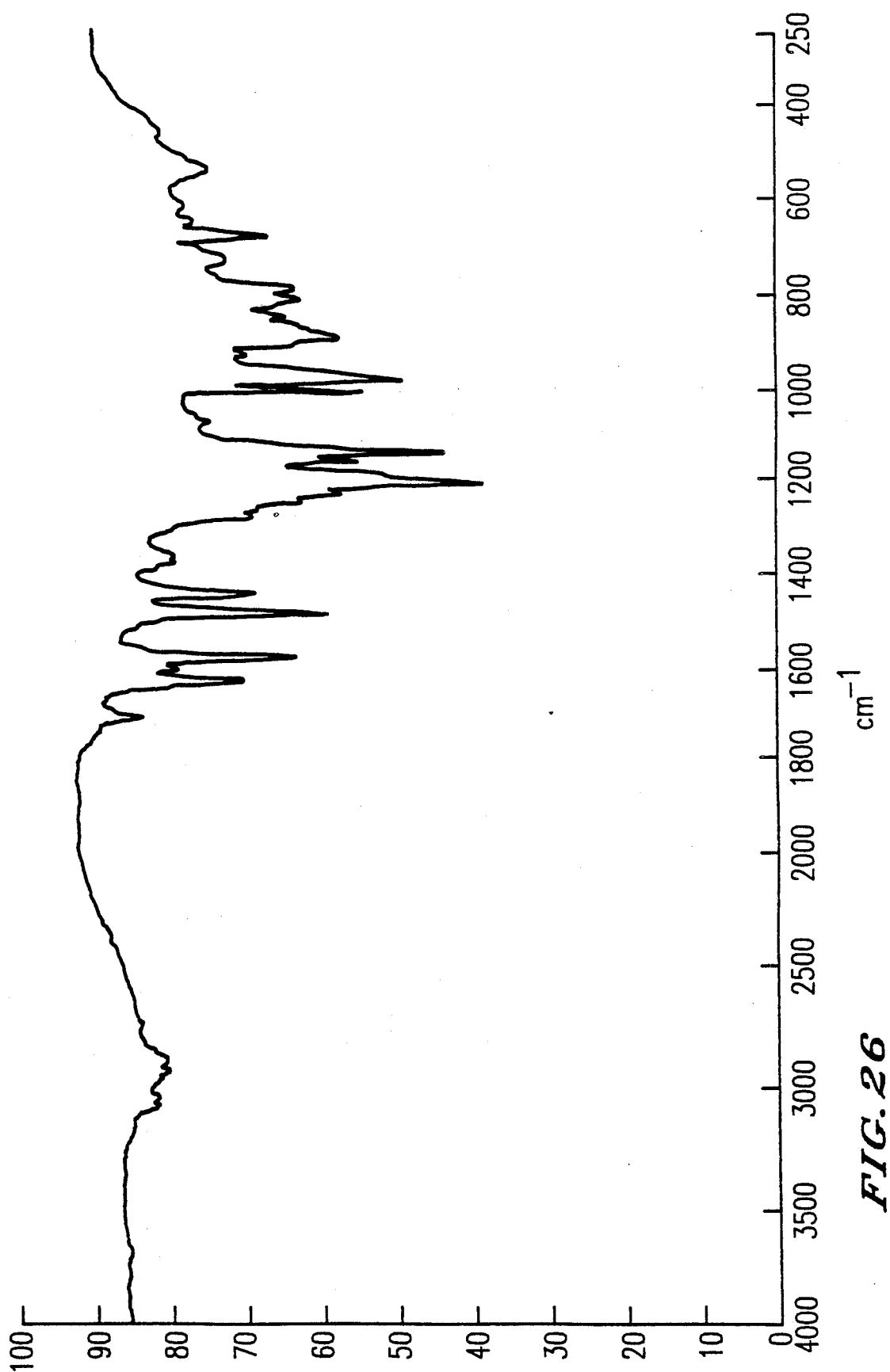
Figure 27:
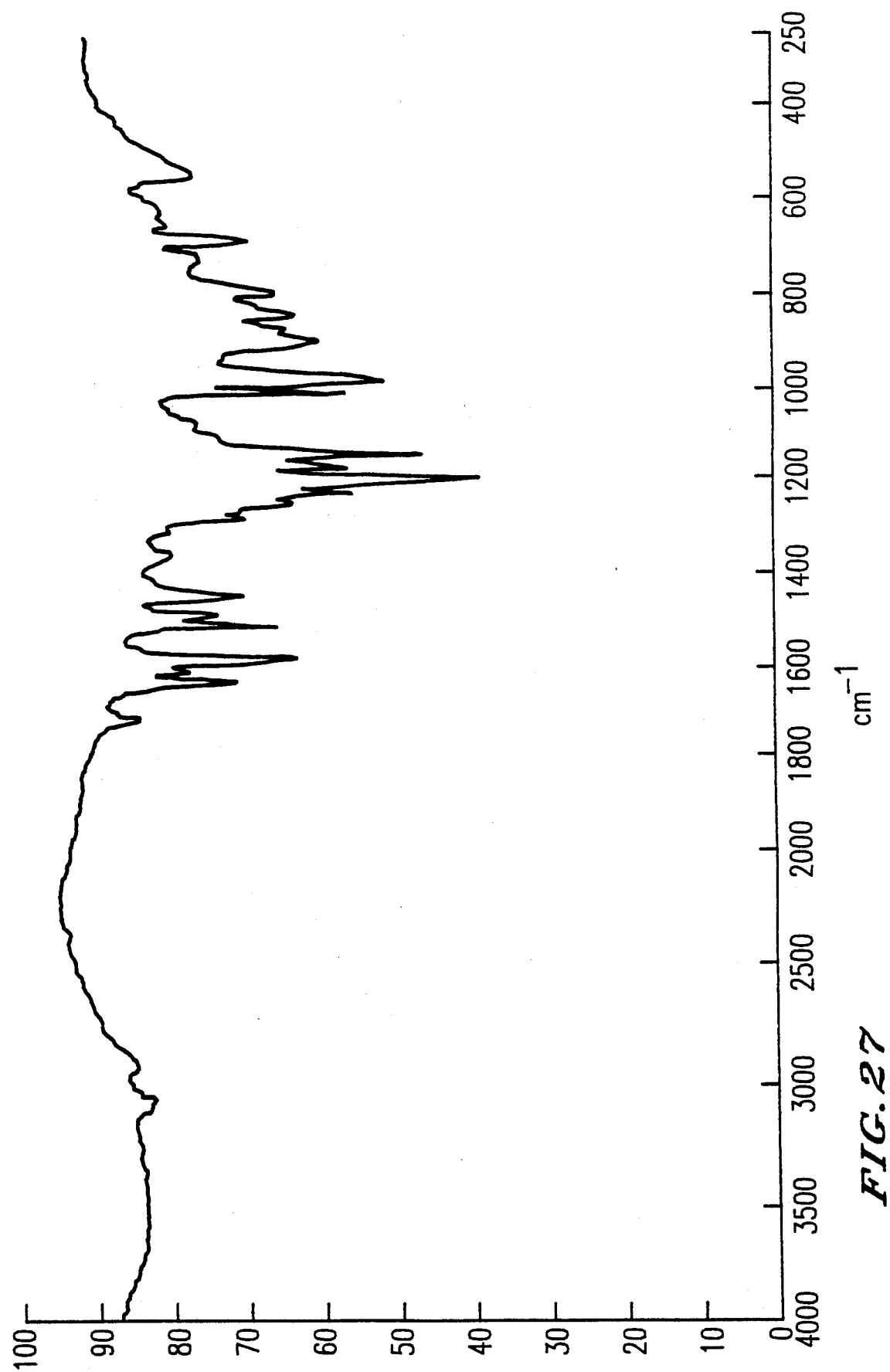

The IR spectrum is shown in FIG. 12. The N—H stretching vibration of the amine (3400, 3340 cm$^{-1}$) and the C=O stretching vibration of the aldehyde (1705 cm$^{-1}$) almost disappeared, and instead the C=N stretching vibration based on the Schiff base appeared at 1630 cm$^{-1}$.

Figure 43:
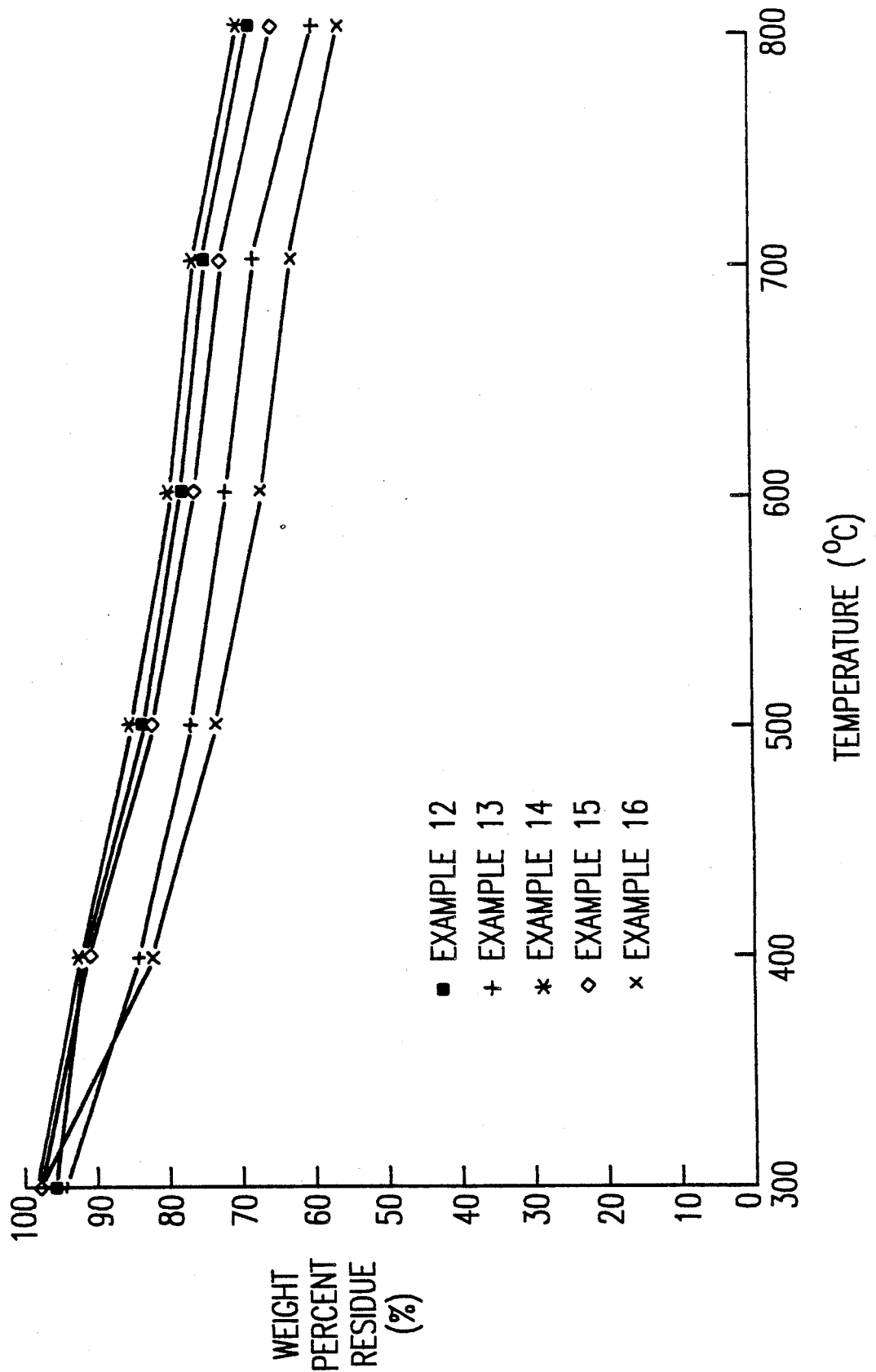
FIG. 43 shows the results of the thermogravimetric analysis for the polymers of Examples 12 to 16.

The results of the thermogravimetric analysis are shown in FIG. 43. The glass transition temperature of this polymer was 330° C.

The elemental analysis values of the product are as follows:

| | C | H | N | P |
|---|---|---|---|---|
| Theoretical value (wt %) | 68.42 | 4.51 | 14.25 | 6.30 |
| Analytical value (wt %) | 68.33 | 4.11 | 14.12 | 6.40 |

EXAMPLES 13–21

Various types of diamines were used in place of the tolylene-2,4-diamine of Example 12. The resins were cured in the same way as in Example 12 to obtain the results shown in Table 3.

TABLE 3

| Examples | CHC*[1] Kind | Amount (g) | Diamines Compound name | Amount (g) | Curing Conditions Temp. (°C.) | Period (Hr) | Polymers Color | Tg (°C.) |
|---|---|---|---|---|---|---|---|---|
| 13 | o-HBA/3PNC | 2.87 | p-phenylenediamine | 1.08 | 150 | 1 | Light yellow | 340 |
| 14 | " | " | o-tolidine | 2.12 | 200 | 11 | Light yellow | 285 |
| 15 | " | " | 4,4'-diaminodiphenyl ether | 2.00 | " | " | Light yellow | 290 |
| 16 | " | " | 4,4'-diaminodiphenylsulfone | 2.48 | " | " | Light yellow | 300 |
| 17 | " | " | 4,4'-diaminodiphenylmethane | 1.98 | Room temp. | 5 | Light yellow | 320 |
| 18 | " | " | 1,5-diaminoanthraquinone | 2.38 | 200 | 1 | Red brown | 350 |
| 19 | " | " | m-phenylenediamine | 1.10 | " | " | Light yellow | 330 |
| 20 | " | " | m-xylylenediamine | 1.42 | " | " | Light yellow | 250 |
| 21 | " | " | 2,6-diaminopyridine | 1.15 | " | " | Brown | 345 |

*[1]Cyclic phosphonitrilic compounds

Figure 44:
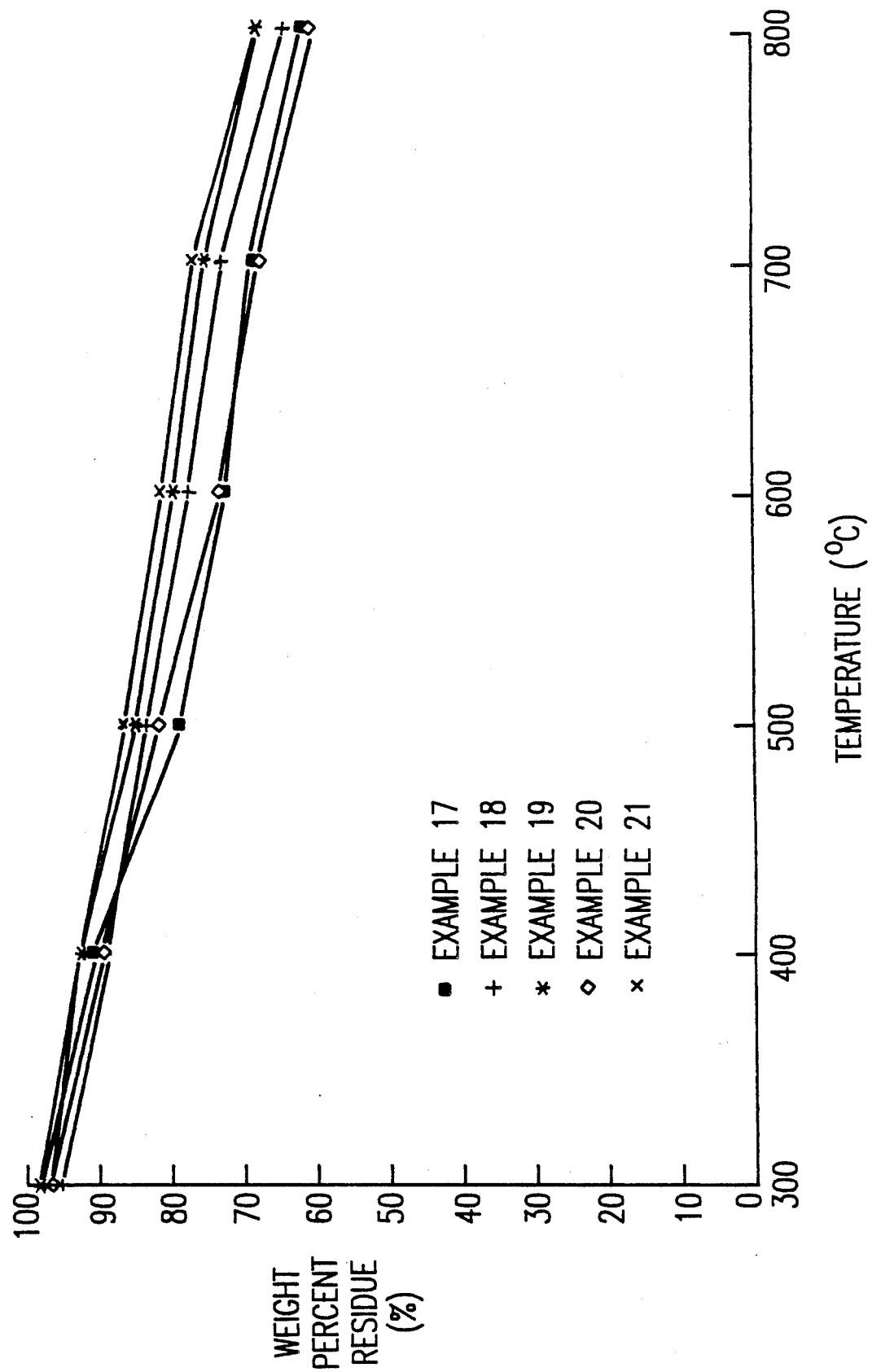
FIG. 44 shows the results of the thermogravimetric analysis for the polymers of Examples 17 to 21.

The IR spectra of these polymers are shown in FIGS. 13–21. The results of the thermogravimetric analysis are shown in FIGS. 43 and 44.

The results of the elemental analysis of the products of Examples 13, 14, 15, 17, 18 and 21 are shown in Table 4.

TABLE 4

| Examples | Theoretical value (wt %) C | H | N | P | Analytical value (wt %) C | H | N | P |
|---|---|---|---|---|---|---|---|---|
| 13 | 67.38 | 3.92 | 15.11 | 6.68 | 67.20 | 3.84 | 15.00 | 6.71 |
| 14 | 75.10 | 5.10 | 10.43 | 4.61 | 74.59 | 5.01 | 10.21 | 4.71 |
| 15 | 70.47 | 4.05 | 10.81 | 4.78 | 69.98 | 3.91 | 10.53 | 4.69 |
| 17 | 74.64 | 4.70 | 10.88 | 4.81 | 74.61 | 4.60 | 10.79 | 4.79 |
| 18 | 69.71 | 3.06 | 9.68 | 4.28 | 69.91 | 2.81 | 9.56 | 4.19 |
| 21 | 61.94 | 3.47 | 21.07 | 6.66 | 60.71 | 3.29 | 20.73 | 6.59 |

EXAMPLES 22–27

In place of the hexa(4-formylphenoxy)cyclotriphosphazene of Example 1, 2.87 g of hexa(3-formylphenoxy)cyclotriphosphazene (hereinafter referred to as m-HBA/3PNC) obtained by reacting m-hydroxybenzaldehyde and cyclic phosphonitrilic chloride trimer was used, and in place of p-phenylenediamine, various types of diamine were used. Otherwise the method of curing was the same as in Example 1. The results obtained are shown in Table 5.

TABLE 5

| Examples | CHC*1 Kind | CHC*1 Amount (g) | Diamines Compound name | Diamines Amount (g) | Curing Conditions Temp. (°C.) | Curing Conditions Period (Hr) | Polymers Color | Polymers Tg (°C.) |
| --- | --- | --- | --- | --- | --- | --- | --- | --- |
| 22 | m-HBA/3PNC | 2.87 | p-phenylenediamine | 1.08 | 200 | 2 | Yellow | 250 |
| 23 | " | " | 4,4'-diaminodiphenyl ether | 2.20 | " | 1 | Light yellow | 195 |
| 24 | " | " | m-xylylenediamine | 1.20 | " | " | Light yellow | 142 |
| 25 | " | " | tolylene-2,4-diamine | 1.40 | " | " | Light brown | 260 |
| 26 | " | " | o-tolidine | 2.31 | " | " | Yellow | 220 |
| 27 | " | " | 4,4'-diaminodiphenylmethane | 2.00 | " | " | Light brown | 220 |

*1 Cyclic phosphonitrilic compounds

Figure 45:
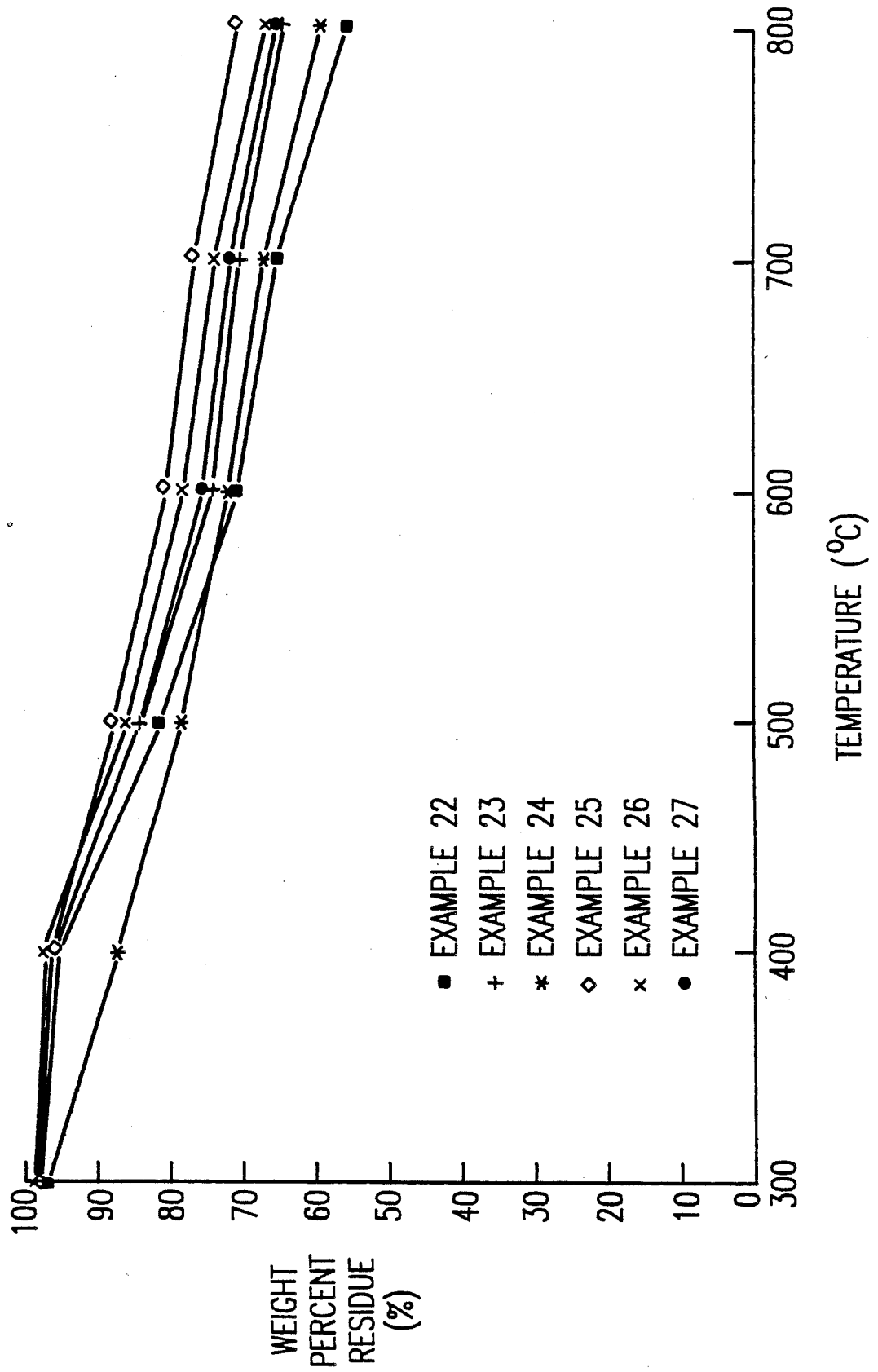
FIG. 45 shows the results of the thermogravimetric analysis for the polymers of Examples 22 to 27.

The IR spectra of these polymers are shown in FIGS. 22–27. The results of the thermogravimetric analyses are shown in FIG. 45.

The results of the elemental analysis of the product of Example 22 are as follows:

| | C | H | N | P |
| --- | --- | --- | --- | --- |
| Theoretical value (wt %) | 67.38 | 3.92 | 15.11 | 6.68 |
| Analytical value (wt %) | 66.87 | 3.81 | 15.01 | 6.69 |

TABLE 6

| Examples | CHC*1 Kind | CHC*1 Amount (g) | Diamines Compound name | Diamines Amount (g) | Curing Conditions Temp. (°C.) | Curing Conditions Period (Hr) | Polymers Color | Polymers TG (°C.) |
| --- | --- | --- | --- | --- | --- | --- | --- | --- |
| 29 | p-HBA/4PNC | 2.87 | p-phenylenediamine | 1.08 | 200 | 1 | Yellow | 280 |
| 30 | " | " | m-phenylenediamine | 1.08 | " | " | Yellow | 265 |
| 31 | " | " | o-tolidine | 2.12 | " | " | Light yellow | 185 |
| 32 | " | " | 4,4'-diaminodiphenylmethane | 1.98 | " | " | Light yellow | 220 |

*1 Cyclic phosphonitrilic compounds

EXAMPLE 28

2.87 g of m-HBA/3PNC and 0.9 g of m-phenylenediamine were placed in a test tube and the contents were mixed with a spatula while heating at 80° C. The mixture was immediately cured with the release of water to form an infusible polymer.

Figure 28:
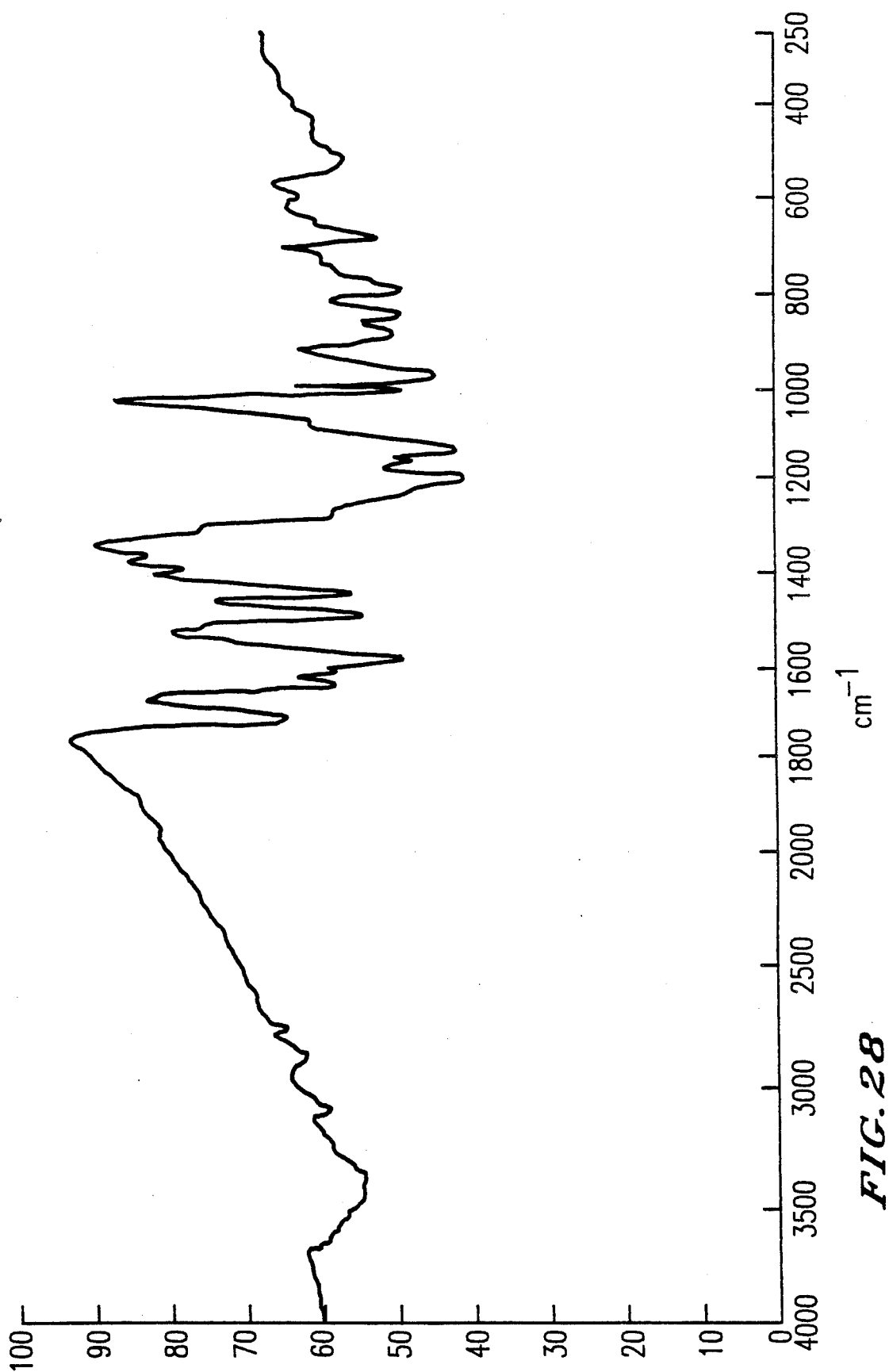
Figure 29:
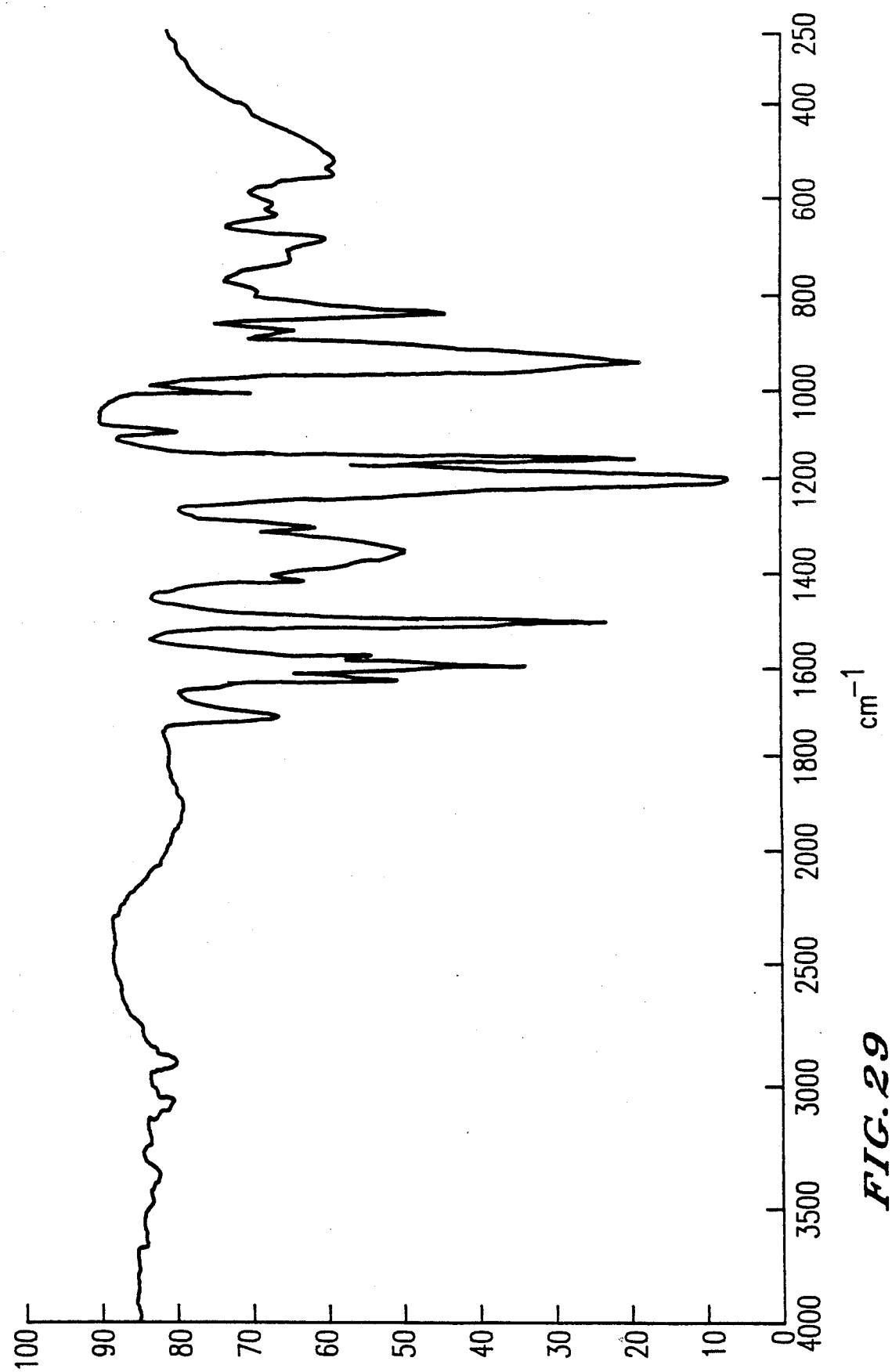
Figure 30:
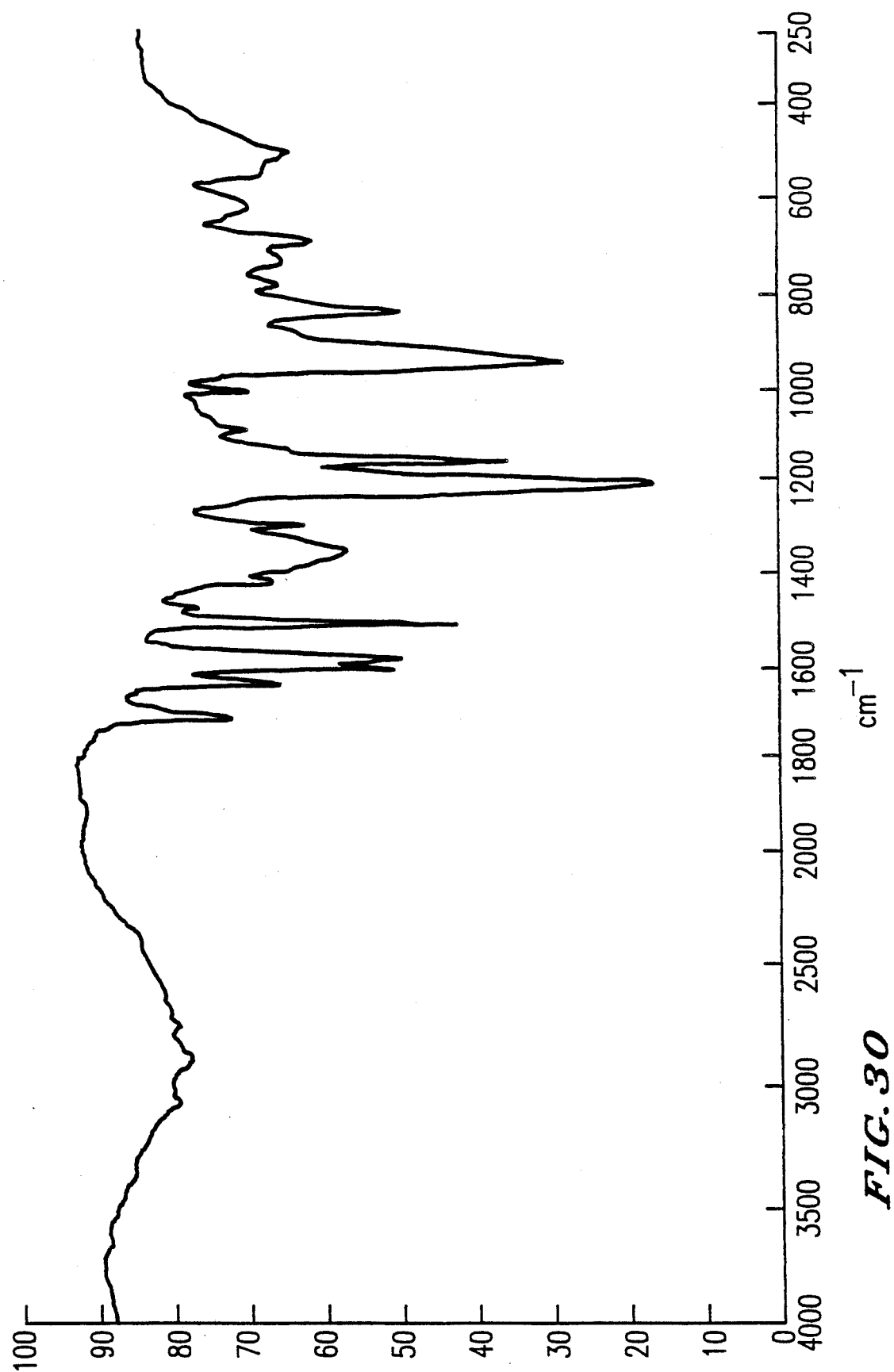
Figure 31:
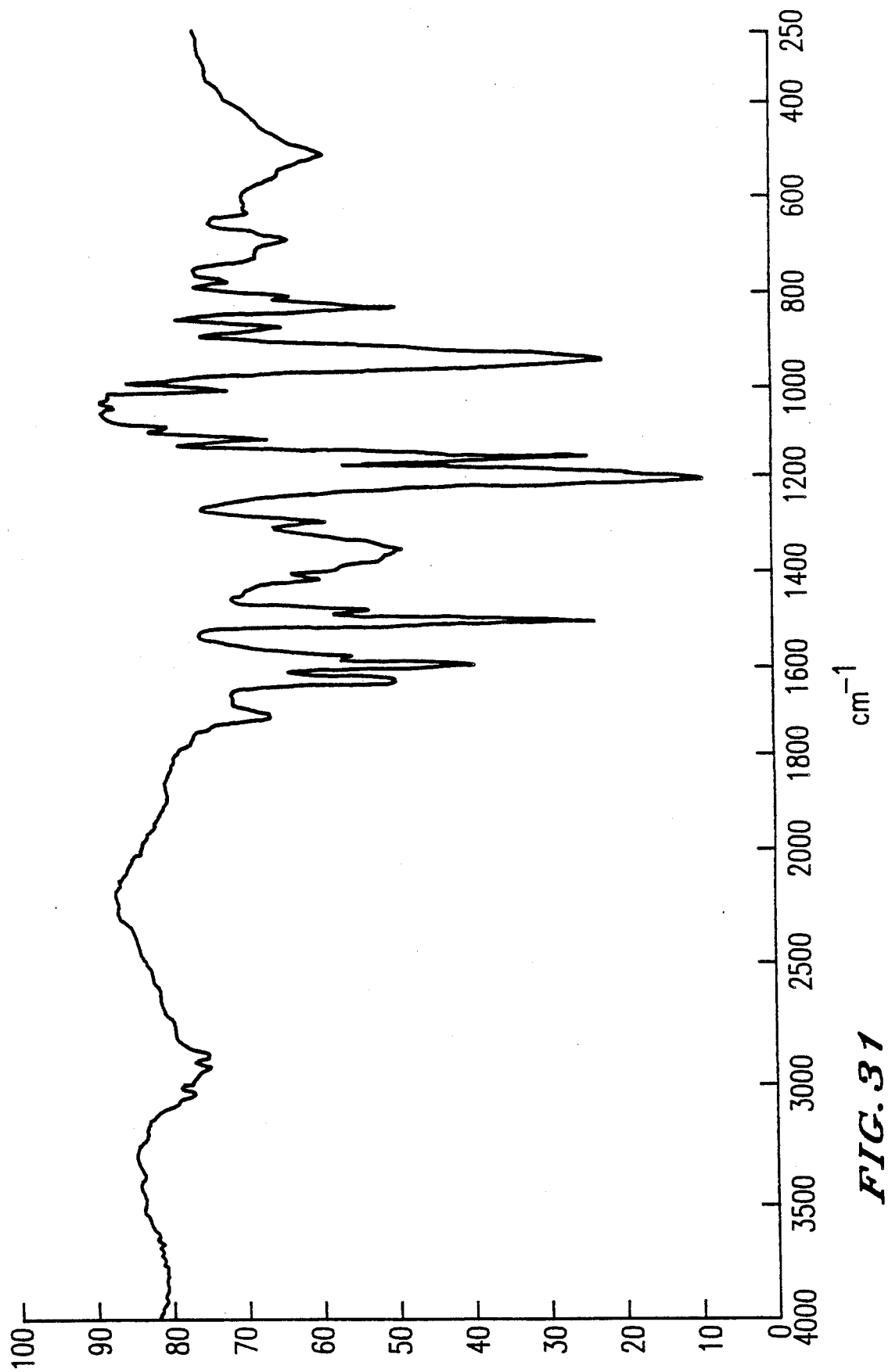
Figure 32:
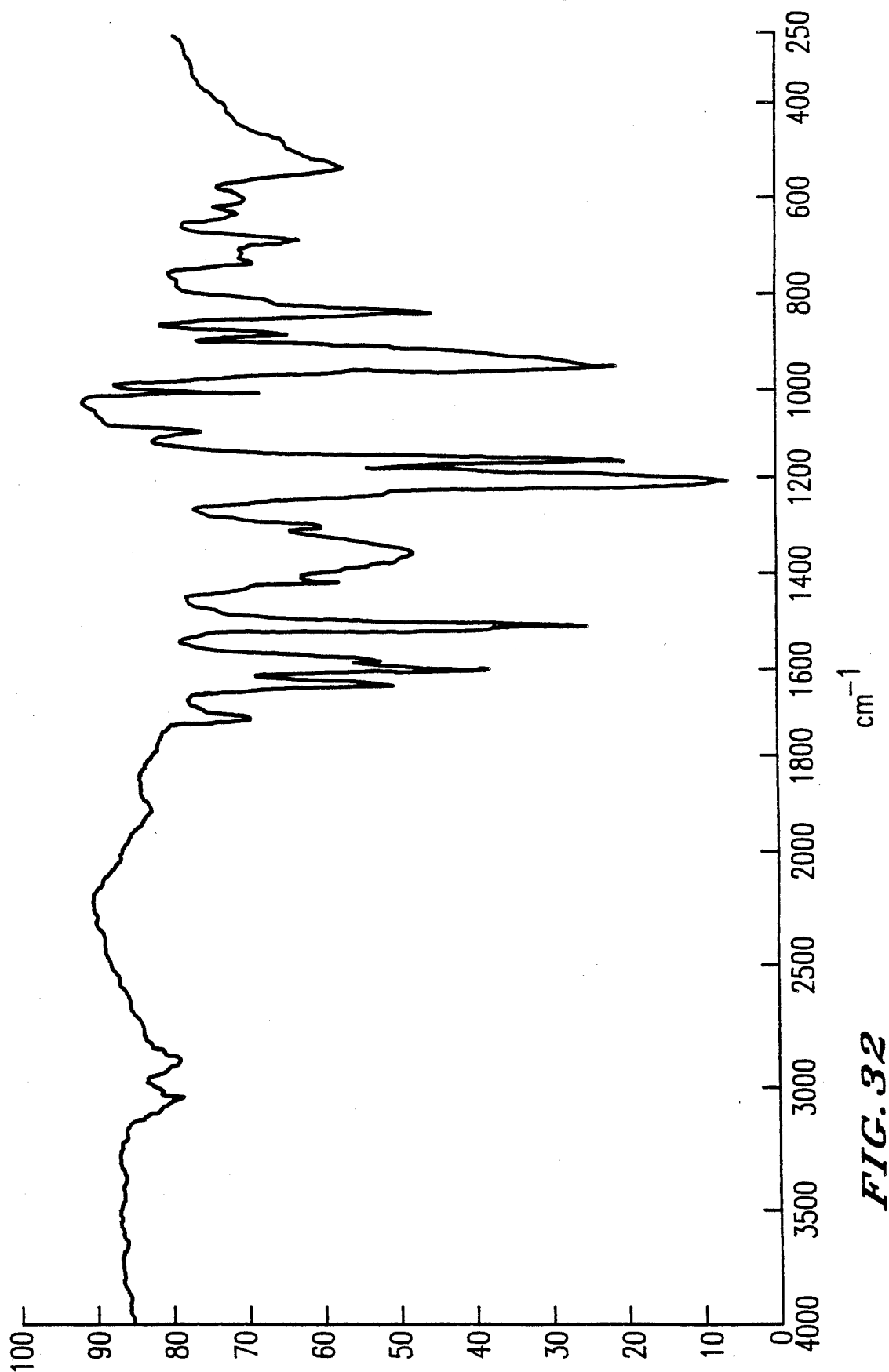
Figure 46:
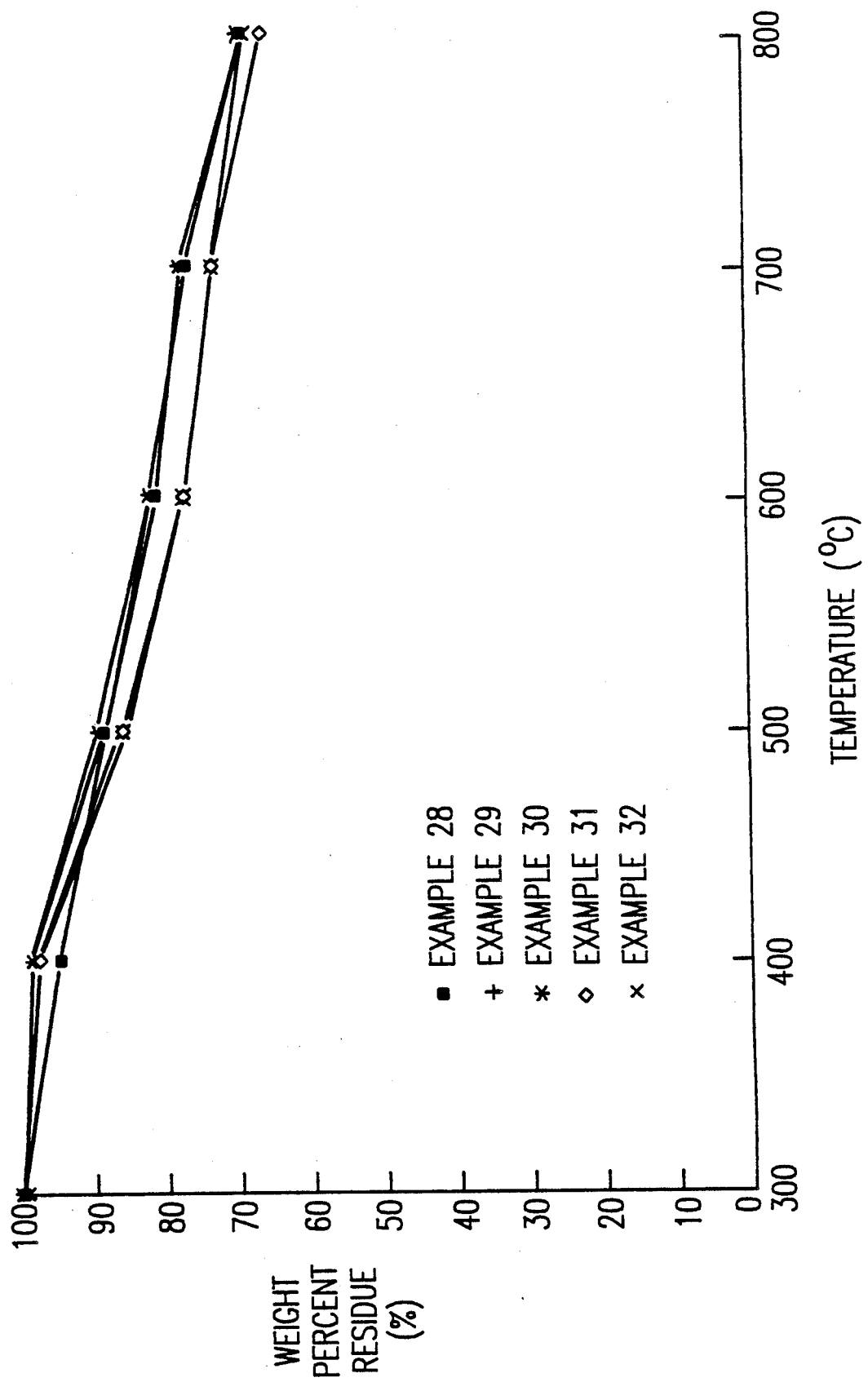
FIG. 46 shows the results of the thermogravimetric analysis for the polymers of Examples 28 to 32.

The polymer for which the IR spectrum is shown in FIG. 28 was obtained after 10 minutes heating at 200° C. The results of the thermogravimetric analysis of this polymer are shown in FIG. 46. The glass transition temperature was 245° C.

EXAMPLES 29–32

2.87 g of octa(4-formylphenoxy)cyclotetraphosphazene (hereinafter referred to as p-HBA/4PNC) obtained by reacting p-hydroxybenzaldehyde and cyclic phosphonitrilic chloride tetramer was dissolved in 40 ml of dioxane and specified amounts of various diamines were added with stirring. The solution immediately turned into a clear, colored solution.

Each of these solutions were subjected to the same treatment as in Example 1 to obtain polymers in film form.

The experimental results are shown in Table 6 and the IR spectra of these polymers are shown in FIGS. 29–32. The results of the thermogravimetric analyses are shown in FIG. 46.

The results of the elemental analysis of the product of Example 30 are as follows:

| | C | H | N | P |
| --- | --- | --- | --- | --- |
| Theoretical value (wt %) | 67.38 | 3.92 | 15.11 | 6.68 |

EXAMPLE 33

1.52 g of 4,4'-diaminodiphenylmethane was dissolved in 40 ml of a dioxane solution containing 2.72 g of cyclotriphosphazene compound with a substituent of a composition of 72.5/27.5 mol/mol 4-formylphenoxy group/phenoxy group which was obtained by the reaction of a mixture of p-hydroxybenzaldehyde and phenol and cyclic phosphonitrilic chloride trimer.

Figure 33:
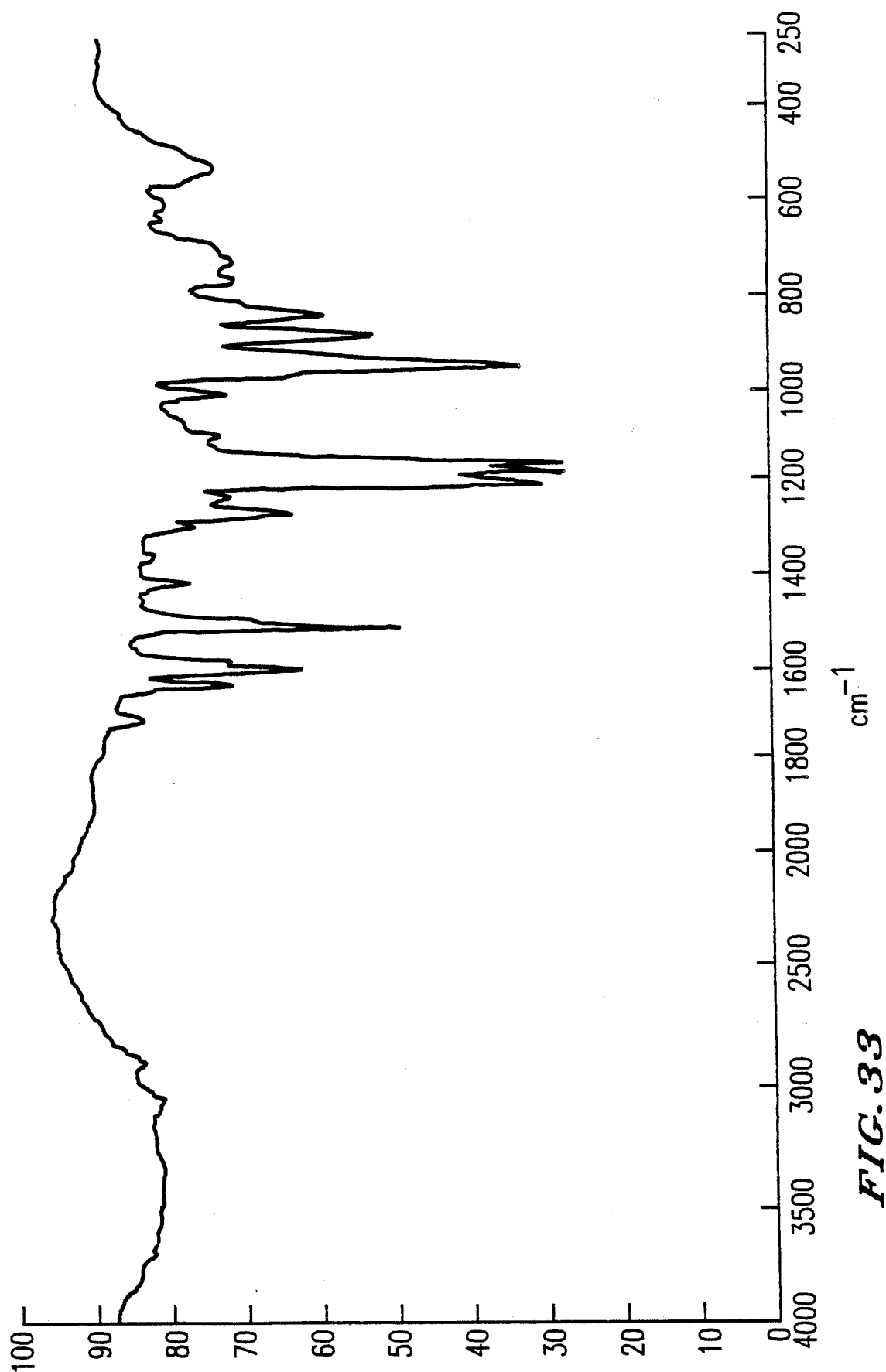

This solution was spread over a glass plate. Film-like polymer obtained after the evaporation of the solvent was heated at 220° C. for 10 minutes to obtain a hard, light yellow film. The IR spectrum of the product is shown in FIG. 33. The N—H stretching vibration of the amine (3500, 3450, and 3340 cm$^{-1}$) and the C=O stretching vibration of the aldehyde (1705 cm$^{-1}$) almost disappeared, and instead the C=N stretching vibration based on the Schiff base appeared at 1630 cm$^{-1}$. The glass transition temperature of this polymer was 165° C.

EXAMPLES 34–36

Figure 34:
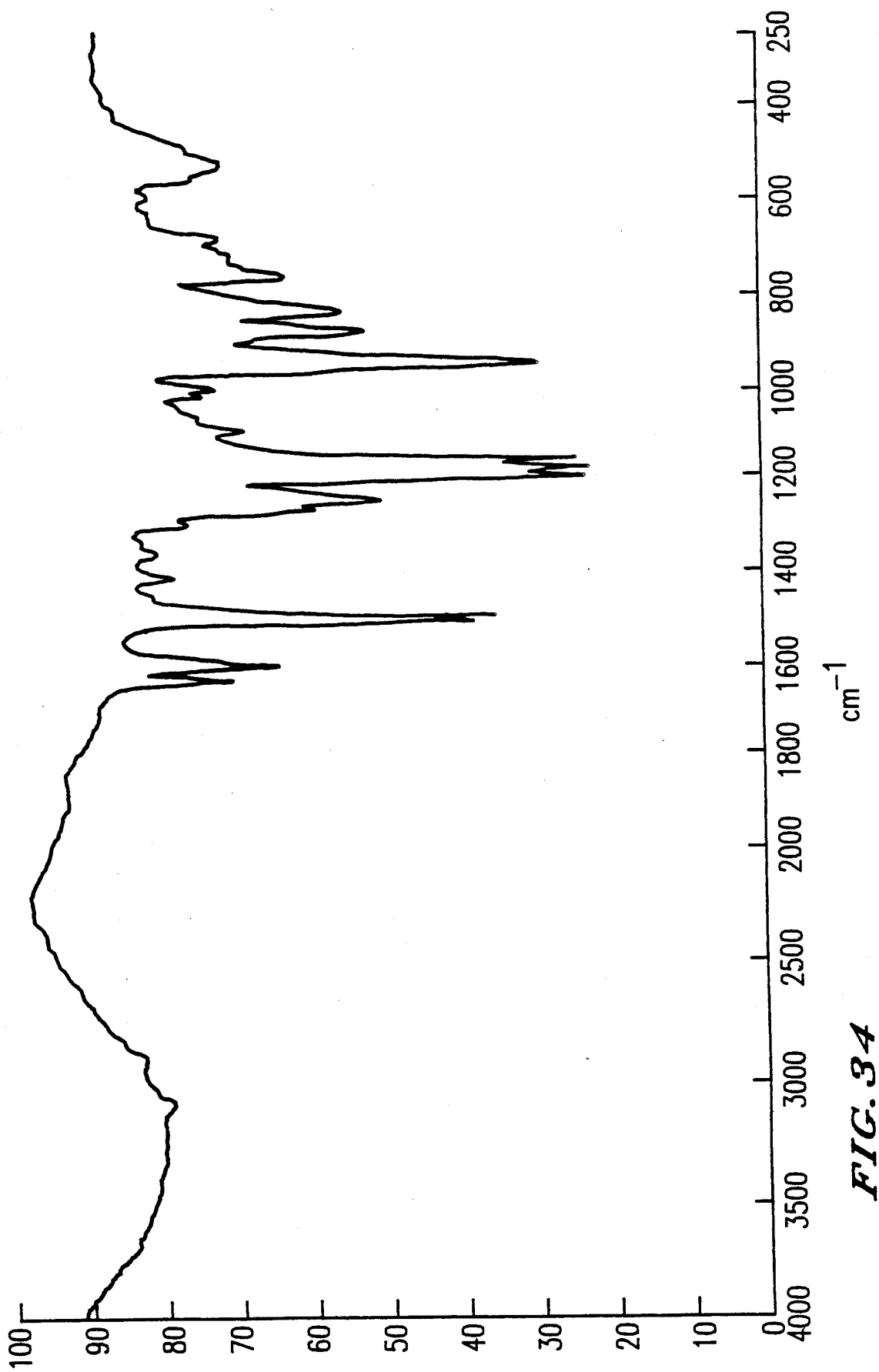
Figure 35:
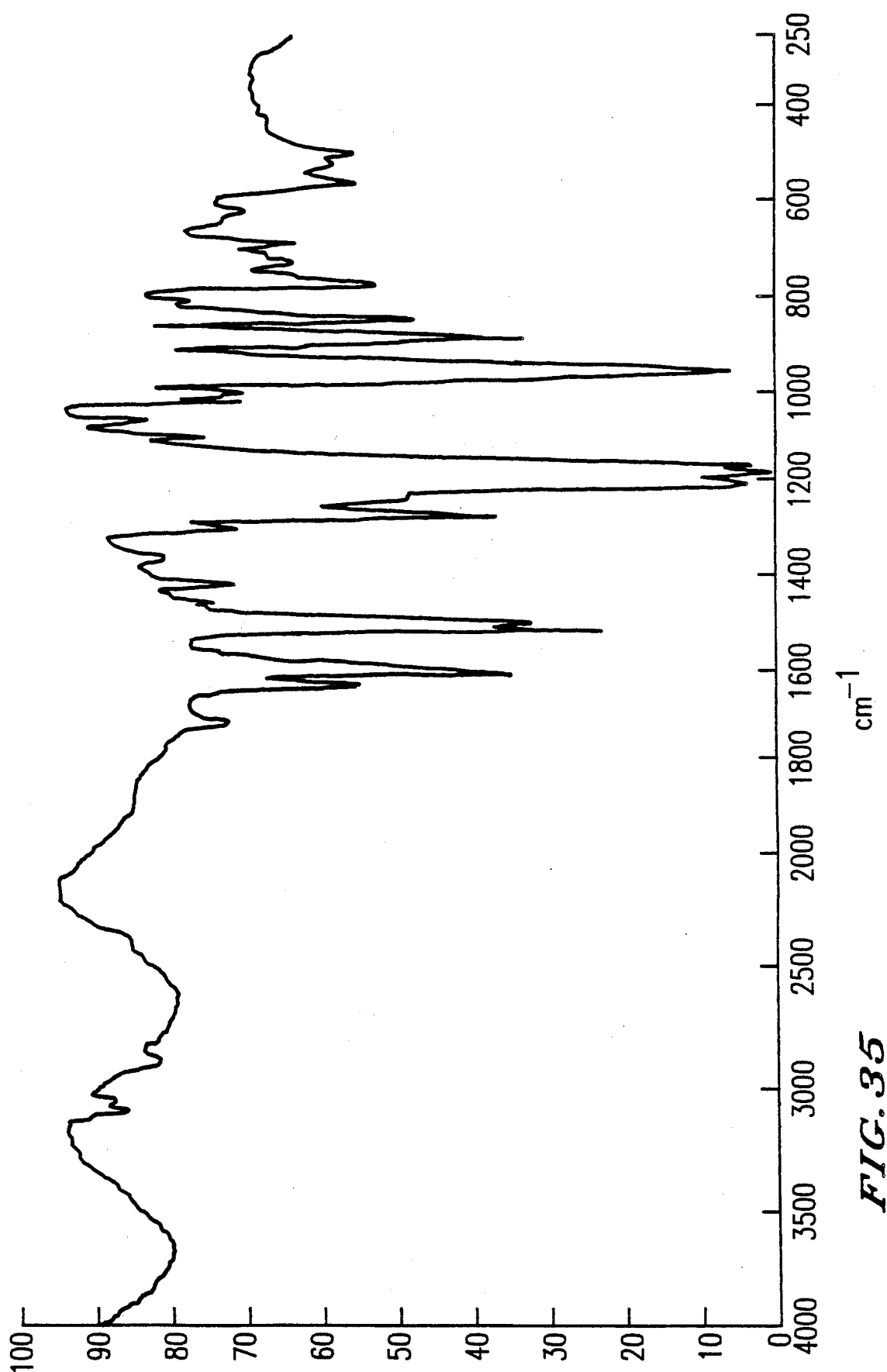
Figure 36:
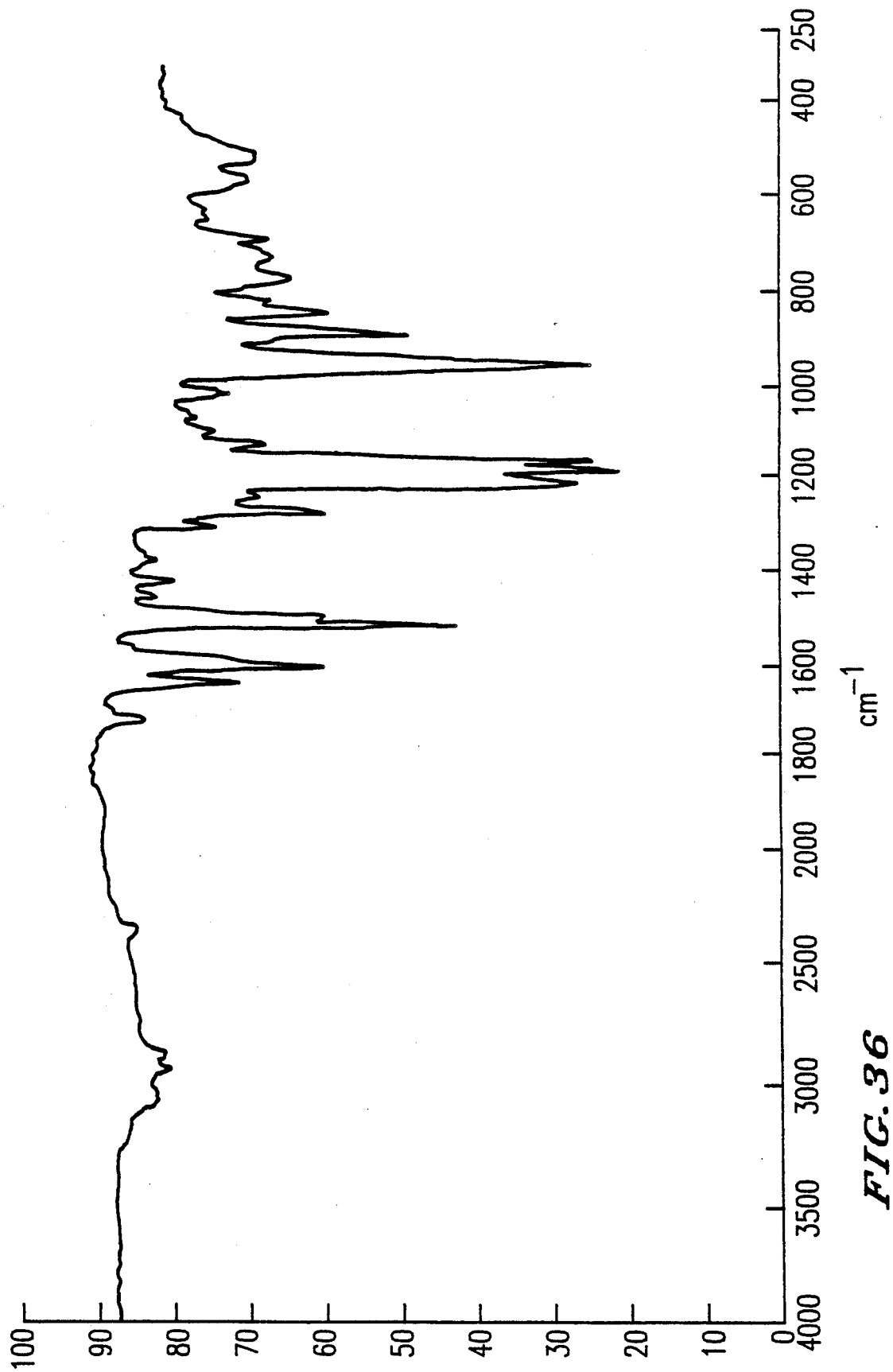
Figure 47:
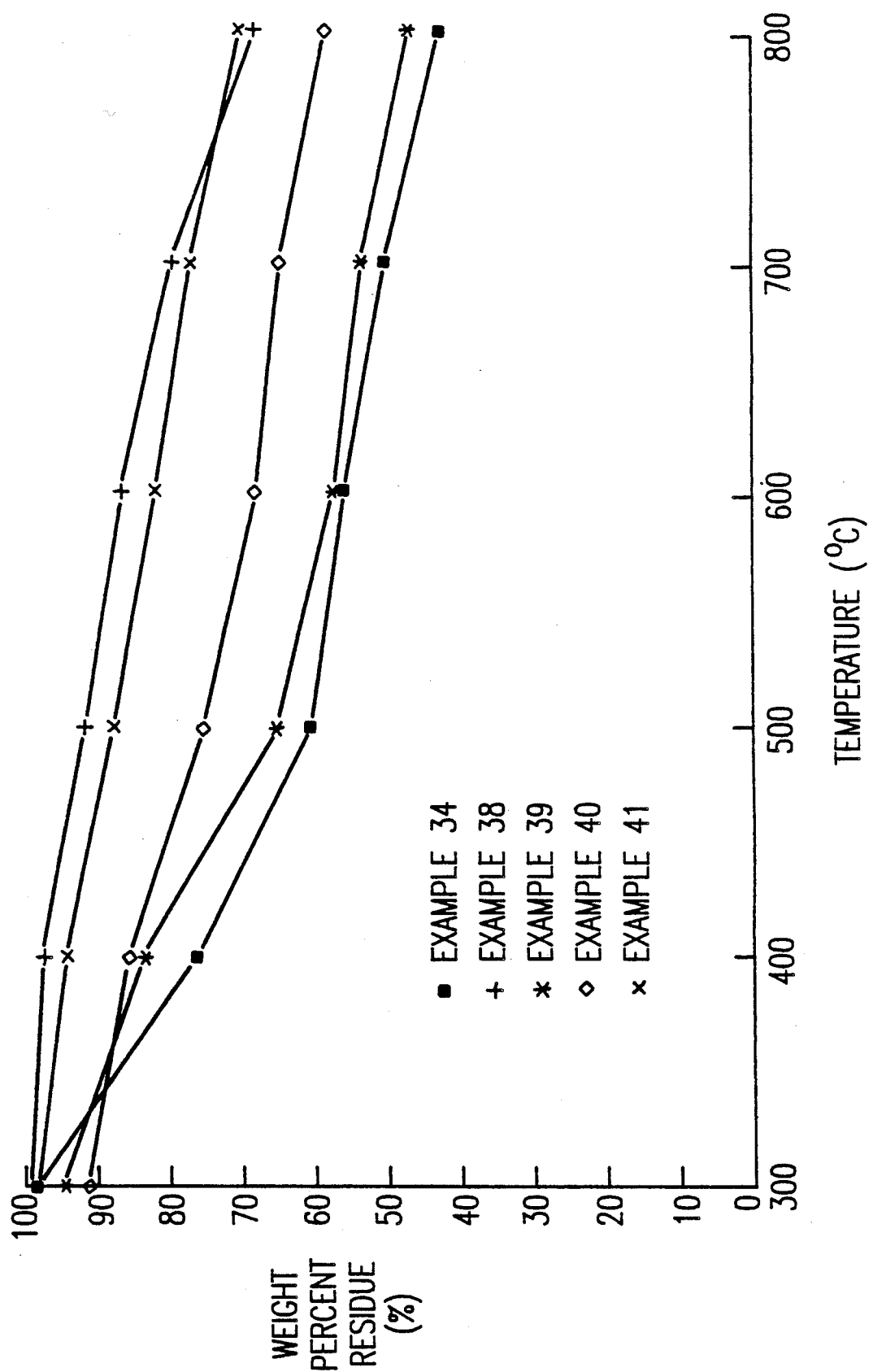
FIG. 47 shows the results of the thermogravimetric analysis for the polymers of Examples 34, and 38 to 41.

Specified amounts of various diamines were dissolved in 40 ml of a dioxane solution containing 2.59 g of cyclotriphosphazene compound (hereinafter referred to as p-HBA/P/3PNC) with a substitution group of a composition of 49.6/50.4 mol/mol 4-formylphenoxy group/phenoxy group which was obtained by the reaction of a mixture of p-hydroxybenzaldehyde and phenol with cyclophosphonitrilic chloride trimer. Subsequently the same treatment as outlined in Example 33 was carried out. The obtained results are shown in Table 7. The IR spectra of these polymers are shown in FIGS. 34–36. The results of the thermogravimetric analyses for the product of Example 34 are shown in FIG. 47.

The results of the elemental analyses of the product of Example 35 are as follows:

|  | C | H | N | P |
|---|---|---|---|---|
| Theoretical value (wt %) | 65.71 | 4.06 | 12.10 | 8.92 |
| Analytical value (wt %) | 65.22 | 3.93 | 12.08 | 8.81 |

TABLE 7

| Exam-ples | CHC*1 Kind | CHC*1 Amount (g) | Diamines Compound name | Diamines Amount (g) | Curing Conditions Temp. (°C.) | Curing Conditions Period (Hr) | Polymers Color | Polymers Tg (°C.) |
|---|---|---|---|---|---|---|---|---|
| 34 | p-HBA/P/3PNC | 2.59 | 4,4′-diaminodiphenyl ether | 1.40 | 200 | 1 | Light yellow | 125 |
| 35 | p-HBA/P/3PNC | 2.59 | p-phenylenediamine | 0.54 | 200 | 1 | Light yellow | 135 |
| 36 | p-HBA/P/3PNC | 2.59 | o-tolidine | 1.42 | 200 | 1 | Yellow | 120 |

*1 Cyclic phosphonitrilic compounds

EXAMPLE 37

1.12 g of tolylene-2,4-diamine was dissolved in 30 ml of an acetone solution containing 2.80 g of cyclotriphosphazene compound with a substitution group of a composition of 85.1/14.9 mol/mol 4-formylphenoxy group/trifluoroetoxy group which was obtained by reacting a mixture of p-hydroxybenzaldehyde and trifluoroethanol with cyclophosphonitrilic chloride trimer. This solution was evaporated to dryness to obtain a solid, which was heated for two hours at 180° C.

Figure 37:
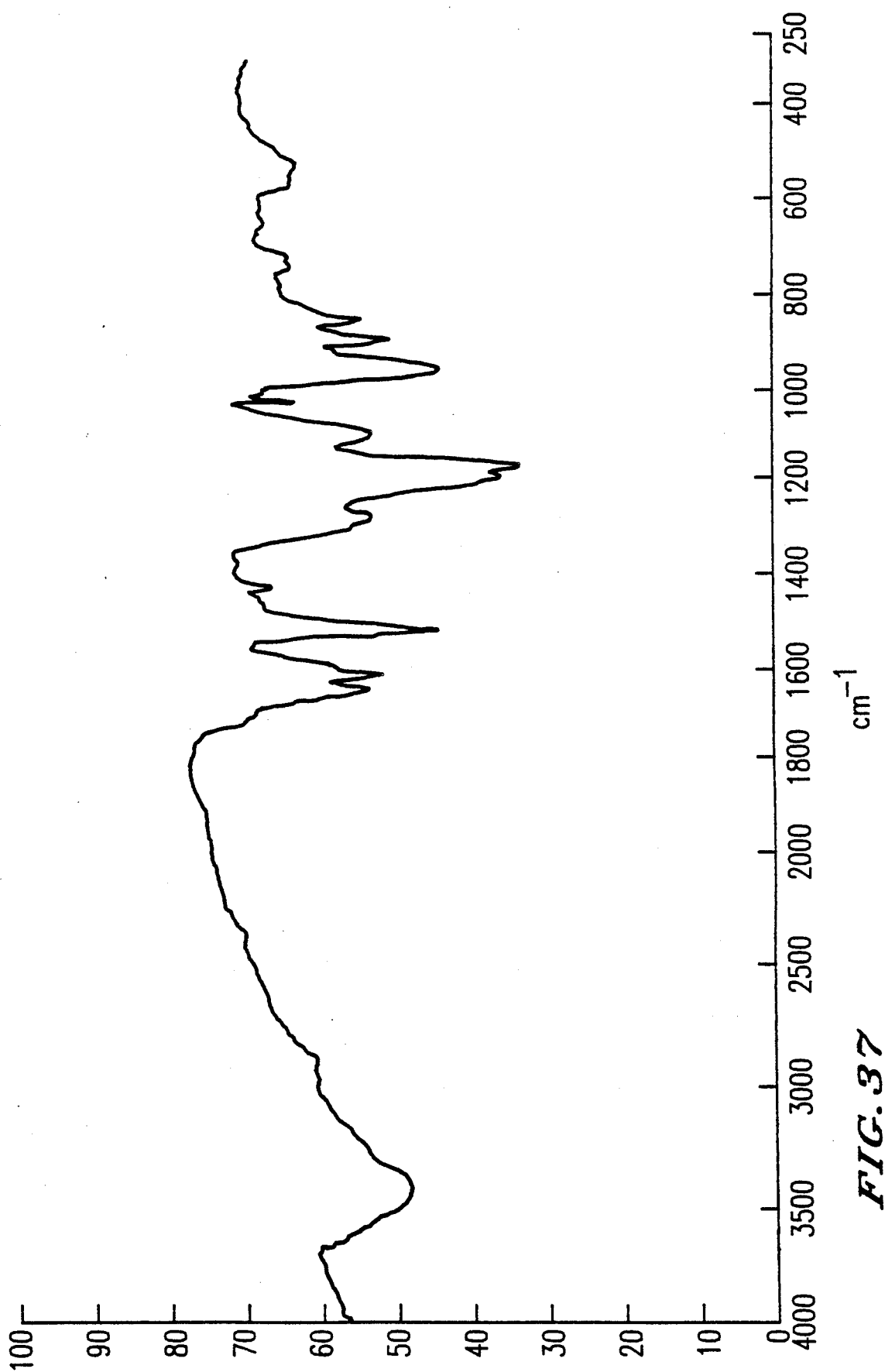
Figure 36:
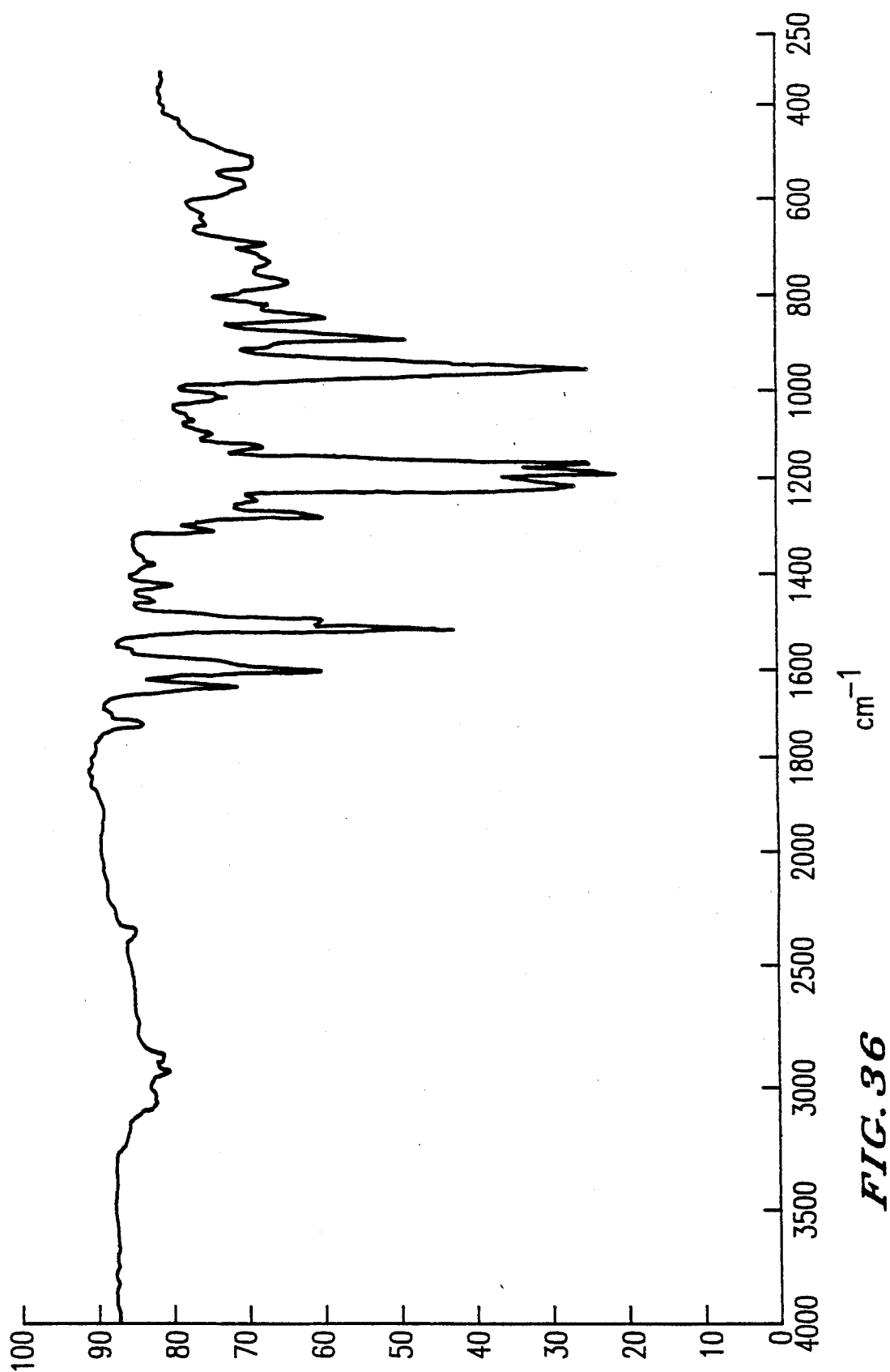

The IR spectrum of the cured polymer which was obtained is shown in FIG. 37. The N—H stretching vibration of the amine (3400, 3340 cm$^{-1}$) and the C=O stretching vibration of the aldehyde (1705 cm$^{-1}$) almost disappeared, and instead the C=N stretching vibration based on the Schiff bases appeared at 1635 cm$^{-1}$. The glass transition temperature of the product was 120° C.

EXAMPLE 38

2.87 g of p-HBA/3PNC was dissolved in 20 ml of dioxane. To the solution 1.58 g of 1,5-diaminonaphthalene was added with stirring. The solution immediately turned a clear yellow.

Figure 38:
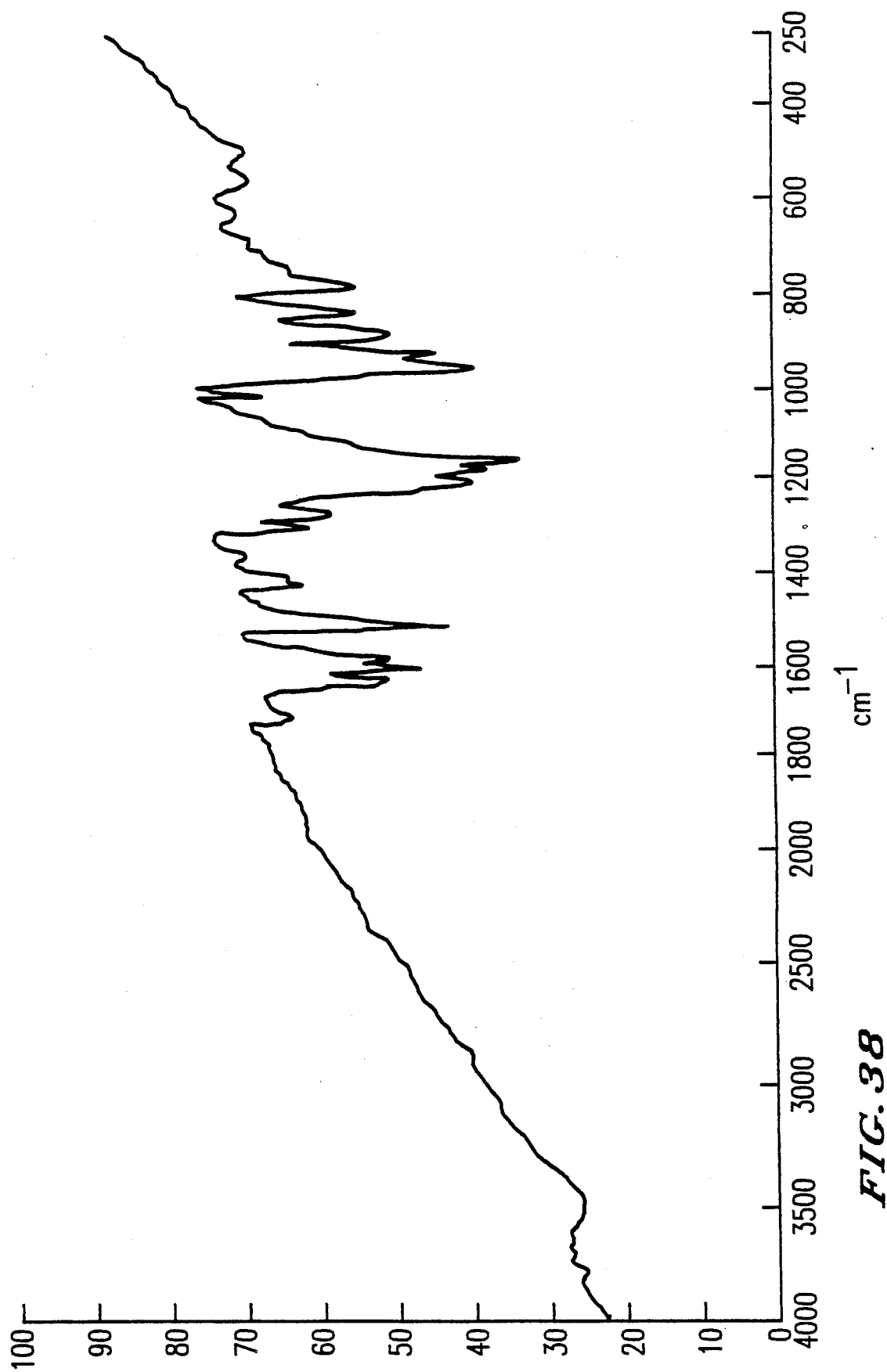

A part of this solution was spread evenly over a glass plate and the solvent was allowed to evaporate at room temperature to obtain a hard, light yellow polymer in the form of film. After heating in air for 1.5 hours at 210° C., the system was immersed in water, thereby obtaining a light yellow, flexible, transparent film, which was peeled off from the glass plate. The IR spectrum for this polymer is shown in FIG. 38. The results of the thermogravimetric analysis are shown in FIG. 47.

The glass transition temperature of the polymer was 160° C.

EXAMPLE 39

2.87 g of p-HBA/3PNC and 1.87 g of 2,4-diamino-6-phenyl-sym-triazine were placed in a beaker. The solution was heated at 200° C. in an oil bath with stirring. The mixture became homogeneous and reacted with vigorous gas (steam) evolution and after 10 minutes the stirring became very difficult.

Figure 39:
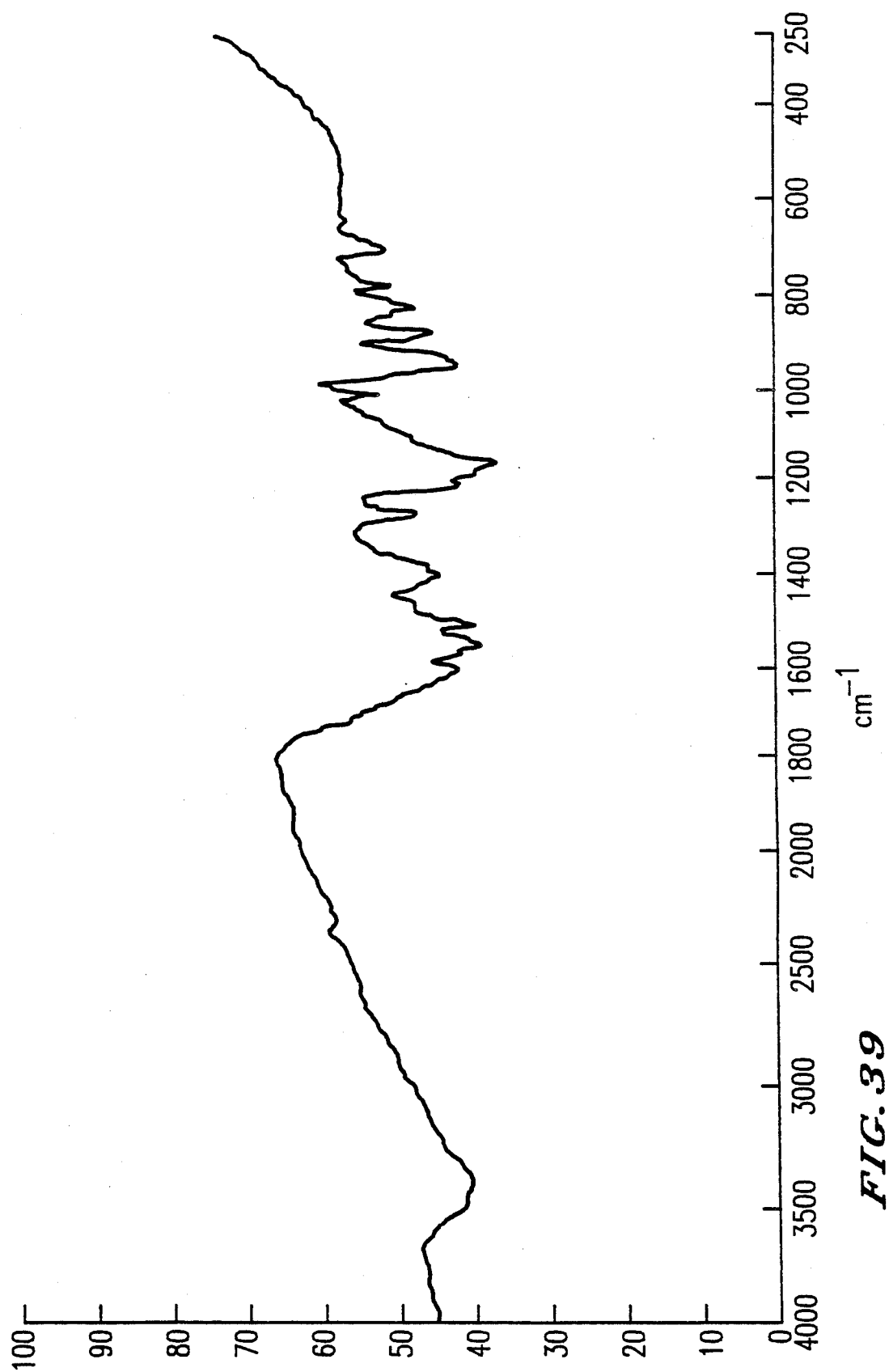

The material was then heated in air for one hour at 250° C. to obtain a cured yellow foamed polymer. The IR spectrum of this polymer is shown in FIG. 39. The results of the thermogravimetric analysis is shown in FIG. 47.

The glass transition temperature of the polymer was 240° C.

The elemental analysis values of the product are as follows:

|  | C | H | N | P |
|---|---|---|---|---|
| Theoretical value (wt %) | 62.85 | 1.65 | 25.20 | 5.07 |
| Analytical value (wt %) | 62.35 | 1.41 | 25.13 | 5.07 |

EXAMPLE 40

2.87 g of p-HBA/3PNC and 0.84 g of melamine were placed in a beaker and heated to 230° C. with stirring. The mixture became homogeneous and reacted with vigorous gas (steam) evolution and in 5 minutes the stirring became very difficult.

The material was then heated in air for one hour at 250° C. to obtain a cured yellow foamed polymer.

Figure 40:
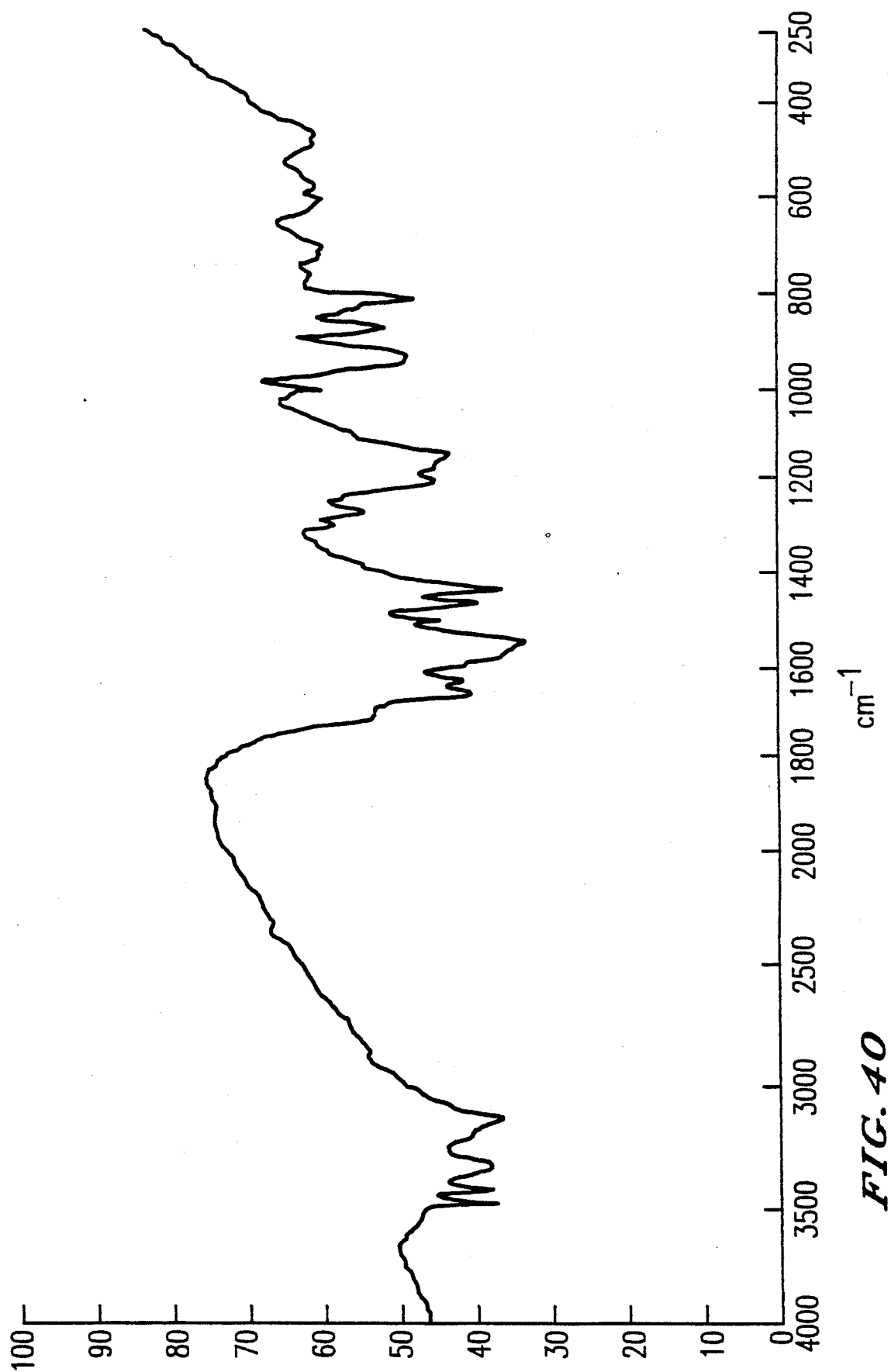

The IR spectrum of this polymer is shown in FIG. 40. The results of the thermogravimetric analysis is shown in FIG. 47.

The glass transition temperature of the polymer was 265° C.

EXAMPLE 41

2.87 g of p-HBA/3PNC and 2.38 g of 1,5-diaminoanthraquinone were placed in a beaker. The solution was heated at 200° C. in an oil bath with stirring, whereby the mixture became homogeneous and generation of gas (steam) was observed.

Figure 8:
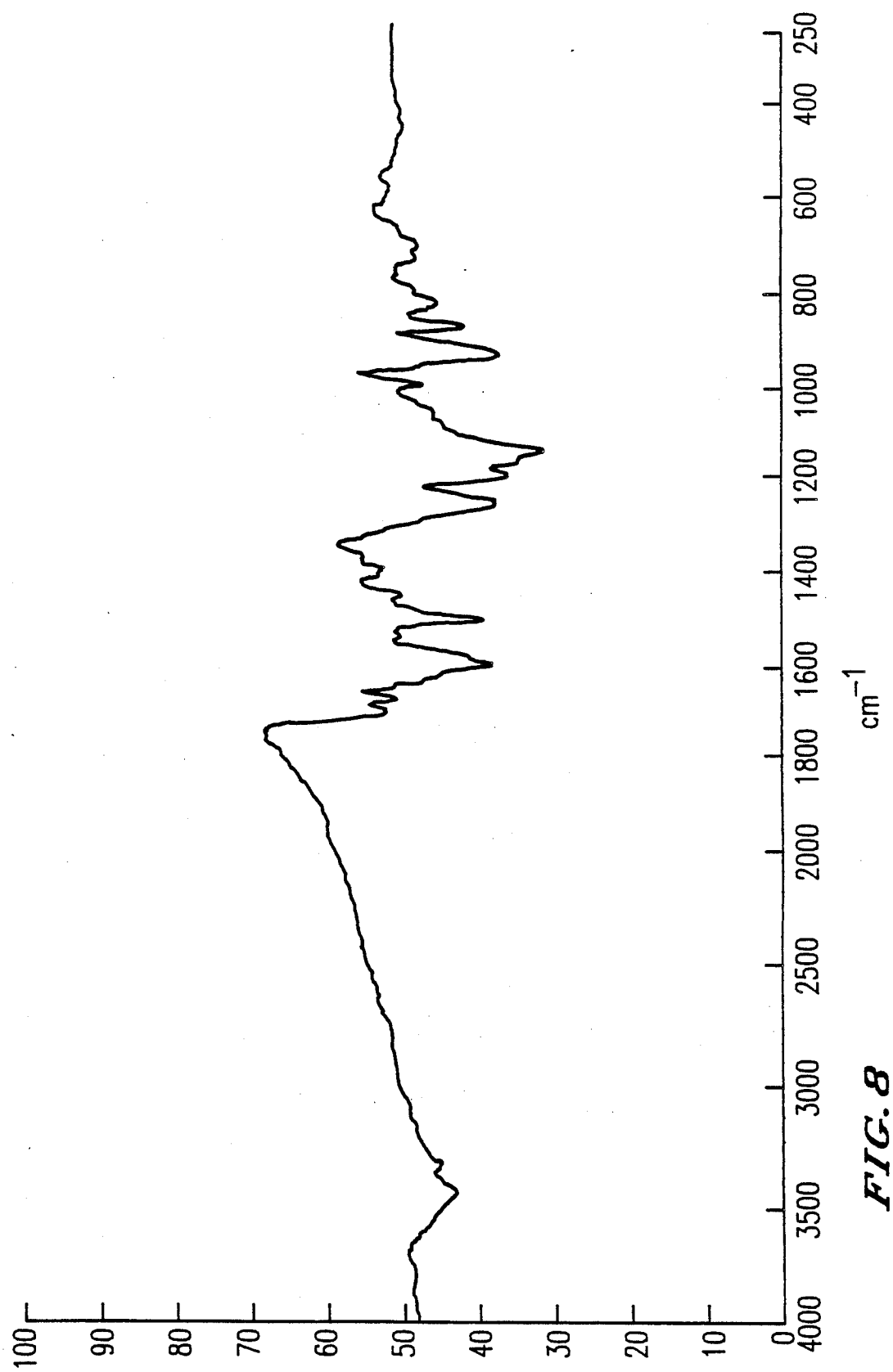
Figure 9:
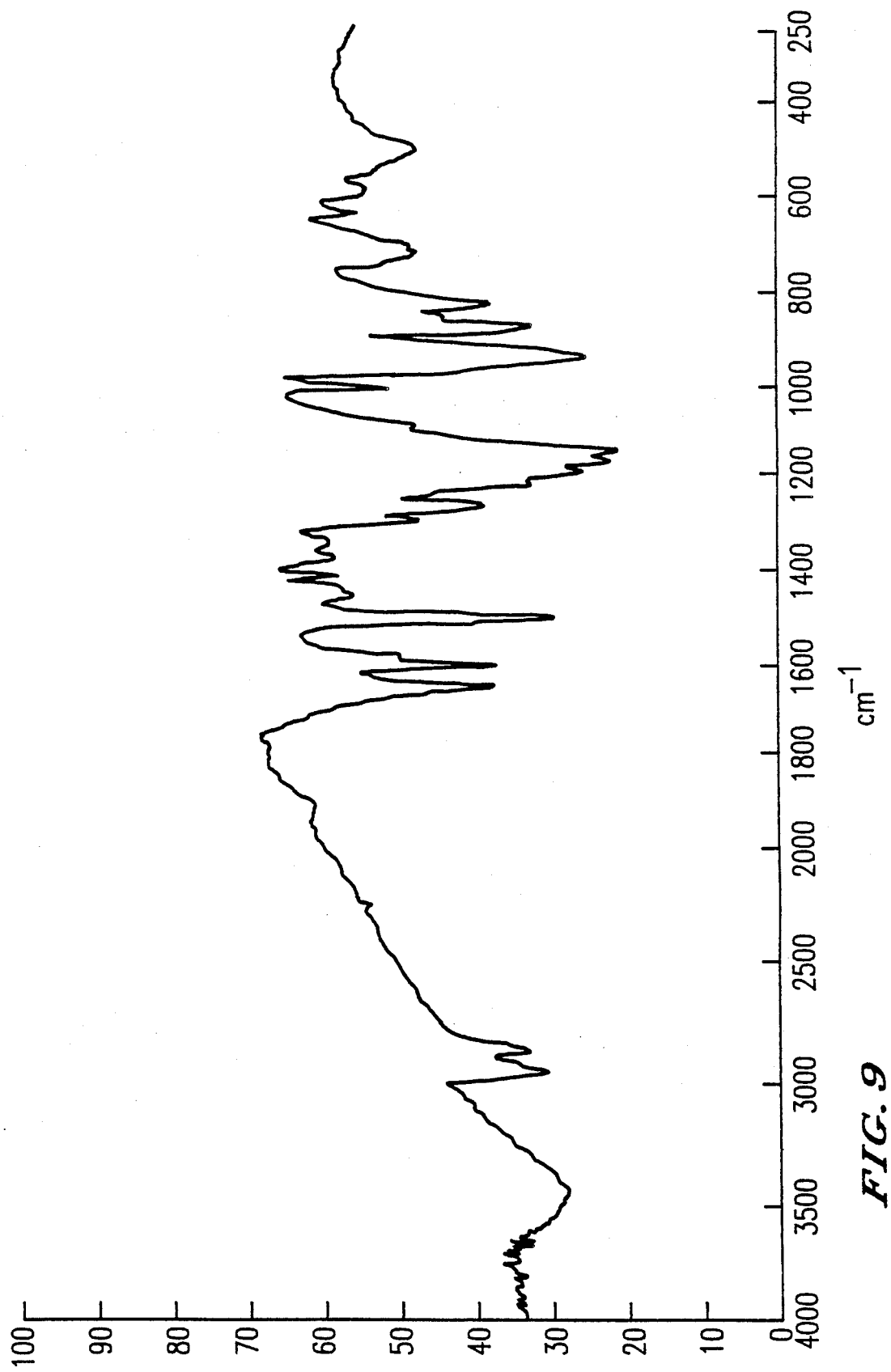
Figure 10:
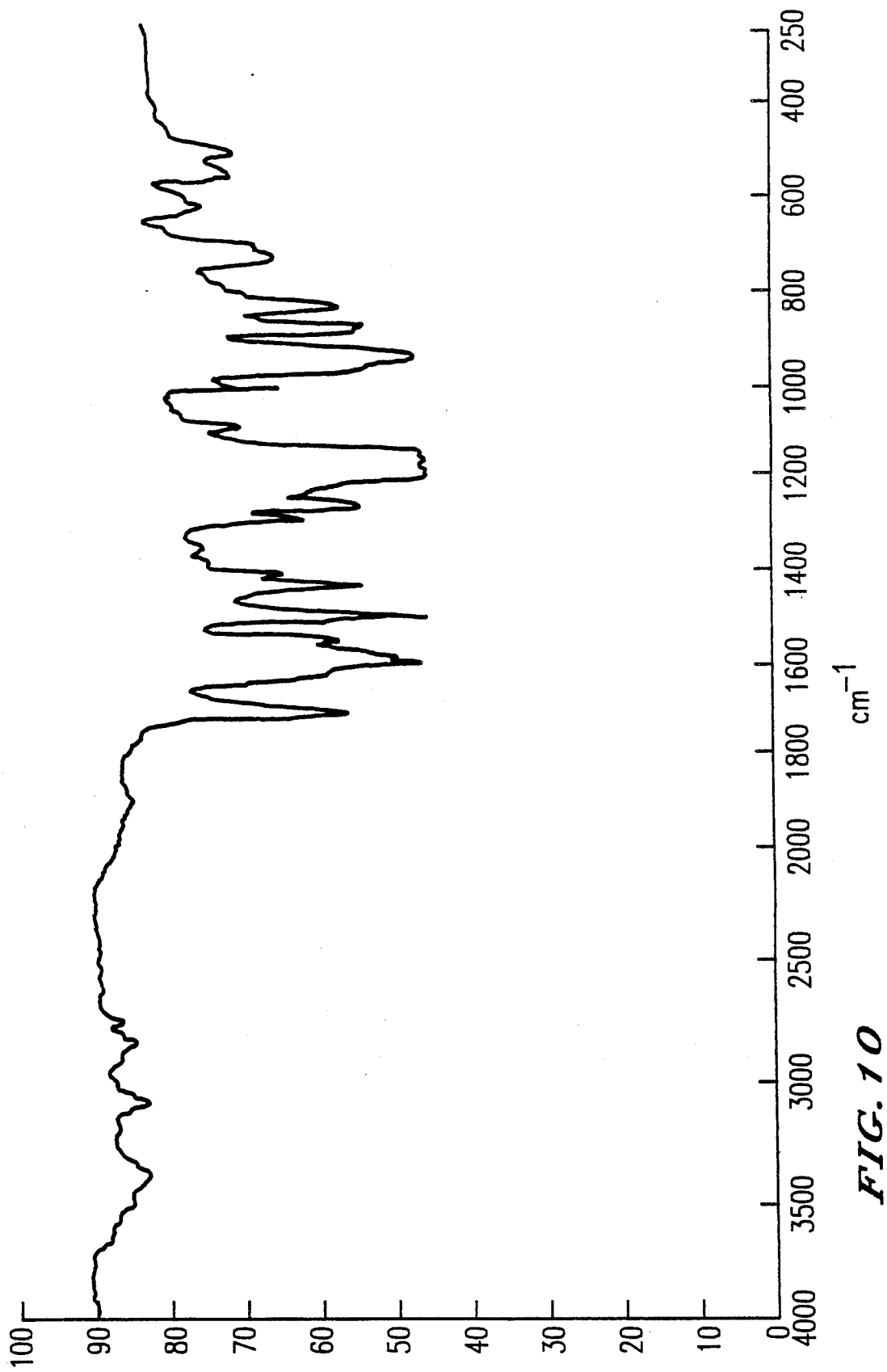
Figure 11:
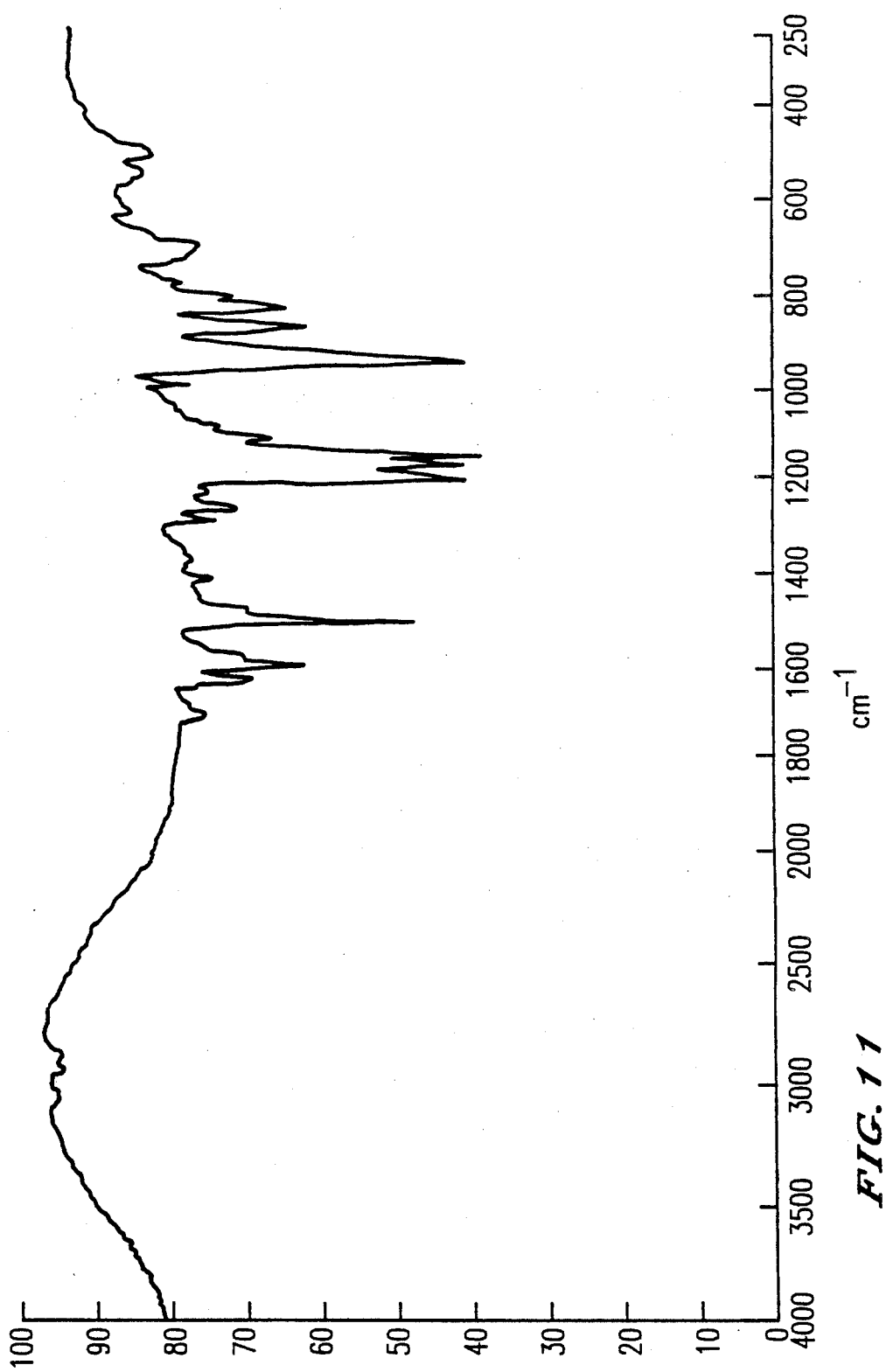

The material was then heated in air for 3 hours at 220° C. to obtain a cured foamed polymer which was colored dark red. The IR spectrum of this polymers was almost the same as shown in FIG. 8.

The glass transition temperature of the polymer was 240° C. The results of the thermogravimetric analysis is shown in FIG. 47.

Comparative Example

Figure 48:
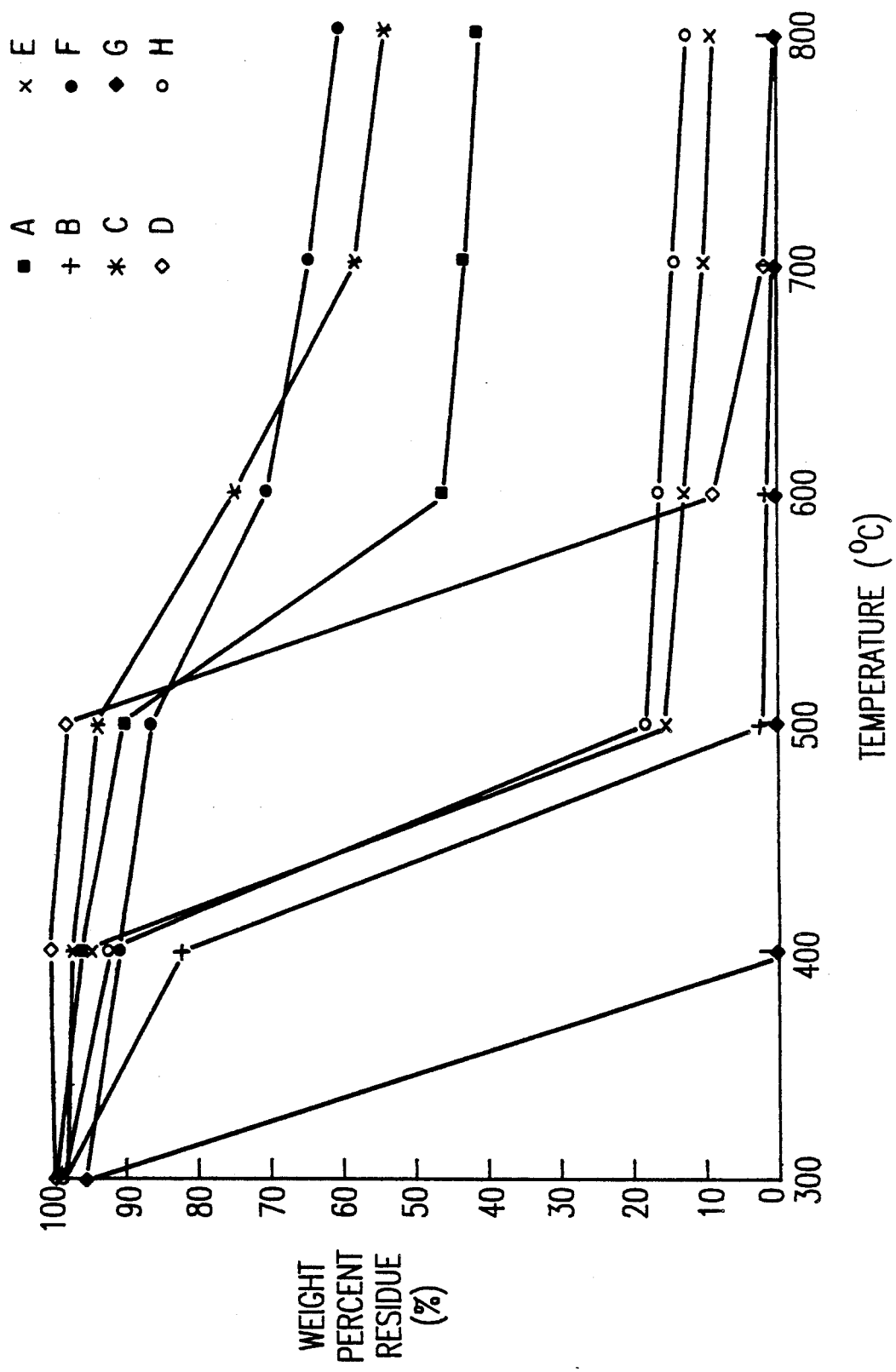
FIG. 48 shows the results of the thermogravimetric analysis for the commercial heat-resistant polymers (A to H) of the Comparative Example.

The thermogravimetric analyses were carried out in the same way as in Example 1 on 8 commercial heat-resistant polymers; i.e., polyparaphenylene sulfide (A), polyhexamethylene adipoamide (B), polyimide (C), polytetrafluoroethylene (D), polyethyleneterephthalate (E), phenol resin (F), polyacetal (G), and polyphenylene oxide (H). The results are shown in FIG. 48. These commercial heat-resistant polymers exhibited a sudden weight reduction in the 300°–800° C. range. At 800° C. the weight percent residue was at most 60%. As opposed to this, in the case of the phosphazene polymers of the present invention, the weight reduction was very moderate. Most of them exhibited a high weight percent residue of 60% of greater even at 800° C.

Reference Example 2.87 g of p-HBA/3PNC was dissolved in 15 ml of dioxane. To the solution 10 ml of dioxane solution containing 1.08 g of p-phenylenediamine was added and stirred to homogenize. This solution was then concentrated to a volume of about 10 ml by a hot air jet blown thereonto.

A portion of this solution was then placed on a glass plate and spread to an even thickness using a film applicator. The solvent was allowed to evaporate slowly at room temperature and the resulting film (103 μm thick) was heated for one hour at 100° C. The oxygen gas permeability of the film was measured according to JIS Z 1707. The permeability coefficient calculated was $P_{O2}=1.5\times10^{-11}$ cc.cm/cm$^2$.sec.cmHg, evidencing that this polymer was a high molecular material having gas barrier capabilities.

Further, a test was performed in the same way for nitrogen permeability. The result was $P_{N2}=0.3\times10^{-11}$ cc.cm/cm$_2$.sec.cmHg.

Obviously, numerous modifications and variations of the present invention are possible in light of the above teachings. It is therefore to be understood that within the scope of the appended claims, the invention may be practiced otherwise than as specifically described herein.

What is claimed is:

1. A non-linear phosphazene polymer which is a polymeric condensation reaction product of a cyclic phosphonitrilic compound represented by the general formula (I):

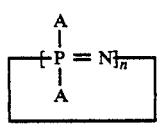
(I)

(wherein n is an integer 3 or 4, and wherein the A's in two of said n units are independently selected from a group consisting of a formylphenoxy group, a phenoxy group, an alkylphenoxy group, a halogenated phenoxy group, a N-aromatic azomethinephenoxy group, and a fluoroalkoxy group, provided more than 2 formylphenoxy groups being contained per molecule on the average) and (II) a primary diamine or primary polyamine, and in which said condensation product contains Schiff base bonds derived from formylphenoxy groups and amines and said product containing said Schiff base bonds and is represented by the formula:

(wherein Z is a residual group of said primary diamine or primary polyamine including groups that form Schiff base structures).

2. The polymer according to claim 1, which exhibits a 20% or less weight loss under thermogravimetric analysis at 400° C. and has a glass transition temperature (Tg) of 120° C. or higher.

3. The polymer according to claim 1, wherein the A's in formula (I) are each independently selected from a group consisting of a formylphenoxy group, a phenoxy group, a methylphenoxy group, and a fluoroalkoxy group with 1 to 3 carbon atoms.

4. The polymer according to claim 2, wherein the A's in formula (I) are each independently selected from a group consisting of a formylphenoxy group, a phenoxy group, a methylphenoxy group, and a fluoroalkoxy group with 1 to 3 carbon atoms.

5. The polymer according to claim 1, wherein the primary diamine is o-, m-, or p-phenylenediamine, 4,4'-diaminodiphenylmethane, 4,4'-diaminodiphenyl ether, 4,4'-diaminodiphenylsulfone, m-xylylenediamine, tolylene-2,4-diamine, o-tolidine, 2,6-diaminopyridine, 1,5-diaminoanthraquinone, 2,4-diamino-6-phenyl-sym-triazine, or hexamethylenediamine, and the primary polyamine is melamine or 3,3'-diaminobenzidine.

6. The polymer according to claim 2, wherein the primary diamine is o-, m-, or p-phenylenediamine, 4,4'-diaminodiphenylmethane, 4,4'-diaminodiphenyl ether, 4,4'-diaminodiphenylsulfone, m-xylylenediamine, tolylene-2,4-diamine, o-tolidine, 2,6-diaminopyridine, 1,5-diaminoanthraquinone, 2,4-diamino-6-phenyl-sym-triazine, or hexamethylenediamine, and the primary polyamine is melamine or 3,3'-diaminobenzidine.

7. The polymer according to claim 3, wherein the primary diamine is o-, m-, or p-phenylenediamine, 4,4'-diaminodiphenylmethane, 4,4'-diaminodiphenyl ether, 4,4'-diaminodiphenylsulfone, m-xylylenediamine, tolylene-2,4-diamine, o-tolidine, 2,6-diaminopyridine, 1,5-diaminoanthraquinone, 2,4-diamino-6-phenyl-sym-triazine, or hexamethylenediamine, and the primary polyamine is melamine or 3,3,-diaminobenzidine.

8. A process for the preparation of a nonlinear phosphazene polymer which comprises a polymeric condensation reaction of a cyclic phosphonitrilic compound represented by the general formula (I):

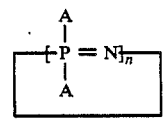
(I)

(wherein n is an integer 3 or 4, and wherein the A's in two of said n units are independently selected from a group consisting of a formylphenoxy group, a phenoxy group, an alkylphenoxy group, a halogenated phenoxy group, a N-aromatic azomethinephenoxy group, and a fluoroalkoxy group, provided more than 2 formylphenoxy groups being contained per molecule on the average) and (II) a primary diamine or primary polyamine.

9. A curable phosphazene composition comprising a cyclic phosphonitrilic compound represented by the general formula (I):

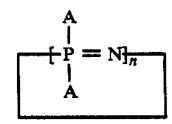
(I)

(wherein n is an integer 3 or 4, and 2n A's are independently selected from a group containing a formylphenoxy group, a phenoxy group, an alkylphenoxy group, a halogenated phenoxy group, an N-aromatic azomethinephenoxy group, and a fluoroalkoxy group, provided more than 2 formylphenoxy groups being contained per molecule on the average) and a (II) primary diamine or a primary polyamine, at a —CHO/—NH$_2$ functional group ratio of 0.5–2.0.

10. The composition according to claim 9, wherein the primary diamine is o-, m-, or p-phenylenediamine, 4,4'-diaminodiphenylmethane, 4,4'-diaminodiphenyl ether, 4,4'-diaminodiphenylsulfone, m-xylylenediamine, tolylene-2,4-diamine, o-tolidine, 2,6-diaminopyridine, 1,5-diaminoanthraquinone, 2,4-diamino-6-phenyl-sym-triazine, or hexamethylenediamine, and the primary polyamine is melamine or 3,3'-diaminobenzidine.

* * * * *

UNITED STATES PATENT AND TRADEMARK OFFICE
CERTIFICATE OF CORRECTION

PATENT NO. : 4,988,791

DATED : January 29, 1991

INVENTOR(S) : Isao Maruyama et al

It is certified that error appears in the above-identified patent and that said Letters Patent is hereby corrected as shown below:

In the drawings, delete "Fig. 36 at sheet 38" and insert, --Fig. 42-- at sheet 43, as shown on the attached sheet.

Signed and Sealed this

Thirteenth Day of October, 1992

Attest:

DOUGLAS B. COMER

Attesting Officer

Acting Commissioner of Patents and Trademarks